(12) United States Patent
Ristock et al.

(10) Patent No.: US 8,989,367 B2
(45) Date of Patent: Mar. 24, 2015

(54) SYSTEM AND METHOD FOR MONITORING HEALTH OF DEPLOYMENT STATES FOR A CONTACT CENTER

(71) Applicant: Genesys Telecommunications Laboratories, Inc., Daly City, CA (US)

(72) Inventors: Herbert Willi Artur Ristock, Walnut Creek, CA (US); Vyacheslav Zhakov, Burlingame, CA (US); Petr Makagon, San Francisco, CA (US)

(73) Assignee: Genesys Telecommunications Laboratories, Inc., Daly City, CA (US)

( * ) Notice: Subject to any disclaimer, the term of this patent is extended or adjusted under 35 U.S.C. 154(b) by 0 days.

(21) Appl. No.: 14/025,806

(22) Filed: Sep. 12, 2013

(65) Prior Publication Data

US 2014/0086401 A1 Mar. 27, 2014

Related U.S. Application Data

(60) Provisional application No. 61/700,306, filed on Sep. 12, 2012, provisional application No. 61/702,168, filed on Sep. 17, 2012.

(51) Int. Cl.
*H04M 3/00* (2006.01)
*H04M 5/00* (2006.01)
(Continued)

(52) U.S. Cl.
CPC ......... *H04M 3/5175* (2013.01); *G06Q 10/0631* (2013.01); *H04M 3/51* (2013.01); *H04M 3/523* (2013.01)
USPC ............ 379/265.03; 379/265.01; 379/265.11; 379/266.08

(58) Field of Classification Search
CPC ........ H04L 43/04; H04M 3/51; H04M 3/523; H04M 2203/401; H04M 2203/402
USPC ............. 379/265.03, 265.01, 265.11, 265.02, 379/266.08, 272; 709/224
See application file for complete search history.

(56) References Cited

U.S. PATENT DOCUMENTS 6,058,163 A  5/2000 Pattison et al.
6,947,988 B1  9/2005 Saleh
(Continued)

OTHER PUBLICATIONS

International Search Report dated Dec. 31, 2013 for PCT/US2013/059557, 12 pages.
(Continued)

*Primary Examiner* — Thjuan K Addy
(74) *Attorney, Agent, or Firm* — Christie, Parker & Hale, LLP

(57) ABSTRACT

A system and method for monitoring deployment states of a contact center. A processor migrates a state of the contact center from a first deployment state to a second deployment state. The processor records the steps in migrating from the first deployment state to the second deployment state, and stores the recorded steps in association with metadata describing the second deployment state. The processor monitors health of the second state, and takes an action for moving the state of the contact center to a healthy state in response to determining that the second deployment state is unhealthy. The migrating may be based on detecting a condition relating to operation of the contact center. The processor dynamically adjusts at least one hardware or software resource for the contact center based on the detected condition for migrating the state of the contact center from the first to the second deployment state.

14 Claims, 34 Drawing Sheets

(51) Int. Cl.
*H04M 3/51* (2006.01)
*G06Q 10/06* (2012.01)
*H04M 3/523* (2006.01)

(56) References Cited

U.S. PATENT DOCUMENTS

| | | |
|---|---|---|
| 7,568,038 B1 | 7/2009 | Ezerzer et al. |
| 7,900,206 B1 | 3/2011 | Joshi et al. |
| 7,907,598 B2 | 3/2011 | Anisimov et al. |
| 8,085,693 B2 | 12/2011 | Ristock |
| 8,117,538 B2 | 2/2012 | Anisimov et al. |
| 8,463,939 B1 | 6/2013 | Galvin |
| 2003/0154184 A1 | 8/2003 | Chee et al. |
| 2004/0102982 A1 | 5/2004 | Reid et al. |
| 2004/0240659 A1 | 12/2004 | Gagle et al. |
| 2004/0264672 A1 | 12/2004 | Paek et al. |
| 2007/0061183 A1 | 3/2007 | Seetharaman et al. |
| 2008/0059278 A1 | 3/2008 | Medina et al. |
| 2008/0075268 A1 | 3/2008 | Medina et al. |
| 2008/0144803 A1 | 6/2008 | Jaiswal et al. |
| 2009/0310513 A1 | 12/2009 | Sen et al. |
| 2010/0014511 A1 | 1/2010 | Ezerzer et al. |
| 2010/0157979 A1 | 6/2010 | Anisimov et al. |
| 2010/0198647 A1 | 8/2010 | Bowers, Jr. et al. |
| 2010/0310056 A1 | 12/2010 | Perlmutter |
| 2011/0182418 A1 | 7/2011 | Anisimov et al. |
| 2011/0255675 A1 | 10/2011 | Jasper et al. |
| 2011/0286444 A1 | 11/2011 | Petrovykh |
| 2012/0084751 A1 | 4/2012 | Makagon et al. |
| 2012/0087486 A1 | 4/2012 | Guerrero et al. |
| 2012/0150574 A1 | 6/2012 | Reid et al. |
| 2014/0072115 A1 | 3/2014 | Makagon et al. |
| 2014/0075009 A1* | 3/2014 | Kovalenko et al. ........... 709/224 |
| 2014/0079207 A1 | 3/2014 | Zhakov et al. |

OTHER PUBLICATIONS

International Search Report for PCT2013/059553, dated Dec. 26, 2013 and mailed Dec. 27, 2013, 4 pages.

Written Opinion of the International Searching Authority, dated Dec. 26, 2013 and mailed Dec. 27, 2013, corresponding to PCT2013/059553, 6 pages.

International Search Report for PCT2013/059557, dated Dec. 30, 2013, and mailed Dec. 31, 2014, 3 pages.

Written Opinion of the International Searching Authority, dated Dec. 30, 2013, and mailed Dec. 31, 2014, corresponding to PCT2013/059557, 7 pages.

Anisimov et al., Comprehensive XML for Contact Center, *IADIS International Conference WWW/Internet* 2006, pp. 294-299, 6 pages.

Anisimov et al., XML Based Framework for Contact Center Applications; *WEBIST 2007—International Conference on Web Information Systems and Technologies*, 2007, pp. 443-450, 8 pages.

Anisimov et al., XML-Based Multimodal Interaction Framework for Contact Center Applications, *WWW 2007 / Poster Paper*, May 8-12, 2007, pp. 1349-1350, 2 pages.

Anisimov et al., Extending VoiceXML and Call Control XML to Cover Contact Center Functionalities, *Genesys Telecommunication Laboratories (an Alcatel Company)*, 6 pages, submitted on Aug. 26, 2014.

* cited by examiner

| | User Name | Phone Number | Roles | Skills | Created Date |
|---|---|---|---|---|---|
| Donahue.Ryan | rdonahuedemo1@genesys | | | Test | 10/15/2012 |
| Doyle.Chris | rdoyledemo1@genesyslab | (902)637-3956 | Admin.Agent | CustomerService.sales | 10/15/2012 |
| Furt.Frank | hurt@geneysyslab.com | | Agent | CustomerService.Tier1 | 10/19/2012 |
| Jones.Bob | brones@geneyslab.com | | | | 10/19/2012 |
| Krug.Brad | bkruodemo.1@geneysyslab. | (719)111-2222 | Admin.Agent | CustomerService.brad | 10/15/2012 |
| Krug2.Brad | brad.krug2demo.1@geneysy | | Admin.Agent | | 10/19/2012 |
| San.Sue | ssan@geneysyslab.com | | | | 10/19/2012 |
| Sayko.Slava | slava.saykD@94demo.com | | Admin.Agent | Test CustomerService.sales | 10/15/2012 |

Flagged Unflag All Users 142

| | Name | User Name | Phone Number | Roles | Skills | Created Date |
|---|---|---|---|---|---|---|
| | Donahue.Ryan | rdonahuedemo1@genesys | | | | 10/15/2012 |
| | Jones.Bob | brones@geneysyslab.com | | | | 10/19/2012 |
| | San.Sue | ssan@geneysyslab.com | | | | 10/19/2012 |

FIG. 24

SYSTEM AND METHOD FOR MONITORING HEALTH OF DEPLOYMENT STATES FOR A CONTACT CENTER

CROSS-REFERENCE TO RELATED APPLICATIONS

This application claims the benefit of U.S. Provisional Application No. 61/700,306, filed on Sep. 12, 2012, and U.S. Provisional Application No. 61/702,168, filed Sep. 17, 2012, the content of all of which are incorporated herein by reference.

This application is also related to U.S. application Ser. No. 13/753,443 entitled "System and Method for Dynamic Configuration of Contact Centers via Templates," filed on Jan. 29, 2013, the content of which is incorporated herein by reference. This application is also related to U.S. application Ser. No. 14/025,810 entitled "System and Method for Providing Dynamic Elasticity of Contact Center Resources" filed on even date herewith, the content of which is incorporated herein by reference.

BACKGROUND

It is desirable to aid companies to deploy their contact center operations as efficiently and successfully as possible. However, one of the items that may take time to implement for a new contact center is the business logic employed for routing calls. Traditionally, a contact center's routing strategy is coded for the contact center based on the particular contact center's needs. The software is then debugged and deployed at the contact center's premises after months and months of coding, debugging, and testing by skilled programmers. Any change in this routing strategy requires reprogramming and re-deployment of the source code, adding further delays in the deployment of contact center operations.

Before any programming of the routing strategy can be done, the contact center must generally identify what the best practices are for this particular type of contact center, what types of services are to be provided, what are the needs of the contact center, and the business logic that will work best for the contact center. The identification of the business logic itself, aside from its programming, may be a daunting task to entities that are not familiar with call centers and their setup. Much research may be needed before identifying the business logic that will be used, adding further delays to a successful deployment of a contact center.

In addition, contact centers are generally setup based on the service offering(s) and predicted traffic volume for the contact center that is often decided in advance. Based on this determination, the physical and logical architecture of the contact center is defined and put into place. When conditions for the contact center change, the process is often repeated and service is migrated to the new system.

Accordingly, what is desired is a system and method for deploying contact centers efficiently without requiring skilled technicians or customized coding of routing strategies that are difficult to generate, deploy, and modify.

Additionally, once a contact center is deployed, it may be useful to monitor operation of the contact center to dynamically adjust contact center resources to meet actual or predicted changes in demand for those resources. It may also be desirable to measure or predict health of the contact center if adjustments are made to the contact center resources. Such health information may be useful in making future adjustments for a current contact center tenant or other similarly situated tenants in a multi-tenant environment.

SUMMARY

Embodiments of the present invention are directed to a method for monitoring deployment states of a contact center. A processor migrates a state of the contact center from a first deployment state to a second deployment state. The processor records the steps in migrating from the first deployment state to the second deployment state, and stores the recorded steps in association with metadata describing the second deployment state. The processor monitors health of the second state, and takes an action for moving the state of the contact center to a healthy state in response to determining that the second deployment state is unhealthy.

According to one embodiment, the processor monitors and collects contact center operation data. The processor further detects, in response to the monitoring, a condition relating to the operation of the contact center. The processor dynamically adjusts at least one hardware or software resource for the contact center based on the detected condition for migrating the state of the contact center from the first to the second deployment state.

According to one embodiment, the monitoring includes monitoring a condition including at least one of call abandonment rate, average handle time, customer satisfaction, service levels, or agents' occupancy.

According to one embodiment, the determining that the second deployment state is unhealthy includes comparing the condition to one or more threshold values.

According to one embodiment, the processor stores the health of the second state in association with the second deployment state.

According to one embodiment, the action taken by the processor is reverting to the first deployment state.

According to one embodiment, the action taken by the processor is troubleshooting for determining a cause for the unhealthy state.

Embodiments of the present invention are also directed to a system for monitoring deployment states of a contact center. The system includes a processor and a memory. The memory stores program instructions thereon that, when executed by the processor cause the processor to: migrate a state of the contact center from a first deployment state to a second deployment state; record steps in migrating from the first deployment state to the second deployment state; store the recorded steps in association with metadata describing the second deployment state; monitor health of the second state; and take an action for moving the state of the contact center to a healthy state in response to determining that the second deployment state is unhealthy.

A person of skill in the art should understand the embodiments of the present invention allow contact center resources for a particular contact center tenant to be scaled up or down as needed based on detected or predicted demands on the contact center tenant. Thus, the tenant need to pre-allocate resources that may not even be used for a period of time. Health of a particular deployment may also be monitored to learn over time which deployments are healthy and for which conditions. If a current deployment is deemed to be unhealthy, the processor may take action to move the contact center to a healthy state. By knowing which deployment states are healthy or unhealthy, the processor may be able to avoid adjustment of resources that may take the contact center into an unhealthy state. Instead, the processor may select an adjustment that migrates the contact center to the closest known healthy state, as opposed to an untested state that may prove to be unhealthy.

These and other features, aspects and advantages of the present invention will be more fully understood when considered with respect to the following detailed description, appended claims, and accompanying drawings. Of course, the actual scope of the invention is defined by the appended claims.

BRIEF DESCRIPTION OF THE DRAWINGS

FIGS. 22-30 are screen shots of various example graphical user interface screens rendered by a specialized application running on a third party web platform according to one embodiment of the invention;

DETAILED DESCRIPTION

Figure 1:
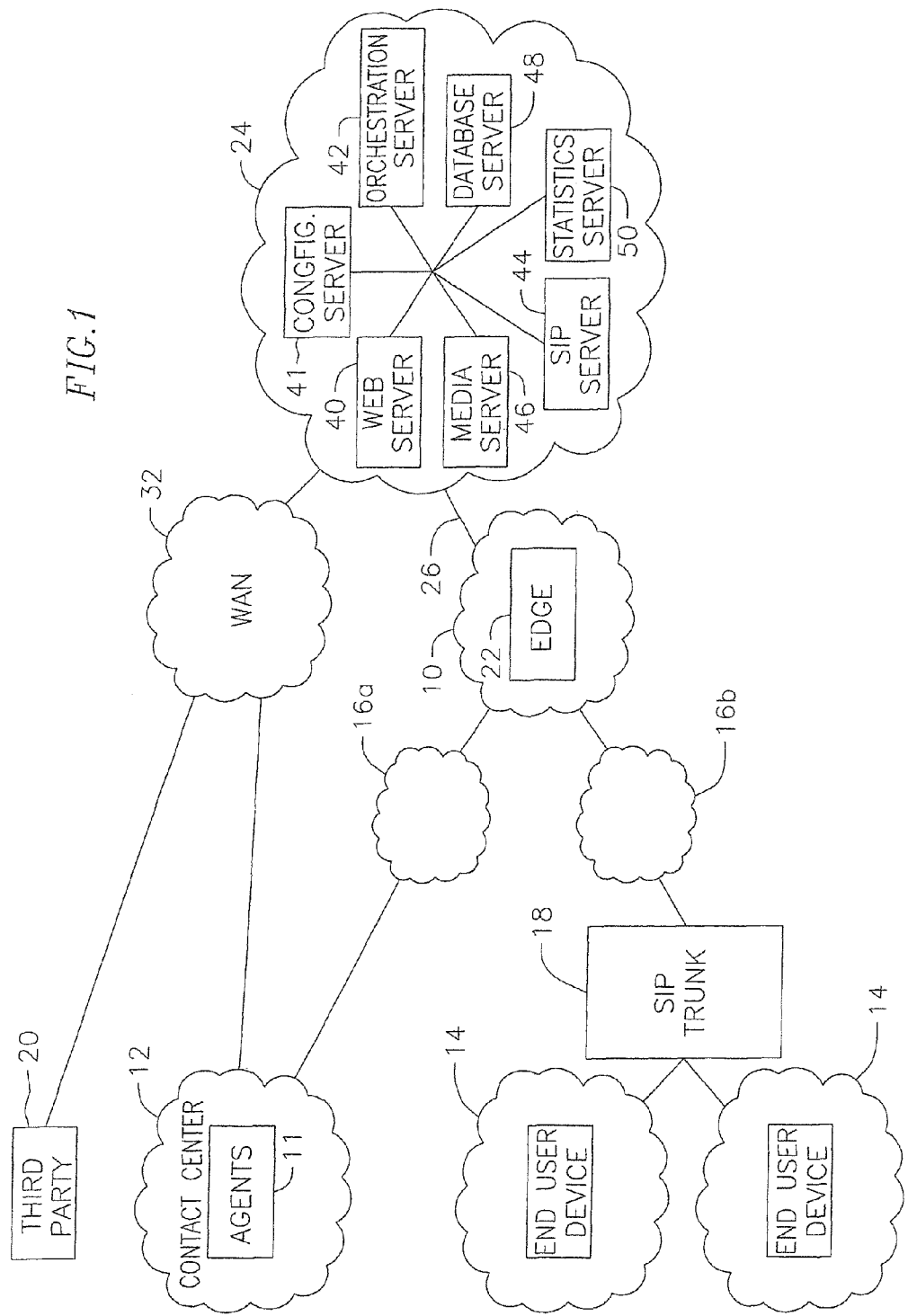
FIG. 1 is a schematic block diagram of a system for dynamic configuration, reconfiguration, and monitoring of contact centers according to one embodiment of the invention.

In general terms, embodiments of the present invention are directed to a system and method for providing contact center services for different business enterprises that allows such enterprises to rapidly configure and deploy their contact center operations without the need of high skilled IT personnel or extensive pre-acquired knowledge of best practices for call center operations or setup. According to one embodiment, the system provides a library of different routing logic templates that span across a multitude of different routing strategies from which a particular business entity may, during a configuration process, pick and choose depending on their needs. The templates may be used as building blocks for rapidly configuring and deploying the contact center. The templates may give access to other sub-templates based on the level of customization or complexity that is desired to meet the business objectives of the contact center. In this manner, even non-IT personnel may quickly configure and deploy a contact center operation that meets the contact center's needs. As the contact center's needs change, different routing logic or configuration parameters may be selected and deployed for the contact center without requiring reprogramming or redeployment of customized software that may otherwise be generated for the contact center.

According to one embodiment, the configuration of routing logic for a contact center using templates includes displaying a plurality of routing templates for user selection. According to one embodiment, each of the routing templates is associated with metadata defining one or more parameters of the corresponding routing template. A contact center administrator selects one of the displayed templates and further identifies an entry point (e.g. a telephone number) to the contact center to which the selected routing template applies. The parameters defined for the selected template are displayed, according to one example, for prompting user input. The administrator provides input values for the displayed parameters. According to one embodiment, the user input values are saved in association with the corresponding parameters and further in association with the identified entry point. The saved user input values are then retrieved for routing a particular interaction arriving at the entry point.

Embodiments of the present invention are also directed to providing an intuitive graphical user interface which simplifies the process of composing a routing strategy for the contact center and provides an intuitive configuration experience for the contact center administrator. In this regard, the interface may provide a set of basic building blocks that even non-IT personnel may manipulate to build the contact center's routing strategy. By selecting and organizing the building blocks via the interface, the contact center administrator is provided with a pictorial view of the logic behind the routing strategy (routing strategy diagram) so as to allow the administrator to easily discern how an interaction will flow according to the routing strategy, which aids the configuration process.

According to embodiments of the present invention, the routing strategy diagram may be invoked for real-time monitoring of efficacy (or lack of efficacy) of the corresponding routing strategy. For example, real-time call conditions may be monitored and portions of the routing strategy diagram that are affected by the monitored call conditions may be visually highlighted. Statistical analysis may also be performed based on the detected call conditions. The use of the routing strategy diagram for monitoring interaction flows allows details and conditions of the contact center to be efficiently communicated to, and understood by, the contact center administrator. The existing routing strategy may be reconfigured in response to the monitoring and statistical information without the need of highly skilled IT personnel or extensive pre-acquired knowledge of best practices for call center operations or set up.

FIG. 1 is a schematic block diagram of a system for dynamic configuration, reconfiguration, and monitoring of contact centers (or tenants) 12 according to one embodiment of the invention. The system includes a communications network 10 (e.g., a transit network) that, according to one embodiment, is dedicated to facilitate interactions (e.g., calls or chats) between agents 11 of various contact centers 12, and end users 14 (or callers or customers). The interactions may include, for example, telephone calls, VoIP communication, chats, emails, text messaging, WebRTC communication, or any other real-time or non-real time media communication conventional in the art. The VoIP communication may be controlled by any signaling protocol configured to control communication sessions over the Internet, such as, for example, session initiation protocol (SIP), H.323, and the like.

According to one embodiment, the dedicated communications network 10 includes an edge device 22 such as, for example, a session border controller (SBC), for controlling signaling and media streams involved in setting up, conducting, and tearing down voice conversations or other media communications. Any session border controller conventional in the art may be used to implement the edge device 22. In this regard, the session border controller includes a processor executing software instructions and interacting with other system components to control voice or other media communications. The session border controller also includes an addressable memory for storing software instructions to be executed by the processor. The memory is implemented using a standard memory device, such as a random access memory (RAM).

The dedicated communications network 10 is coupled to one or more private networks 16a, 16b (collectively referenced as 16). The private networks 16 may be managed by one or more telecommunications companies that provide quality of service guarantees for VoIP calls traversing the private networks according to provider policies and limits of service ordered by its customers. According to one embodiment, the private networks 16 implement MPLS (Multi-Protocol Label Switching) for transmitting the VoIP communication. Although MPLS is used as an example, a person of skill in the art should recognize that any other mechanism in addition or in lieu of MPLS may be used for ensuring quality of service guarantees, bit rates, and bandwidth for calls traversing the private networks. Due to the quality of service guarantees provided by the private networks 16, consistent call quality and security can generally be expected for those calls while traversing the private networks.

End users 14 utilize end user devices (e.g. VoIP phones, computers, smart phones, etc.) to access the private network 16b for VoIP communication via SIP trunk equipment 18. Although the SIP trunk equipment 18 is used according to one embodiment for accessing the private network 16b, a person of skill in the art should recognize that any other device for allowing the end user devices to access to the private network 16b for VoIP communication or other types of communication (e.g. email, chat, web-based communication, etc.) may be used in addition or in lieu of the SIP trunk. According to one embodiment, access to the private network 16b may also be via WebRTC, Skype, or via other networking systems (e.g. IP Multimedia Subsystem (IMS), public land mobile network (PLMN), or the like).

According to one embodiment, the remote computing environment 24 is a cloud computing environment that allows the sharing of resources and the provision of services over a network. In other embodiments, the remote computing environment provides resources used by a managed services provider (MSP) to provide services to various contact centers. Although the computing environment 24 is referred to as a remote computing environment, a person of skill in the art should recognize that the computing environment may be co-located or merged with the dedicated communications network 10. In that case, the computing environment 24 is not remote to the dedicated communications network. In other embodiments, the computing environment 24 is co-located or merged with or any other network environment conventional in the art.

According to one embodiment, instead of hosting all contact center applications at servers located in the dedicated communications network, all or a portion of the applications are hosted by a server system in the remote computing environment 24. The contact center applications may then be provided to multiple tenants 12 as a software as a service (SaaS). Of course, the applications may also be hosted in other locations, including the dedicated communications network 10 or any other network conventional in the art, without departing from the spirit and scope of the present invention. The contact center applications include but are not limited to applications that provide VoIP signaling, voice treatments (e.g. interactive voice response applications), multi-party calls (e.g. conference calls), and the like.

In the embodiment where cloud servers are utilized, the system in FIG. 1 may be implemented as a hybrid cloud system where infrastructure and applications for handling calls to and from a contact center are distributed between the dedicated communications network 10 (controlled by a private enterprise) and cloud servers in the remote computing environment 24 (controlled by a public service provider/operator). In some embodiments, the system of FIG. 1 may be implemented in such a way that the infrastructure and applications are both controlled by a public service provider/operator. Also, in some embodiments, one or more of the contact center applications on the cloud servers dedicated to particular tenants are not shared across various tenants. Of course a mix of shared and dedicated contact center applications may be deployed.

A person of skill in the art should recognize that the system may also be implemented using solely a public or private cloud environment. Also, instead of engaging in VoIP communication with applications in the remote computing environment via the private networks 16 and the dedicated communications network 10, the VoIP communication or other types communication (e.g. email, chat, web-based communication, etc.) may be conducted over a wide area network 32 such as, for example, the public Internet. In other embodiments, no cloud technology is used at all.

When a contact center receives an inbound call or engages in an outbound call campaign, all or a portion of the call is serviced by one or more contact center applications in the remote computing environment 24. According to one embodiment, the contact center applications for a particular tenant may be transitioned/moved from one remote computing environment 24 to another, in the same or different region, in a seamless manner. The assignment of the applications to tenants may be dynamically controlled based on demand and availability of the applications. The contact center applications may also be shared amongst different contact centers.

According to one embodiment, tenants 12 engage in data communication with the remote computing environment 24 over the wide area network 32 such as, for example, the Internet. According to one embodiment, all tenant user interfaces including a contact center configuration UI, a home dashboard UI, a routing dashboard UI, a contact center monitoring UI, agent desktop UI, and/or a tenant administrative UI may be hosted by a third party web platform 20 over the Internet. According to one embodiment, a specialized application running on the third party platform utilizes third party APIs to manage the tenant user interfaces and integrate with the third party infrastructure (e.g. third party databases). The application communicates with a web server 40 over the Internet for engaging in administrative tasks such as, for example, dynamically configuring and deploying a contact center, and/or for conducting other activities typical for a contact center agent 11. A person of skill in the art would recognize that the web server 40 may be implemented as a stand-alone server or included in the remote computing environment 24.

According to one embodiment, the remote computing environment also includes, without limitation, a configuration server 41, an orchestration/routing server 42, a SIP server 44, and a media server 46. According to one embodiment, the servers 40-46 are implemented as software components deployed on a single instance of a virtual server/machine. The single instance of the virtual server/machine may run on a computer having one or more processors, disks, memories, and the like. The various servers of the virtual machine may be dedicated to a single contact center tenant or shared by multiple contact center tenants. There may be multiple virtual machines for a particular tenant, each virtual machine providing an execution environment for different applications. More than one virtual machine may also be used for backup purposes (e.g. high availability and disaster recovery purposes). Although the servers 40-46 are assumed to be separate functional units, a person of skill in the art should recognize that the functionality of two or more servers may be combined or integrated into a single server, or further subdivided into additional server components without departing from the spirit of the invention. In addition, a person of skill in the art should recognize that the remote computing environment is scalable and may include a considerable number of virtual machines sharing a set of database servers 48 managing a set of mass storage devices. Thus, the particular implementation of the server system in the remote computing environment 24 is solely for illustration purposes, and does not preclude other arrangements or components that will be evident to a person of skill in the art.

According to one embodiment, the SIP server 44 is configured to receive call signaling messages (e.g. SIP INVITE messages) from the edge device 22, media server 46, and the like, for controlling the setting up or termination of a call. Although a SIP server 44 is described, a person of skill in the art should recognize that other call controllers may be used in addition or in lieu of a SIP server.

The media server 46 is configured to identify parameters (e.g. available media ports on the media server) for establishing voice conversations between agents 11 and customers 14 (or end users), and provide those parameters to the SIP server for delivering to the edge device, customers 14, and agents 11. The media server 64 is also configured to deliver media to customers 14 and/or agents 11 via the edge device 22. For example, the media server 64 may be invoked to provide initial greeting messages to a calling customer 14, and for obtaining basic customer information (e.g. identification information, reason for the call, etc.). Also, if the customer 14 or agent 11 is placed on hold, the media server 46 may be invoked to play music for the holding customer or agent 11. In another example, if a conversation between a customer 14 and agent 11 is to be recorded, the call may traverse the media server so that the customer 14 and agent 11 engage in a three way conversation with the media server 46, and the media server 46 may record the conversation and store it in one or more database servers 48.

The orchestration/routing server 42 is configured to work with the SIP and media servers 46 for orchestrating the handling of calls based on a routing strategy associated with a particular contact center. Depending on the type of routing strategy configured for the contact center, and the specific values of parameters set for the routing strategy, different options, voice treatments, and routing is performed for the call. Although the orchestration server 42 is depicted as being separate from the media server 46, a person of skill in the art should recognize that the functionalities of the orchestration server may be merged into the media server 46.

The configuration server 41 includes a configuration engine for automatically configuring and/or reconfiguring a contact center. For example, the configuration server 41 may be configured to automatically allocate or reallocate particular resources in the remote computing environment 24 based on detected needs of the contact center.

According to one embodiment, one or more database servers 48 store various user-selectable templates for guiding a contact center administrator in configuring and deploying a contact center. For example, the templates may be routing templates where each template provides a routing logic for routing calls. The templates together span a multitude of industry verticals for which a contact center may be desired (e.g. finance, retail, medical, etc.). As the administrator picks and chooses the desired template(s) and provides values for the parameters identified by the template(s), those values are stored in the mass storage device in association with the selected template(s) and an identifier for the particular contact center (e.g. contact center telephone number). The database servers 48 further store for each customer contact center, a profile record which identifies profile and configuration information for the customer contact center. The database server 48 may be included in the remote computing environment 24.

The remote computing environment 24 may further include a statistics server 50. The statistics server 50, according to one embodiment, may gather, store, and/or analyze data regarding the contact center, agents 11 and end users 14. For example, the data of the statistics server 50 may include data regarding agent availability, agent skills, average call time, average hold time, total talk time, after work time, average speed of answer, service level, maximum abandonment rate, patience rate, and the like.

According to one embodiment of the invention, various third party developer devices 21 are also coupled to the remote computing environment 24 over the Internet. The third party developer devices may be invoked to generate new business logic and upload a template and associated metadata defining the routing logic to the remote computing environment. Once uploaded, the new templates may be made available for use by different contact centers. In this manner, different entities may be involved in extending the routing capabilities offered by existing templates.

Figure 2:
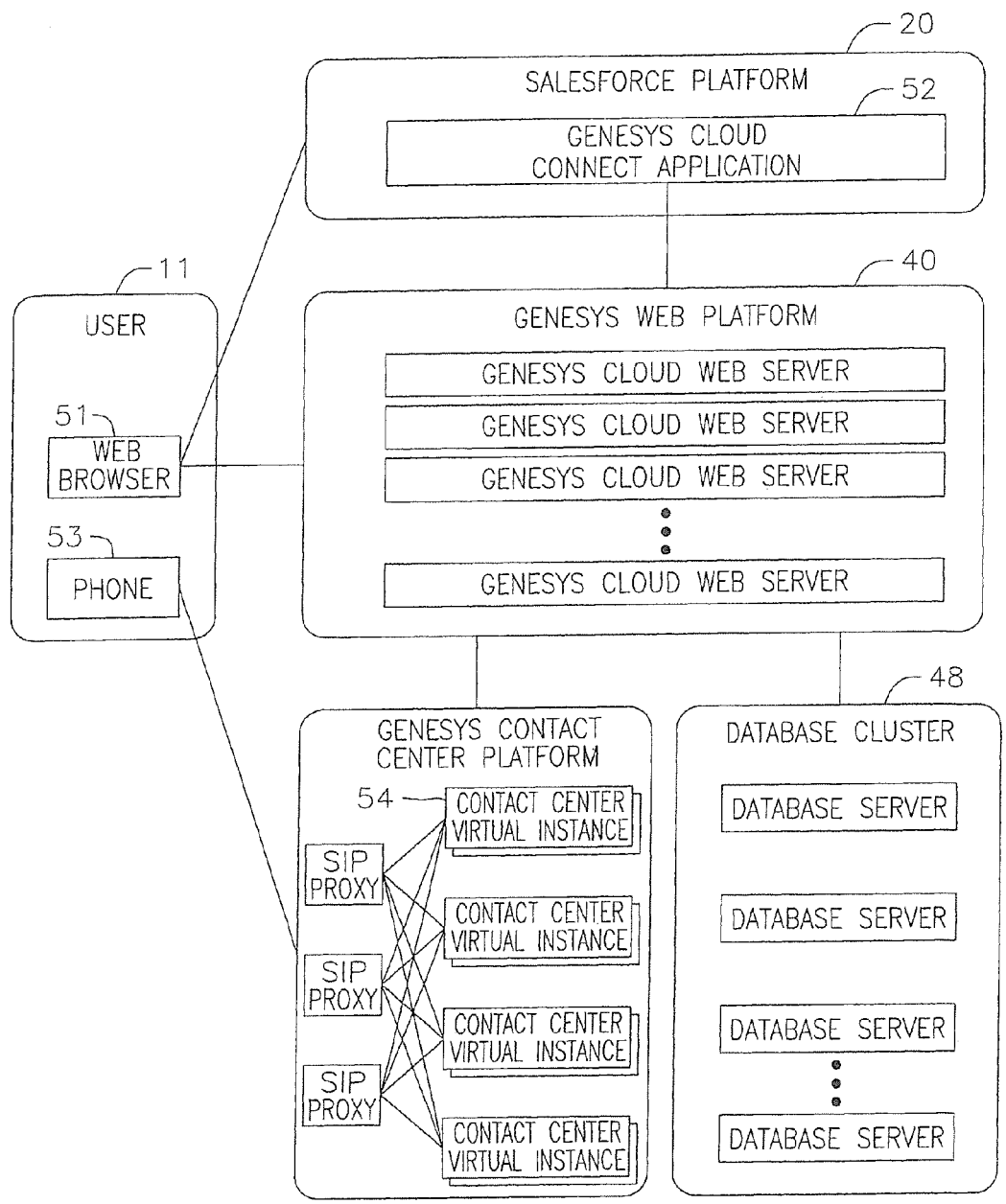
FIG. 2 is a more detailed schematic block diagram of portions of the system of FIG. 1 according to one embodiment of the invention.

FIG. 2 is a more detailed schematic block diagram of portions of the system of FIG. 1 according to one embodiment of the invention. As illustrated in FIG. 2, the agent 11 or administrator for a contact center 12 (hereinafter collectively referred to as contact center worker) has access to a computer having a web browser 51, and a phone 53 capable of VoIP communication. The web browser may be invoked to access the third party web platform 20 for remotely conducting administrative tasks for the contact center and/or other call center agent activities. The third party web platform 20 hosts a specialized application 52 stored in a memory and, which is configured to be executed by a microprocessor. The specialized application 52 running on the third party platform 20 may be dedicated to contact center management activities.

According to one embodiment of the invention, the contact center worker accesses the specialized application 52 by logging into a web portal provided by the third party platform 20. The web portal identifies the user as a contact center worker based on the user's login information, and automatically invokes the specialized application 52 to render the graphical user interface appropriate for contact center management activities. Thus a single login into the web portal acts also as a login to the specialized application 52 to seamlessly invoke the application and provide an appropriate UI that is integrated into the web portal to give the look and feel of a single integrated application that is providing the contact center management functionalities.

According to one embodiment of the invention, the specialized application 52 migrates data from the third party web platform (or another database) to the specialized application 52 for modifying or extending such data and making it appropriate for use in a contact center setting. For example, user profile information stored by the third party web platform may be migrated and integrated into the specialized application to extend the user's profile by adding information that is relevant for a contact center setting. For example, the user's profile may be extended to add, for example, the user's role (e.g. contact center agent and/or contact center administrator), and the user's skills (e.g. language skills).

Referring again to FIG. 2, the specialized application 52 accesses the web server 40 in the remote computing environment 24 for engaging in administrative tasks such as, for example, dynamically configuring and deploying a contact center, real-time reconfiguration of a contact center, real-time monitoring of a contact center, and/or for conducting other activities typical for a call center agent. The contact center worker may also access the web server 40 over the Internet directly without invoking the specialized application 52. The specialized application may also be hosted by the web server 40 or in any other application server as will be apparent to a person of skill in the art.

The web server 40 is coupled to one or more computers running instances of one or more virtual machines for one or more contact center tenants. Each virtual machine 54 may run a server used for providing a contact center service such as, for example, routing server, SIP server, media server, database server, and statistics server 42-50 described with reference to FIG. 1. Exemplary contact center services include but are not limited to processing inbound voice call, outbound voice calls, email processing, social media message processing, chat processing, call recording, interactive voice response (IVR) processing, workforce management, and administrative functions such as, for example, real time reporting, historical reporting, contact center configuration, and the like. According to one embodiment, the virtual machines share the database servers 48 for storing data relevant to contact center operations.

According to one embodiment, the configuration server 41 in the remote computing environment 24 runs a configuration script for automatically instantiating a virtual machine for a contact center in the remote computing environment 24 according to desired parameters specified by a worker. One of such parameters may be, for example, the size/capacity of the contact center. According to one embodiment, the configuration engine dynamically allocates a virtual machine having a size that corresponds to the size specified by the user. For example, in response to a user indicating that a contact center capable of supporting 100 agents is desired, the configuration script dynamically instantiates a virtual machine capable of supporting 100 agents. If, however, the contact center grows, and the contact center needs support for 1000 agents instead of a 100, the configuration engine is configured to dynamically instantiate a bigger virtual machine capable of supporting 1000 agents. According to one embodiment, the configuration script is invoked to automatically reload the contact center data from the current virtual machine to the new virtual machine. The configuration script also automatically updates any relevant servers such that incoming traffic is directed to the correct virtual machine. Thus, according to an embodiment of the invention, a contact center may be configured and deployed automatically in the remote computing environment, and reconfigured and redeployed automatically if necessary, for example, to scale up or down the capabilities of the contact center, all without requiring physical installations of hardware and software at the tenant premises, and without downtime associated with such physical installations which negatively affect contact center operations.

Additionally, the configuration engine may dynamically reconfigure a contact center's logic relating to the routing or flow of interactions, and/or other logic operations. For example, in response to a contact center worker requesting that the contact center be capable of routing calls based on a language selection of English or Spanish by a caller, the configuration script dynamically configures the contact center's routing strategy to allow it to prompt the caller to select English or Spanish, and to direct the call to an agent queue based on the selection. Thus, according to an embodiment of the invention, a contact center may be reconfigured and redeployed automatically based on different types of requirements by automatically reconfiguring the virtual machine associated with the contact center.

According to another embodiment of the present invention, the remote computing environment 24 may run a monitoring script so that a contact worker may monitor real-time activity, review historical data, and/or simulate conditions of the contact center. Here, the contact center worker may login into the web portal to seamlessly invoke a monitoring application that may be integrated with the contact center management UI to give the look and feel of a single integrated application that is providing the contact center configuration and monitoring functionalities. The contact center management UI may visually depict contact center data, such as contact center logic, current contact flows, abandonment rate, average call time, and the like, such that the data may be easily and readily apparent to the contact center worker. The contact center data may be provided from, for example, the statistics server 50.

According to another embodiment, a contact center monitoring script and UI may be provided independently of the contact center configuration script and UI.

FIGS. 3-21 are screen shots of various example screens illustrating aspects of the graphical user interface (UI) of the specialized application 52 according to one or more embodiments of the present invention. A person of ordinary skill in the art should recognize that the graphical user interface may be provided by, for example, the third-party web platform 20, the web server 40, or one or more servers of the remote computing environment 24, but is not limited thereto. For example, the graphical user interface may be provided by an application server on contact center premises or hosted remotely in the remote computing environment. For simplicity purposes, however, embodiments of the present invention are described in terms of the specialized application 52 as rendering the graphical user interface.

According to one embodiment, the specialized application 52 may recommend routing strategies to contact center workers according to, e.g., industry best practices. The graphical user interface may also be used for intuitively guiding a contact center worker step-by-step in configuring a routing strategy according to the specific contact center's business needs. According to one aspect of the present invention, the graphical user interface may be used for monitoring and/or simulating the operation of the contact center.

Figure 3:
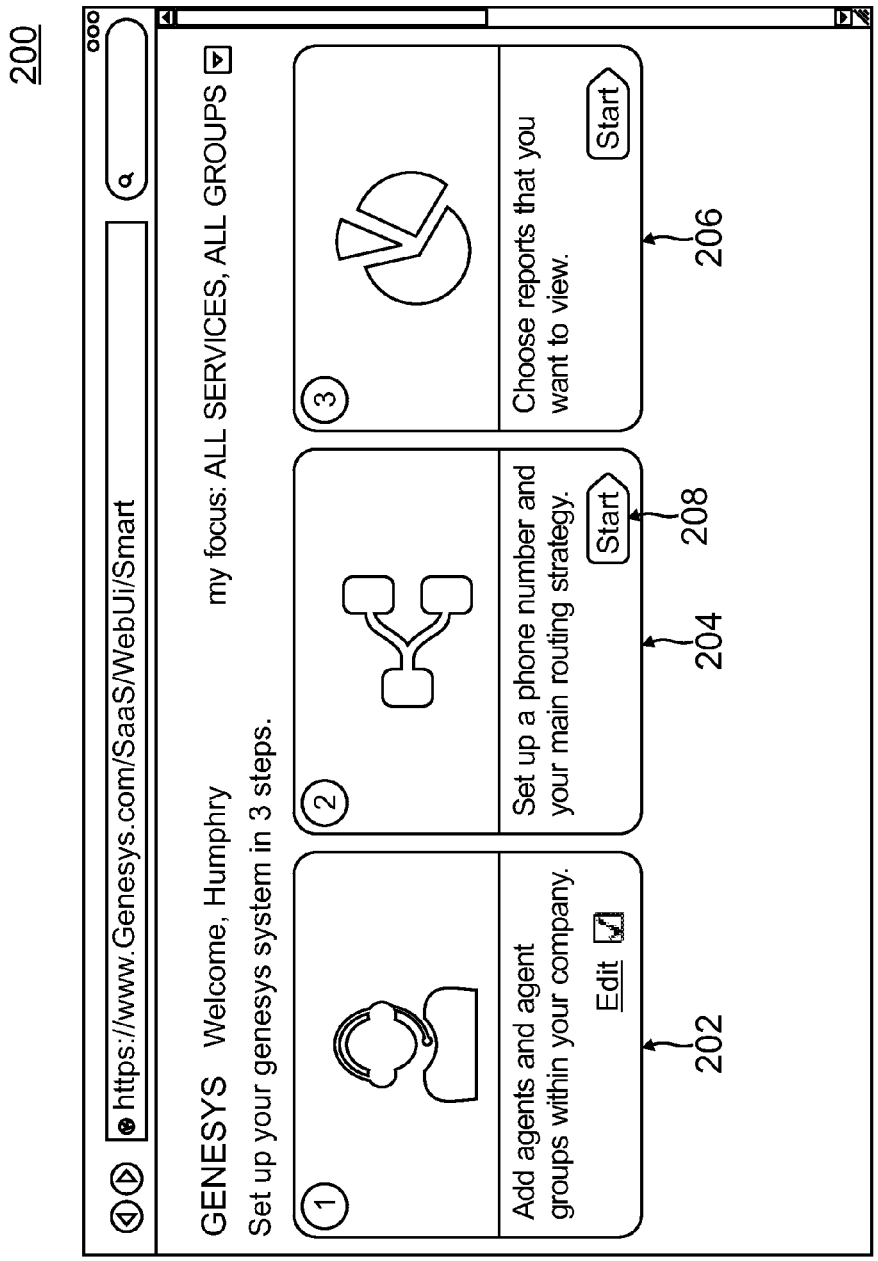
FIG. 3 is a screen shot of a UI page for guiding a contact center worker in configuring a contact center according to one embodiment of the invention.

FIG. 3 is a screen shot of a UI page 200 for guiding a contact center worker in configuring a contact center according to one embodiment. The UI page 200 may be one of the first pages a contact center worker is presented with after logging in. For example, the UI page 200 may be a start page upon first use of the specialized application 52. Here, when a contact center worker logs in for setting up the contact center, the specialized application 52 renders a UI page with various configuration and/or management options. Such options may include, for example, an agent management option 202, a routing configuration option 204, and a report management option 206.

When the contact center worker selects the management option 202, another UI page is generated to enter agent information, such as, agent groups, agent skills, agent profiles, and the like. In one embodiment, the agent information is stored on the database server 48 for later use, including for use when configuring a routing strategy, viewing reports, or monitoring a call center. While the agent management option 202 has been described in relation to an initial setup operation, the agent management option may also be selected for editing or updating agent information, for example, to add or update agent profiles, groups, or skills. According to one embodiment, the contact center worker is directed to complete the agent management option 202 before selecting the routing configuration option 204 or the report management option 206.

When a contact center worker selects the routing configuration option 204, for example by selecting (e.g., clicking) the start button 208, a routing UI page is generated to receive data, for example, routing logic information and contact center parameters. According to one embodiment, by selecting the routing configuration option 204, the contact center worker invokes the configuration script of the specialized application 52. The routing configuration option 204 may be selected after the agent management option 202 has been completed by the user to configure a contact center (e.g., a first setup); however, the present invention is not limited thereto, and the routing configuration option 204 may be invoked after the first setup to reconfigure an existing contact center (e.g., real-time reconfiguration) and/or monitor the contact center. The routing configuration option 204 is described in greater detail below.

When a contact center worker selects the report management option 206, a report UI page is generated to view reports regarding the contact center. The report UI may be generated according to a report script of the specialized application 52. In one embodiment, the report UI displays contact center information in such a way that the contact center information may be readily and clearly communicated to a contact center worker. Contact center information may include, total abandoned calls, call abandon rate, number of calls per agent skill group, call volume, productivity, call rate, and the like. The data associated with the contact center information may be provided by the remote computing environment 24. For example, the data may be stored in the database server 48 and analyzed by the statistics server 50.

Hereinafter, a routing configuration graphical user interface according to one embodiment of the invention is described in greater detail with reference to FIGS. 4-21.

Figure 4:
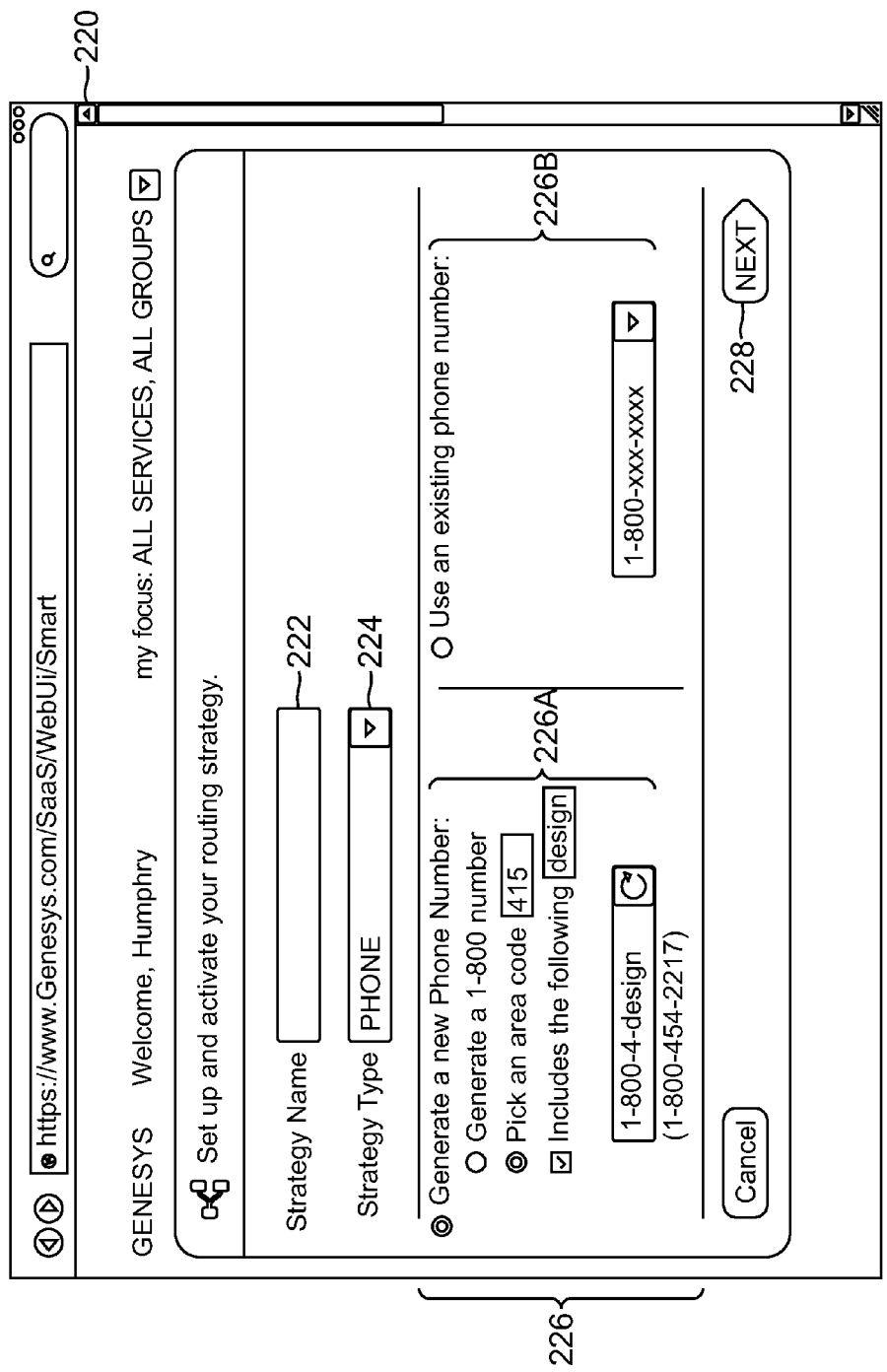
FIG. 4 is a screen shot of a UI page rendered upon selection of a routing configuration option according to one embodiment of the invention.

FIG. 4 is a screen shot of a UI page 220 rendered upon selection of the routing configuration option 204. According to one embodiment the UI page 220 prompts the user for initial routing configuration information, such as a routing name, a routing strategy type, and a contact center phone number. For example, the UI page 220 may display a strategy name entry field 222, a strategy type entry field 224, and a phone number entry field 226 to receive the initial routing configuration information from the contact center worker.

The strategy name entered by the contact center worker, may be used to identify a particular routing strategy and to differentiate the particular routing strategy from other routing strategies. For example, the user may name a first strategy "Main Line" to associate this routing strategy with the main customer service line and to differentiate the routing strategy from that of a preferred customer service line, which may be named "Preferred Line." Additionally, the contact center worker, may select a strategy type (e.g., select from a drop down menu 224). Strategy types may include, phone, text chat, voice chat, and the like. According to one embodiment, the selection of the strategy type changes the default routing templates available for selection. For example, if the phone strategy type is selected, templates associated with call center best practices may be presented to the contact center worker for selection in a subsequent step.

The UI page 220 may display a phone number entry field 226 for the contact center worker to associate a particular phone number with the routing strategy. In the exemplary embodiment of FIG. 4, the phone number entry field 226 includes a phone number generation field 226A and an existing phone number entry field 226B. Here, the contact center worker may elect to enter a predetermined phone number via the existing phone number entry field 226B, or have a new phone number generated via the phone number generation field 226A. According to one embodiment, the phone number entry field 226 may not be presented when the phone strategy is not selected.

The phone number generation field 226A, according to one embodiment, has entry fields for receiving parameters for the phone number generation. For example, the phone number generation field 226A may have an entry field for selecting a 1-800 number, entering an area code, entering a phrase, and the like. After the parameters are entered, the specialized application 52 may generate a phone number according to the parameters (numbers which are unavailable may be excluded). For example, if a contact center worker enters the area code "415" and the phrase "design," the specialized application 52 may generate the phone number "1-415-4-DESIGN". The generated number may then be associated with the particular routing strategy.

After the initial routing configuration information has been entered, the contact center worker may advance to the routing strategy configuration by, for example, selecting a "NEXT" button 228.

Figure 5:
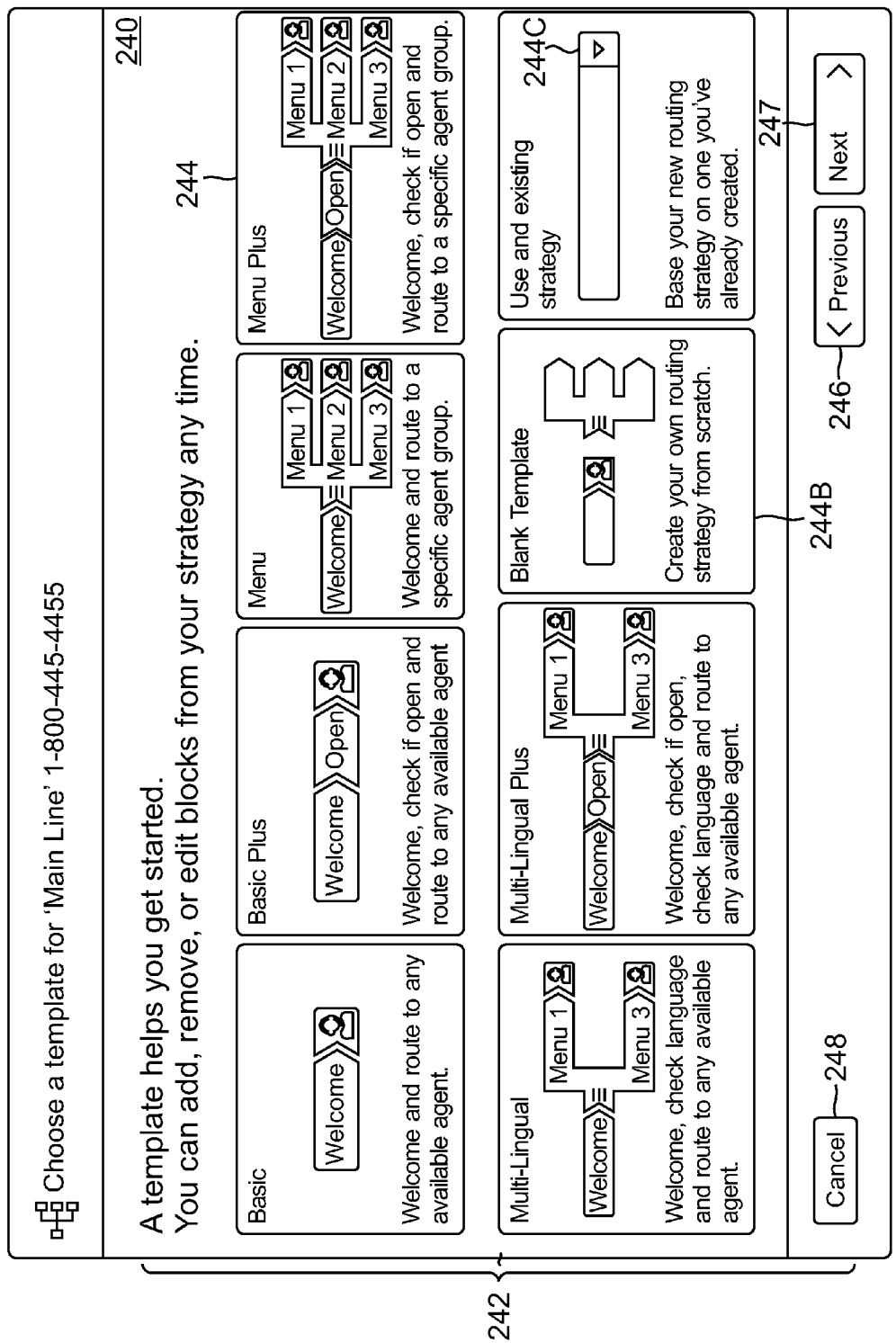
FIG. 5 is a screen shot of a UI page for selecting a routing template for a particular routing strategy identified in FIG. 4 according to one embodiment of the invention.

FIG. 5 is a screen shot of a UI page 240 for selecting a routing template for the particular routing strategy identified in FIG. 4. The UI page 240, according to one embodiment, displays a routing template selection menu 242 that includes a plurality of routing templates 244 for selection by the contact center worker. According to one embodiment, the template selection menu 242 displays predefined routing templates 244A, a blank canvas template 244B, and an existing template 244C.

The predefined templates 244A may be standard templates that are preloaded in the specialized application 52. According to one embodiment, the predefined templates 244A correspond to industry best practice routing design. The predefined templates 244A may include a basic template, a basic plus template, a menu template, a menu plus template, a multi-lingual template, and a multi-lingual plus template, but are not limited thereto. Additional predefined templates 244A may be available for selection through a template library; the template library may be an online template library. According to an embodiment of the present invention, the predefined templates may be change-protected, configurable, or a hybrid thereof. For example, a template may include a change-protected parent routing strategy with configurable individual sub-branches included within the parent strategy.

According to one embodiment, the basic template corresponds to a routing strategy including a welcome operation and a route to agent operation; the basic plus template corresponds to a routing strategy including a welcome operation, an hours operation, and a route to agent operation. The menu template corresponds to a routing strategy including a welcome operation, a menu operation, and a route to agent operation. The menu plus template corresponds to a routing strategy including a welcome operation, an hours operation, a menu operation, and a route to agent operation. A multi-lingual template corresponds to a routing strategy including a welcome operation, a language selection operation, and a route to agent operation. The multi-lingual plus template corresponds to a routing strategy including a welcome operation, an hours operation, a language selection operation, and a route to agent operation. Of course, embodiments of the present invention are not limited to these types of operations. Other routing strategy operations will be evident to a person of skill in the art.

According to one embodiment, each predefined template 244A provides a visual representation of the general routing strategy that it represents to clearly and readily communicate that strategy to the contact center worker (e.g., communicate at-a-glance). The contact center worker may select a particular routing template 244 by clicking on the visual representation of the particular routing strategy.

According to one embodiment, the blank canvas template 244B does not correspond to a predefined reporting strategy, but instead, represents an option for the contact center worker to define a custom routing strategy. When the contact center worker selects the blank canvas template 244B, the specialized application 52 may execute a routing strategy editing script. Additionally, when the contact center worker selects the existing template 244C, another UI page or a pop-up menu may be displayed so that the contact center worker can select from previously created routing strategies.

To go back to a previous routing strategy configuration page (e.g., the UI page 220 to change the initial routing configuration information), the contact center worker may select a "PREV" (or previous) button 246. However, to proceed with configuring the routing strategy, a "NEXT" button 247 may be selected. According to one embodiment, when the "NEXT" button 247 is selected, the routing strategy editing script is initialized. If, however, the contact center worker wants to cancel the configuration of the routing strategy, a "CANCEL" button 248 may be selected.

Figure 6:
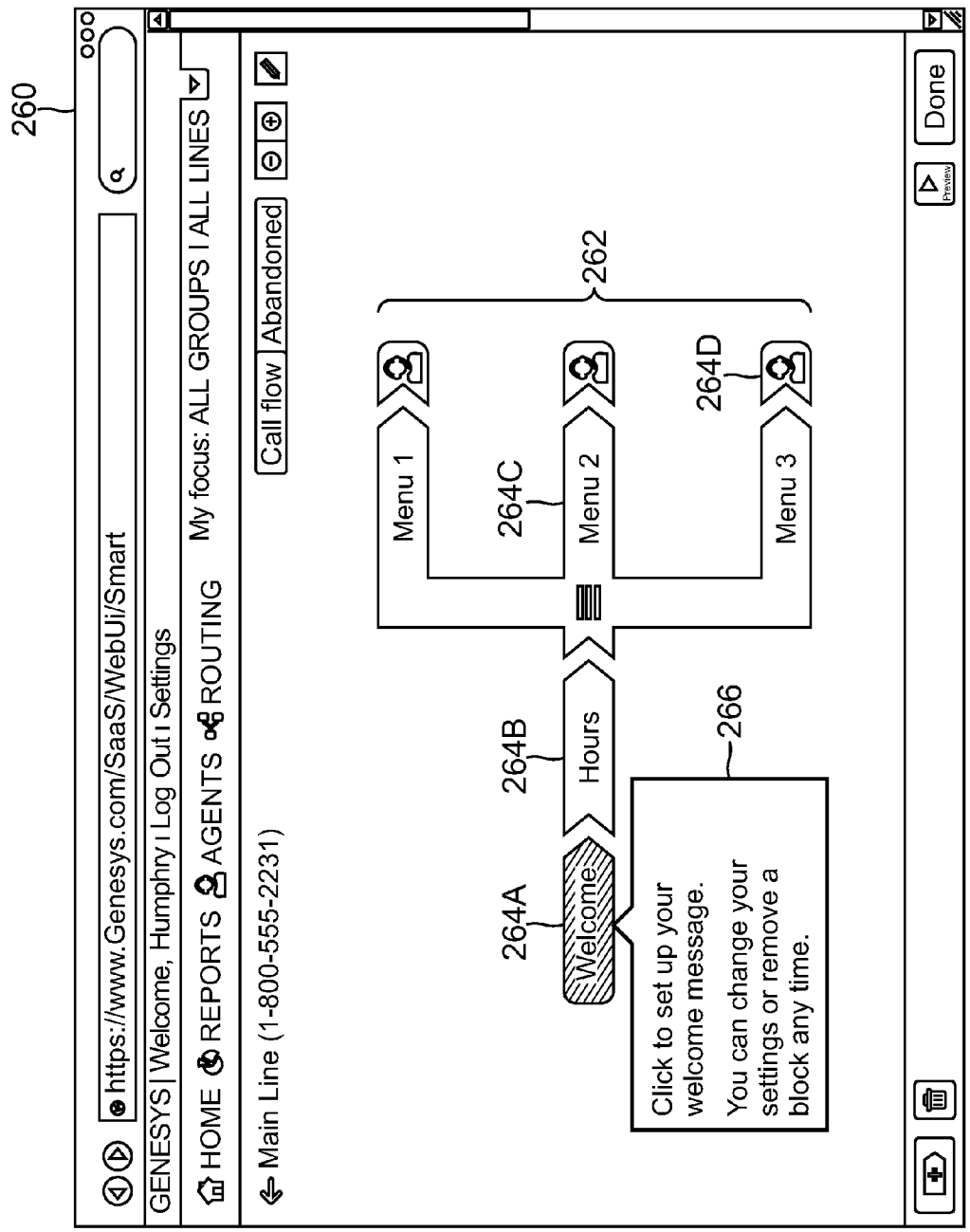
FIG. 6 is a screen shot of a UI page rendered in response to selection of a particular routing template in the UI page of FIG. 5 according to one embodiment of the present invention.

FIG. 6 is a screen shot of a UI page 260 rendered in response to selection of a particular routing template in the UI page 240 (e.g. the menu plus routing template 244A) according to one embodiment of the present invention. The UI page 260 may be generated according to the routing strategy editing script of the specialized application 52.

According to one embodiment, the UI page 260 displays a routing strategy diagram 262 including various configurable blocks 264A-D (collectively referred to as blocks 264). According to an embodiment of the present invention, the blocks 264 visually represent the configurable operations of the routing strategy (or routing logic steps). According to one embodiment, the blocks are laid out intuitively by depicting the flow of an interaction that is to be handled by the routing strategy. In this regard, the routing strategy diagram 262 is configured to give a birds-eye view of the routing strategy to enable a contact center worker (who may not be an expert in contact center routing strategy) to intuitively understand the flow of contact interactions (e.g., phone calls) through the contact center.

According to one embodiment, the routing strategy diagram 262 resembles a logic tree (or decision tree) without loops or merging of branches. In this regard, the routing strategy diagram may be a simplified flow diagram to provide at-a-glance understanding of the routing strategy. For example, as illustrated in FIG. 6, the blocks 264 may be coupled to each other to indicate how the contact events flow through the contact center and/or to indicate specific treatment of the events via the discrete blocks. According to some embodiments, the routing strategy diagram includes loops and/or merged branches.

According to one embodiment, the blocks 264 may include start blocks 264A, intermediate blocks 264B, branch blocks 264C, end blocks 264D, and the like. However, a person of ordinary skill in the art should realize that embodiments of the present invention are not limited to the blocks or template block structures defined herein, but may include numerous other blocks or block structures suitable for use in a contact center routing strategy. For example, embodiments of the present invention may include merging blocks or loop blocks, or may include block structures of a predefined or arbitrary length.

A start block 264A may represent a first operation executed when a new contact interaction begins (e.g., when a new call is received). An example of a start block 264A is a welcome block. According to one embodiment, the start block 264A is coupled to at least one other block 264, which represents a next operation to be executed in the particular routing strategy of the call center. For example, in the embodiment illustrated in FIG. 6, the welcome block is coupled to an hours block.

Additionally, as shown in FIG. 6, the start block 264A (or any other block 264) may indicate the direction of the routing flow (e.g., by an arrow).

The intermediate block 264B may represent an intermediate operation of the contact center routing strategy, e.g., an operation executed in-between the start block 264A and the end block 264D. Examples of an intermediate block 264B include, without limitation, an hour block, a message block, a hold block, and the like. According to one embodiment, the intermediate block 264B is coupled to at least two other blocks 264 (e.g., the previous and subsequent blocks in the routing strategy). For example, in the embodiment of FIG. 6, the hours block is coupled between the welcome block and the menu block.

A branch block 264C may represent a branch operation of the contact center routing strategy. The branch operation, according to one embodiment, includes a decision operation (or a path selection operation), where an end user 14 (or other entity), is presented with at least two options for selection, and the routing path changes according to the option that is selected by a customer. Examples of a branch block 264C include, without limitation, a menu block, a language block, a department selection block, a support selection block, a skill selection block, and the like. According to one embodiment, and as shown in FIG. 6, the branch block 264C is visually represented by a branch and is coupled to a previous block and at least two subsequent blocks in the routing strategy. For example, in the embodiment of FIG. 6, an input to the menu block is coupled to the hours block. The menu block has three branches (Menu 1, Menu 2, and Menu 3), and the output of each branch is coupled to a route to an agent block.

An end block 264D represents an operation that terminates a particular interaction flow. Examples of end blocks 264D include, without limitation, a route to agent block, a route transfer block, a route to message block, a voicemail block, an end interaction block, and the like. According to one embodiment, the end block 264D is coupled to at least one previous block. For example, in the embodiment of FIG. 6, the route-to-agent blocks are each coupled to one of the outputs of the menu block.

As described above, each of the blocks 264 represent a particular operation of the routing strategy, and when coupled together in a particular order to form the routing strategy diagram 262, they visually represent and efficiently communicate (e.g. at-a-glance) the routing strategy (or interaction flow) of the contact center. Not only does this visual representation aid the contact center worker in understanding the final (e.g., implemented) routing strategy of the contact center, but also, it aids in the configuration and build process of a particular routing strategy.

While, according to one embodiment, a routing template 244 selected from the UI page 240 may be preconfigured with default parameters to enable out-of-the-box setup of a contact center, aspects of the present invention provide for further configuration and customization of the routing strategy. This may be communicated to the contact center worker by, for example, displaying a pop-up window 266 inviting the contact center worker to configure parameters of the blocks 264 or add/remove/move blocks 264.

According to one embodiment, the contact center worker may configure (e.g., input parameters of) a particular block 264 by selecting (e.g., clicking on) the particular block in the routing strategy diagram 262. By visually displaying the routing strategy as an association of blocks 262, the contact center user may easily determine where the block is in relation to the overall routing strategy, which aids in the block configuration process.

According to one embodiment, another UI page is rendered upon selection of one of the blocks 264 enabling the contact center worker to input the parameters associated with the selected block 264. Examples of configuring particular blocks 264, according to one embodiment, are described hereafter in connection with FIGS. 7-11.

Figure 7:
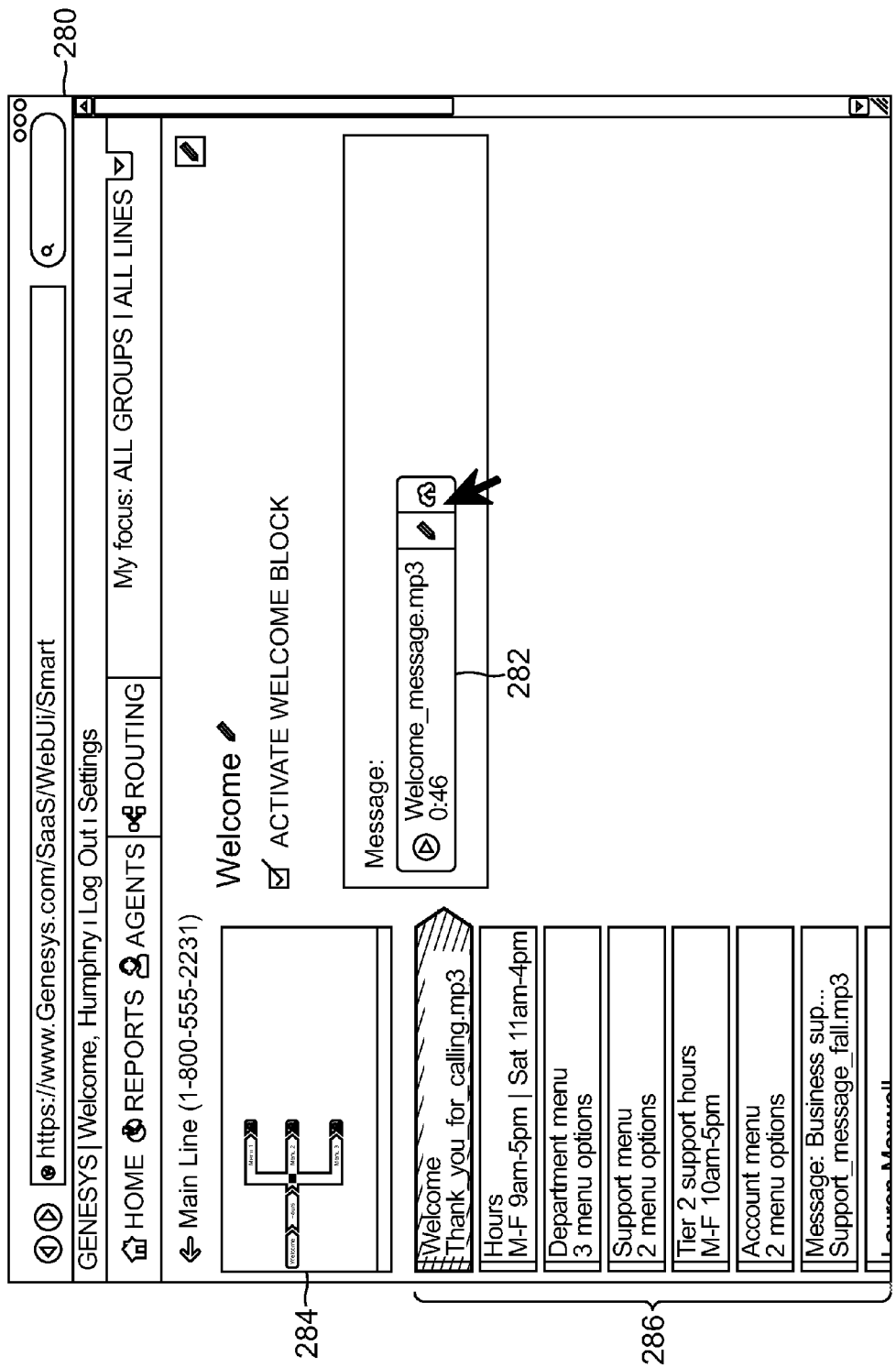
FIG. 7 is a screen shot of a UI page rendered upon selection of a welcome block in the UI page of FIG. 6 according to one embodiment of the invention.

FIG. 7 is a screen shot of a UI page 280 rendered upon selection of the welcome block of FIG. 6 according to one embodiment of the invention. The UI page 280 displays the parameters associated with the welcome block that the contact center worker may configure. For example, in the embodiment shown in FIG. 7, the contact center worker may configure the welcome message that is played to a customer calling into the contact center. The welcome message may be configured via a message configuration field 282. According to one embodiment, the message configuration field includes a playback function, a text-to-speech function, and a message selection function. The playback function, when selected, plays back the message currently associated with the welcome block (e.g., a greeting and an identification of the company). The text-to-speech function, when selected, may enable entry of text that is used to generate the message via a text-to-speech operation. The message selection function may enable the contact center worker to select an existing message file or to create a new message.

Figure 8:
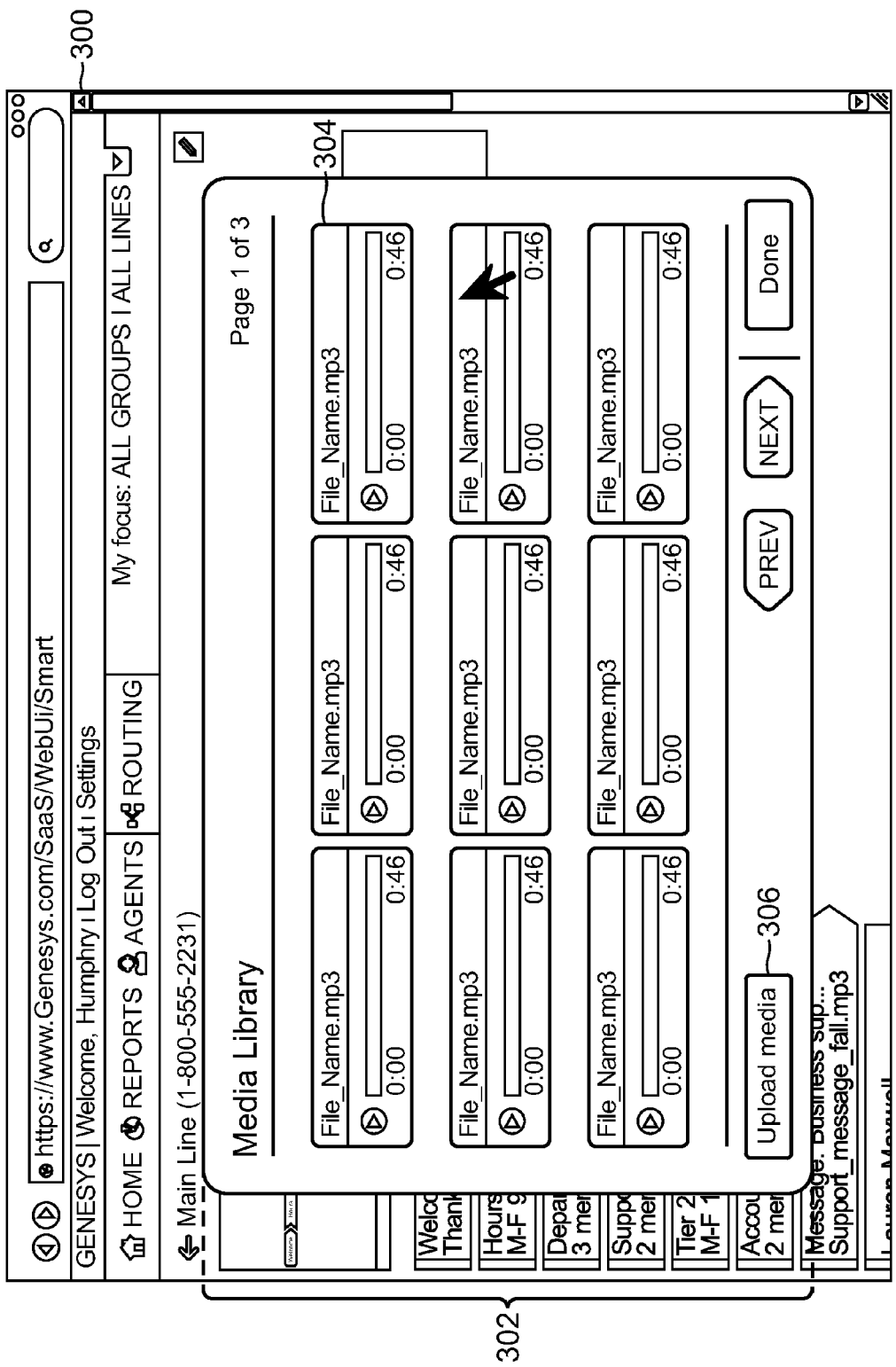
FIG. 8 is a screen shot of a UI page rendered upon selection of a message selection function in the UI page of FIG. 7 according to one embodiment of the invention.

According to one embodiment, when the message selection function is selected, a UI page 300 is rendered for the selection of the message, as shown in FIG. 8. The UI page 300 may display a media library 302 including a plurality of media files 304 for selection as the welcome message. Additionally, the contact center worker may have the option of uploading another media file to the media library 302 (for current or later selection). According to one embodiment, the media files 304 of the media library 302 are saved to and retrieved from the media server 46.

Referring again to FIG. 7, once the parameters for the selected block (e.g. the welcome block) are configured, the contact center worker may proceed to configure another block. The contact center user may select the next block for configuration by, for example, returning to the UI page 260 displaying the flow diagram 262 (e.g., by selecting a thumbnail display of the flow diagram 284) and clicking on a block 264, or by selecting a block from the block configuration tab 286. The block configuration tab 286 may highlight the currently selected block.

Figure 9:
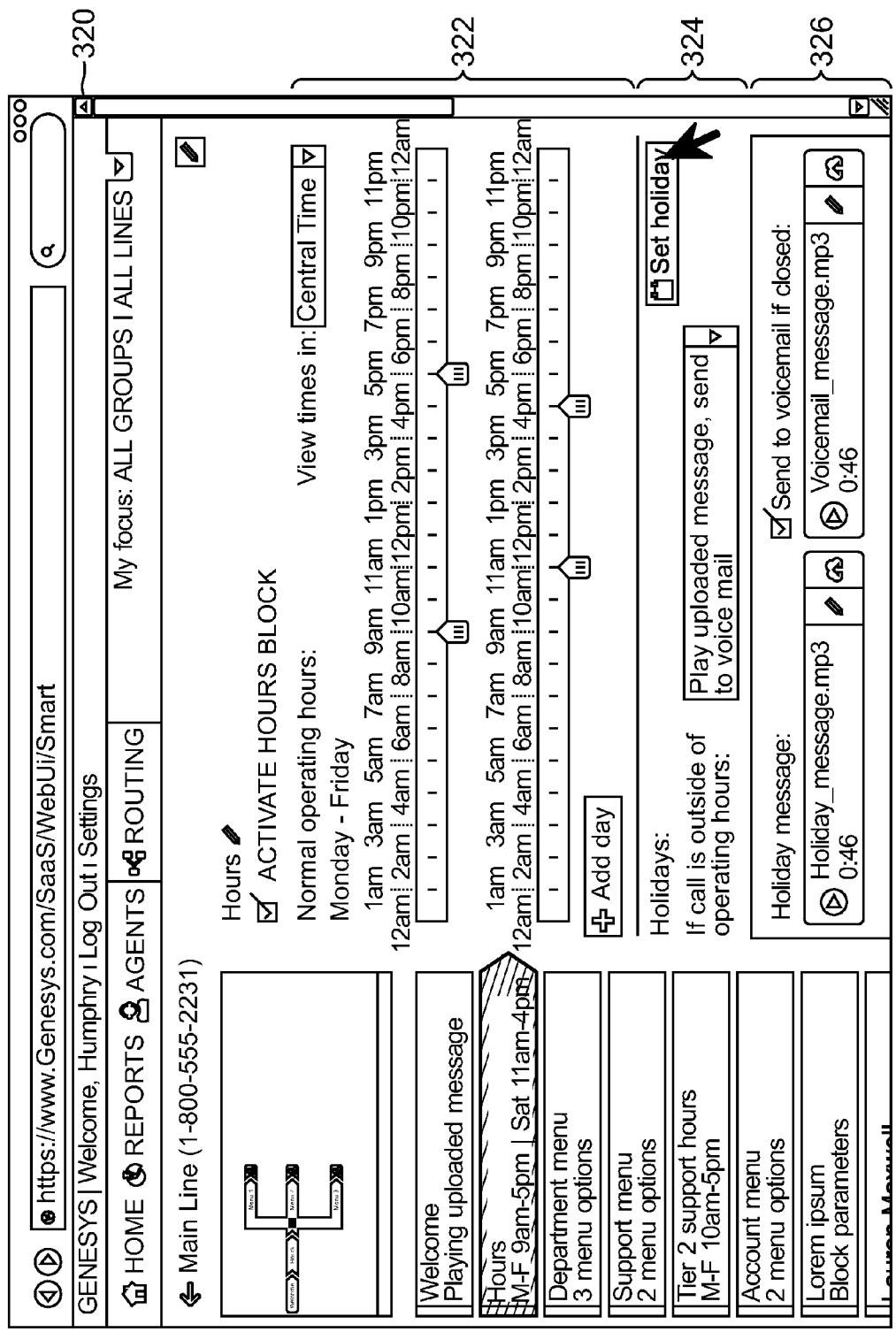
FIG. 9 is a screen shot of a UI page rendered upon selection of an hours block according to one embodiment of the invention.

FIG. 9 is a screen shot of a UI page 320 rendered upon selection of the hours block, according to one embodiment of the invention. The UI page 320 displays the parameters associated with the hours block that are available for configuration. According to one embodiment, the hours block represents an hours of operation function, which performs different operations according to a time and date of the interaction. For example, if an end user 14 calls during the normal operating hours, the hours block may pass the call through to the next block; or if an end user 14 calls on a holiday, the hours block may play a holiday message and/or route to voicemail. To this end, the hours block may have a normal hours input field 322, a holiday input field 324, and a message input field 326.

According to one embodiment, the normal hours input field 322 includes sliders which allow the contact center worker to select a time frame of the normal hours of operation. Different sliding bars may be associated with different days of the week. The holiday input field 324 may enable a contact center worker to enter holidays, for example, by selecting days on a calendar. The message input field 326 may allow a contact center worker to configure a message to be played when an interaction occurs outside the normal hours of operation or on a holiday. The messages may be selected from the media library 302.

Figure 10:
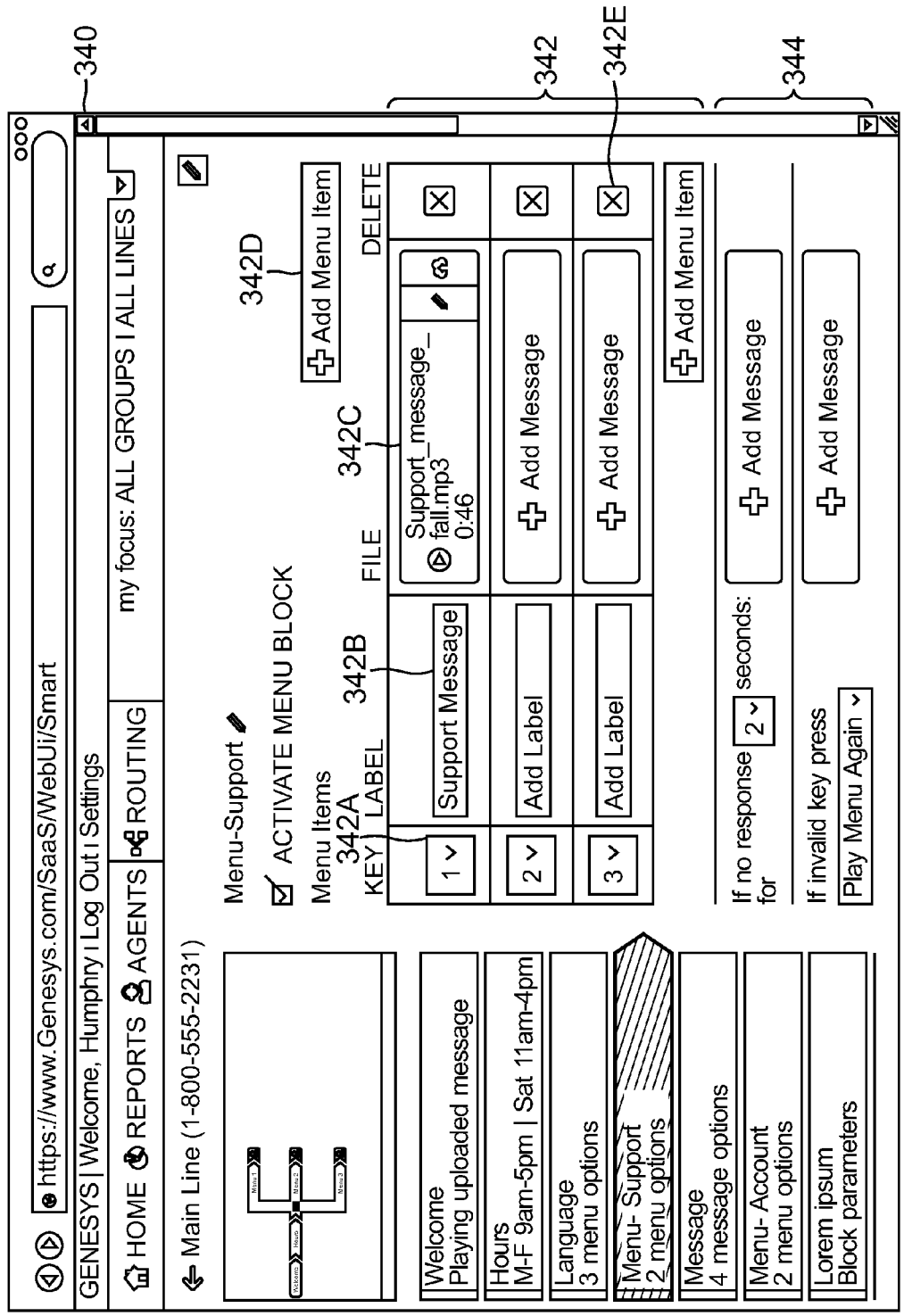
FIG. 10 is a screen shot of a UI page rendered upon selection of a menu block for configuration, according to one embodiment of the invention.

FIG. 10 is a screen shot of a UI page 340 rendered upon selection of the menu block for configuration, according to one embodiment. The UI page 340 may allow for the creation of menu items and menu operations. The UI page 340 of FIG. 10 includes a menu creation field 342 and a contingency field 344.

The menu creation field 342 may include a key sub-field 342A, a label sub-field 342B, a file sub-field 342C, an add menu item button 342D, and a delete menu item button 342E. The key sub-field 342A is for defining the association of a menu item with a key entry (e.g., on a touch-tone phone). The label sub-field 342B is for naming each menu item. The file sub-field 342 is for the selection of a media file associated with the menu item (e.g., a message describing the menu item). The media file may be selected from the media library 302 or entered as text-to-speech. The add menu item button 342D and the delete menu item button 342E enable the addition or deletion of menu item fields. According to one embodiment, by adding or deleting menu items, the menu block shown in the routing strategy diagram 262 includes more or fewer branches.

According to one embodiment, the contingency field 344 enables configuration of contingency events if, for example, no menu item or an invalid menu item is selected.

While the above description is in relation to a menu block, a person skilled in the art should recognize that aspects of the menu block are relevant to other branch blocks 264C, for example, a language block (for selecting a language), a business division block (for selecting which division of a business the interaction is related to), an account block (for selecting which account the interaction is related to), and the like.

Figure 11:
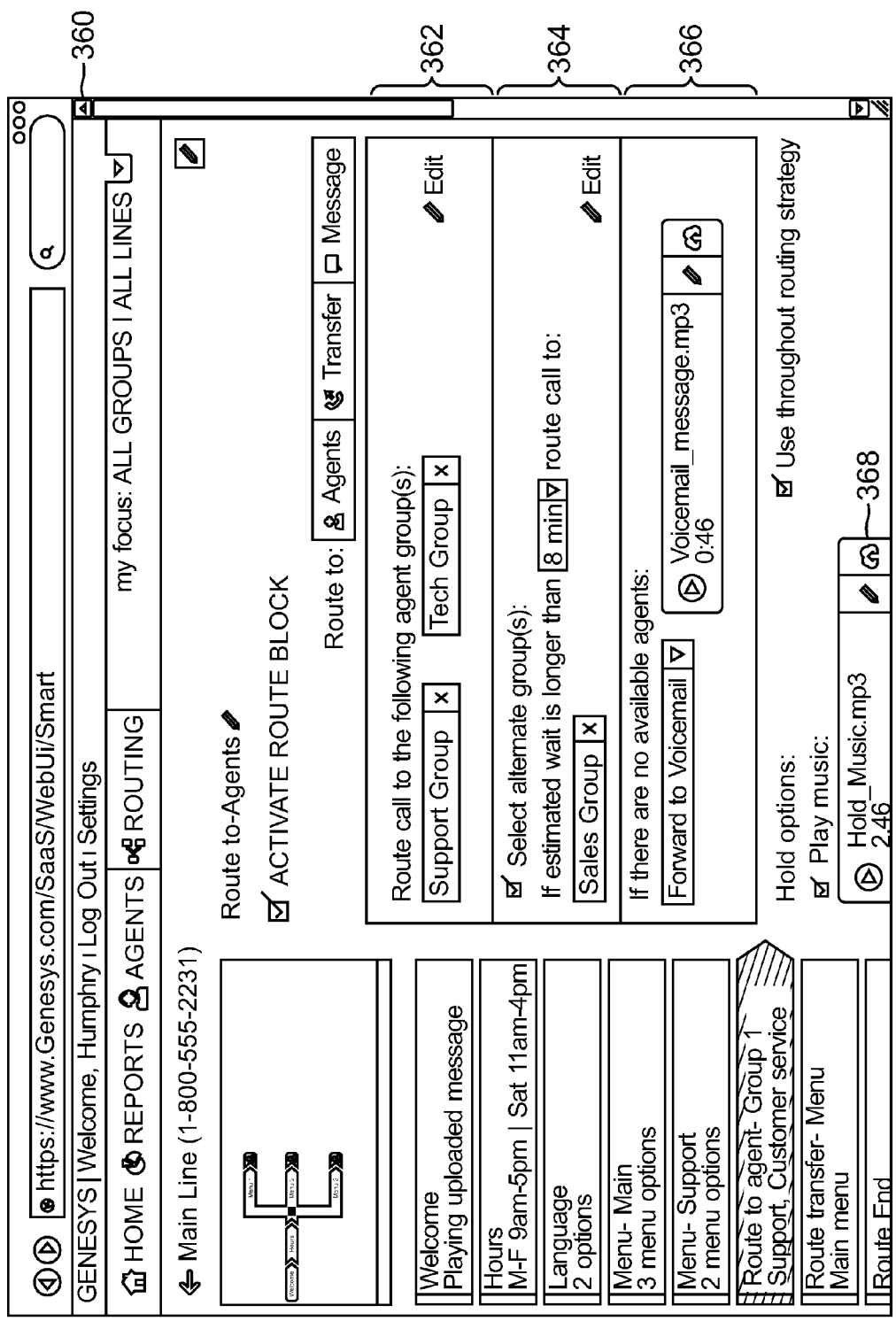
FIG. 11 is a screen shot of a UI page rendered upon selection of a route to agent block according to one embodiment of the invention.
Figure 12:
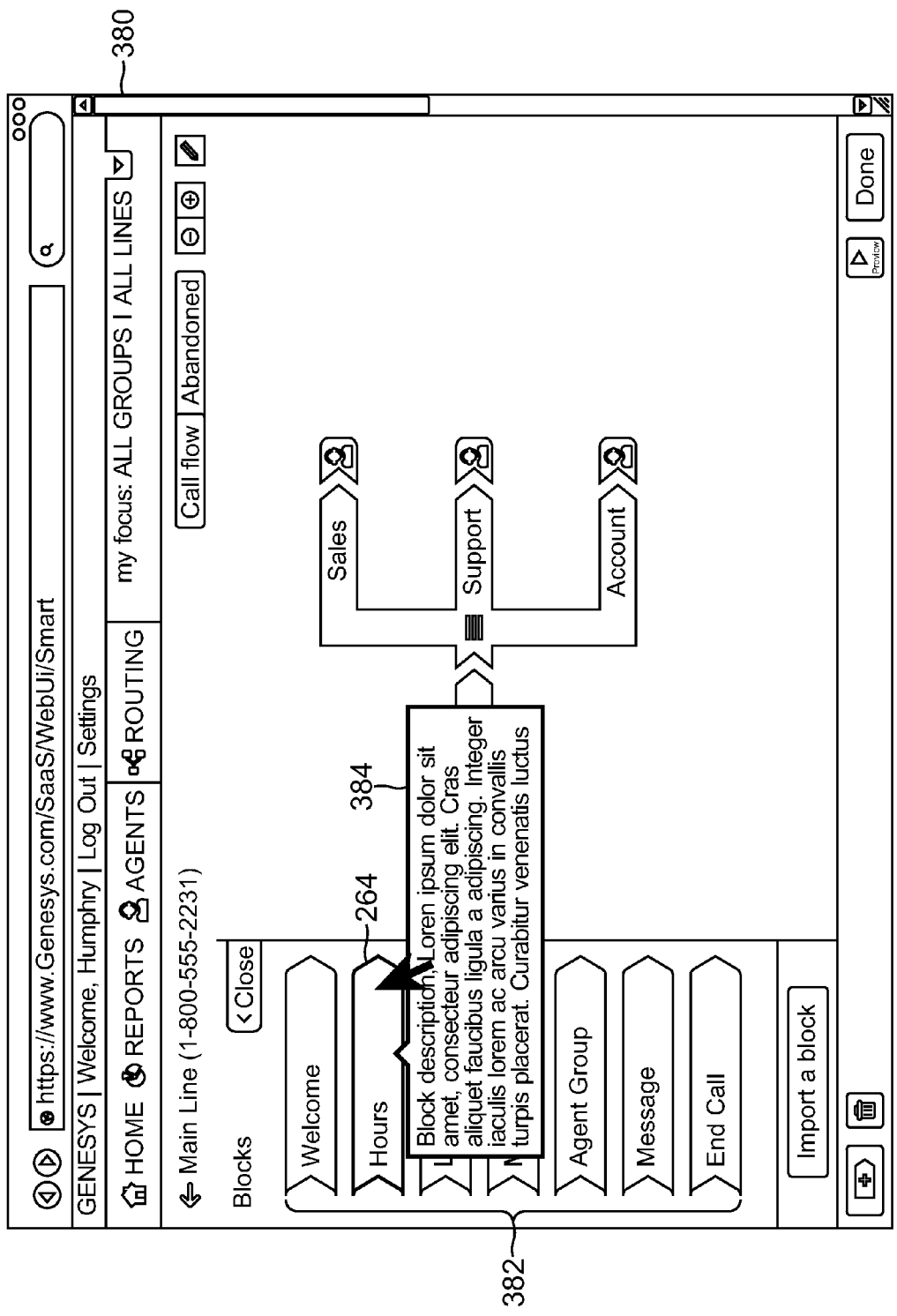
FIGS. 12-15 are screen shots of a UI page rendered by a specialized application for composing a routing strategy according to one embodiment of the invention.

FIG. 11 is a screen shot of a UI page 360 rendered upon selection of a route to agent block according to one embodiment. The UI page 360 in FIG. 11 includes a main agent group field 362, an alternative agent group field 364, a contingency field 366, and a hold option field 368. According to one embodiment, the main agent group field 362 is for receiving the preferred agent groups (or skill groups) to be associated with the route to agent block; and the alternative agent group field 364 is for receiving the secondary agent groups to be associated with the route to agent block. The groups (e.g., skill groups) available for selection may correspond to the groups created in the agent configuration operation 202. According to one embodiment, the preferred agent group is the agent group that the routing logic first attempts to route the interaction (e.g., a call) to, and the alternative agent group is the backup group to route to if a definable condition (e.g., estimated wait time longer than a set amount) occurs.

The contact center worker may configure a contingency option with the contingency field 366 to define an operation to be executed if no agents are available (e.g., forward to voicemail, route transfer, etc.). The contact center worker may also configure hold music (e.g., by selection from the media library 302).

While the above description relates to a route to agent block, a person of ordinary skill in the art should recognize that aspects of configuring the route to agent block are applicable to other end blocks 264D, for example, a route transfer block (for sending the interaction to another routing strategy), a route to voicemail block (for sending a call to a voicemail box), and the like.

In addition to configuring the parameters of the blocks 264 of the routing strategy, according to one embodiment, the routing strategy itself may be configured (or built e.g., from the blank template 244B). Additionally, because the routing strategy may be displayed in the simplified birds-eye-view, the contact center worker is aided by being able to intuitively understand the flow of interactions through the contact center when configuring (or designing) the routing strategy.

FIGS. 12-15 are screen shots of a UI page 380 rendered by the specialized application 52 for composing a routing strategy according to one embodiment. A contact center worker may compose the routing strategy from scratch, or based on a preset template. In this regard, the UI page 380 may display a block toolbar area 382. In the illustrated embodiment, the block toolbar area 382 includes a plurality of blocks 264 available for use in defining the routing strategy for the contact center and building the routing strategy diagram 262. The blocks 264 in the block toolbar area 382 may correspond to basic building blocks of routing strategies according to best practices. According to the embodiment of FIG. 12, when a contact center worker hovers a cursor over a block 264 in the block toolbar area 382, a description of the block is displayed, for example, in a pop-up window.

An aspect of the present invention provides for visual configuration of a routing strategy using the routing strategy diagram 262 and blocks 264. According to one embodiment, the routing strategy is defined by the blocks, and the location of those blocks relative to one another. Thus, in composing a routing strategy, an administrator selects an appropriate block from the block toolbar area that is to provide a desired treatment for an interaction, and further identifies a location on a workspace area 390 where the selected block should be inserted relative to other blocks that may already be positioned in the workspace area. The identification of the location where the selected block should be inserted may be done via any conventional mechanism in the art. According to one embodiment, a user may import a block from an external source upon actuating an "import" option 392. The imported block appears in the block toolbar area 382 and is available for being selected by the administrator in building a routing strategy.

Figure 13:
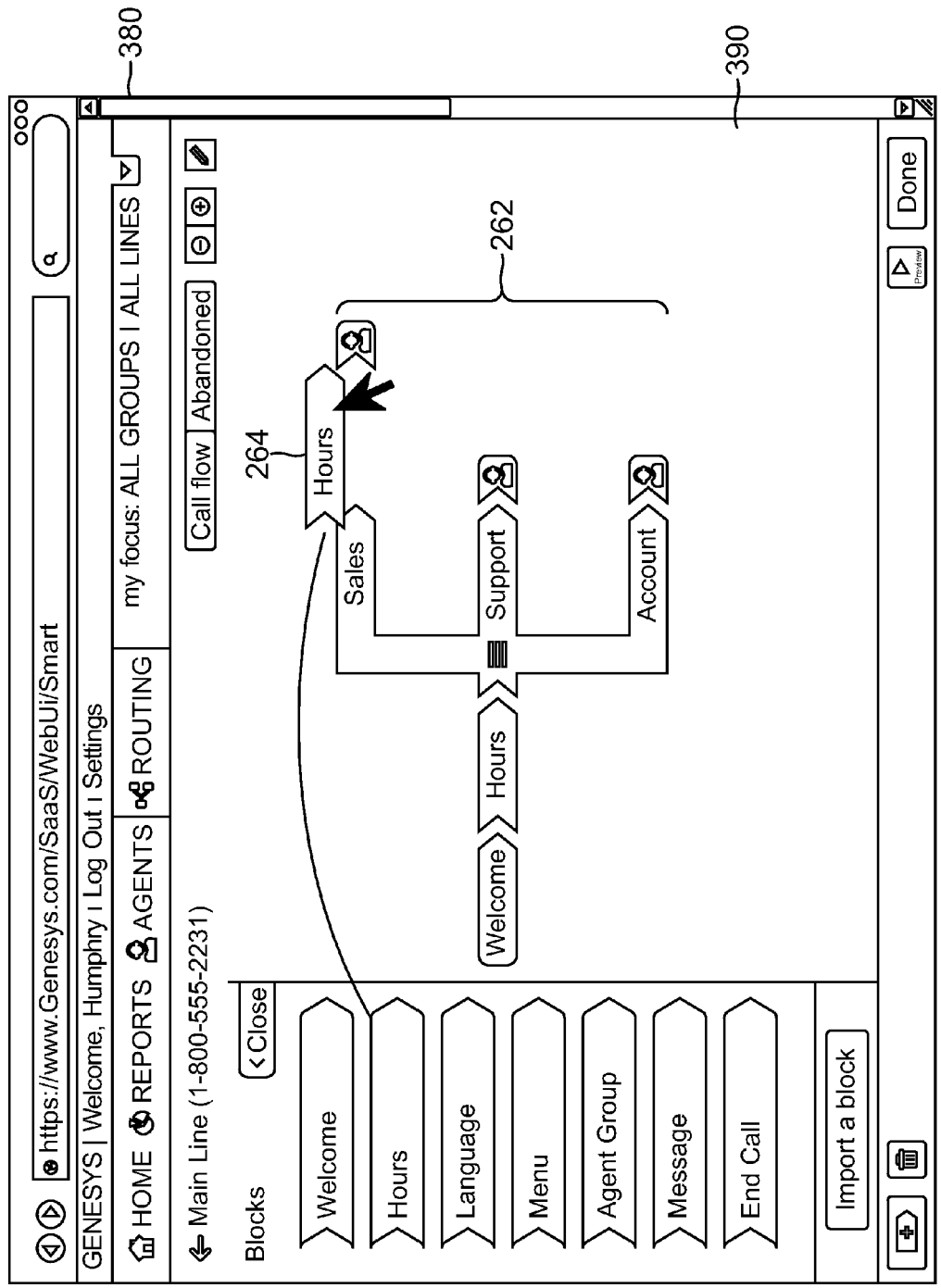

FIG. 13 is a screen shot of a UI depicting the building of a routing strategy via a drag-and-drop mechanism according to one embodiment of the invention. In the embodiment of FIG. 13, a contact center worker drags and drops a block 264 from the block toolbar area 382 into a particular location in the routing strategy diagram 262 displayed in the workspace area 390. In response to dropping the block at a particular location relative to other pre-existing blocks in the workspace area, the specialized application is configured to rearrange/reorganize the pre-existing blocks to allow the placement of the selected block 264 in the identified location where the block was dropped. A selected block may be dropped before, after, or in-between existing blocks. A selected block may also be dropped on top of an existing block to indicate that the existing block is to be replaced. The specialized application 52 may then redefine the routing strategy according to the placement of the block 264. For example, in the embodiment of FIG. 13, by placing another hours block in-between the sales branch of the menu block and the route to agent block, the routing strategy is redefined to execute an hours operation after taking the sales branch of the menu selection. In addition to adding blocks 264 from the block toolbar 283, blocks 264 currently in the routing strategy diagram 262 may be moved or removed according to any conventional mechanism in the art.

Additionally, the specialized application 52 may include automated graphical layout optimization. For example, after the contact center worker creates a routing strategy in the workspace area 390, the specialized application 52 may rearrange/reorganize the blocks 264 in the workspace are 390 so that the blocks are optimally arranged for the configured routing strategy. The automated graphical optimization may arrange the routing strategy into sub-sections that may be zoomed in or out or expanded or collapsed.

According to an embodiment of the present invention, the specialized application 52 may indicate issues (or errors) during the building of a routing strategy (e.g., at initial setup or reconfiguration). Issues in the routing strategy may arise, for example, when there are orphaned blocks, improperly coupled blocks, parameter issues, anticipated operational issues, and/or the like. Additionally, the specialized application 52 may detect coverage gaps (i.e., a subsequent block does not include the full range of outputs from a previous block), superfluous branches (i.e., branches that are supposed to process values that are outside of output scope from previous block), or endless loops. In this regard, the specialized application is configured to apply one or more rules in allowing the addition, deletion, and/or reordering of blocks in the workspace area.

Figure 14:
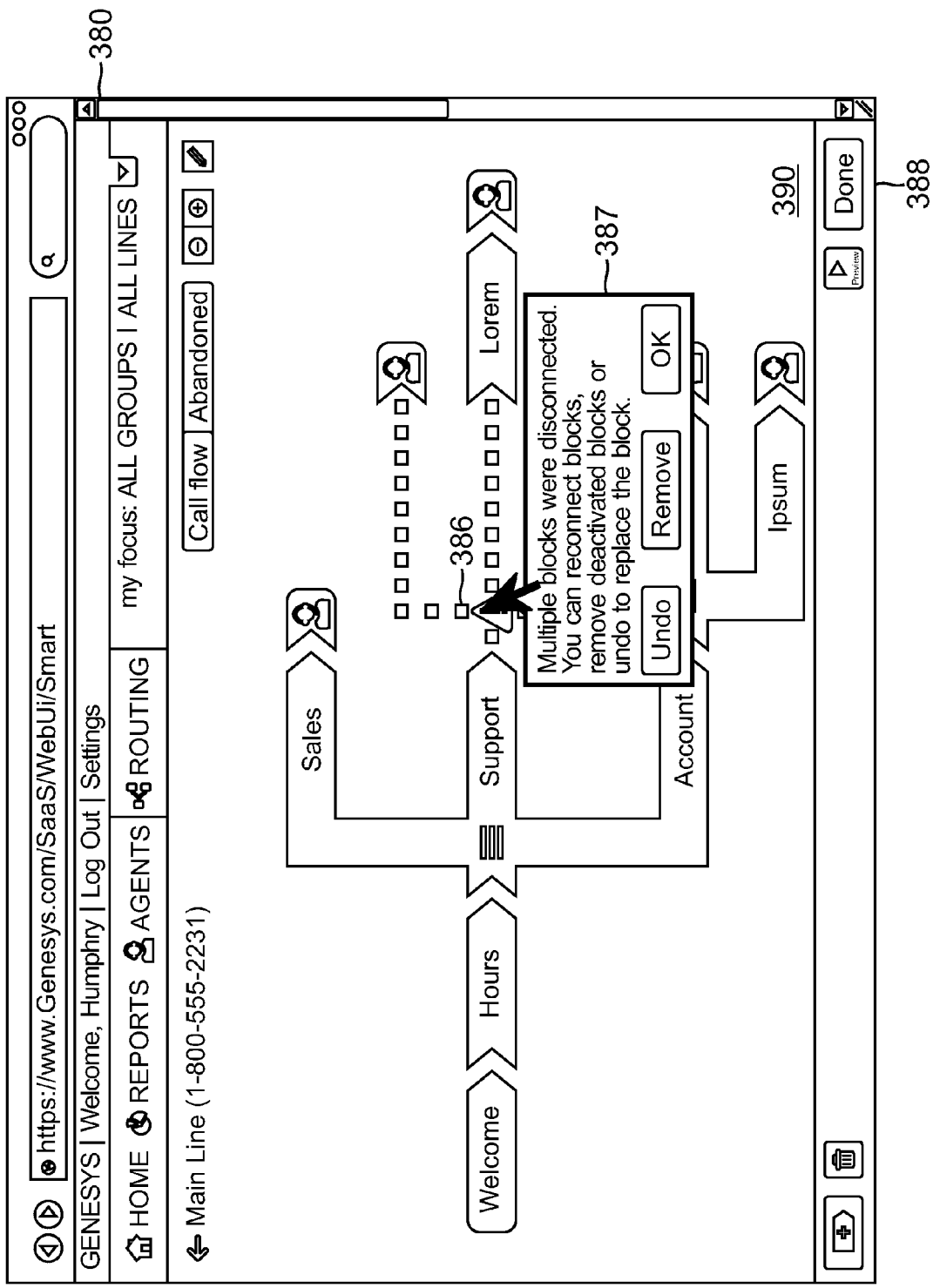

FIG. 14 is a screen shot of a UI for efficiently communicating the existence of an error via the routing strategy diagram 262 according to one embodiment of the invention. For example, a block 264 of the routing strategy may be displayed in a particular color (e.g., red or yellow) when there is a connection error, a parameter error, or an operation error associated with the block 264. The identification of the error may be based upon the application of the one or more rules by the specialized application. As another example, an icon 386 may be displayed indicating an error in the routing strategy, and a pop-up window 387 may be displayed describing the error. For example, as shown in FIG. 14, the icon 386 and the pop-up window 387 display an alert that there are orphaned blocks (e.g., disconnected blocks).

Additionally, according to one embodiment, the specialized application 52 may suggest a solution to the indicated error. For example, the pop-up window 387 may suggest removing an orphaned block.

After the routing strategy is configured, the routing strategy may be saved by selecting, for example, the "Done" button 388.

Figure 15:
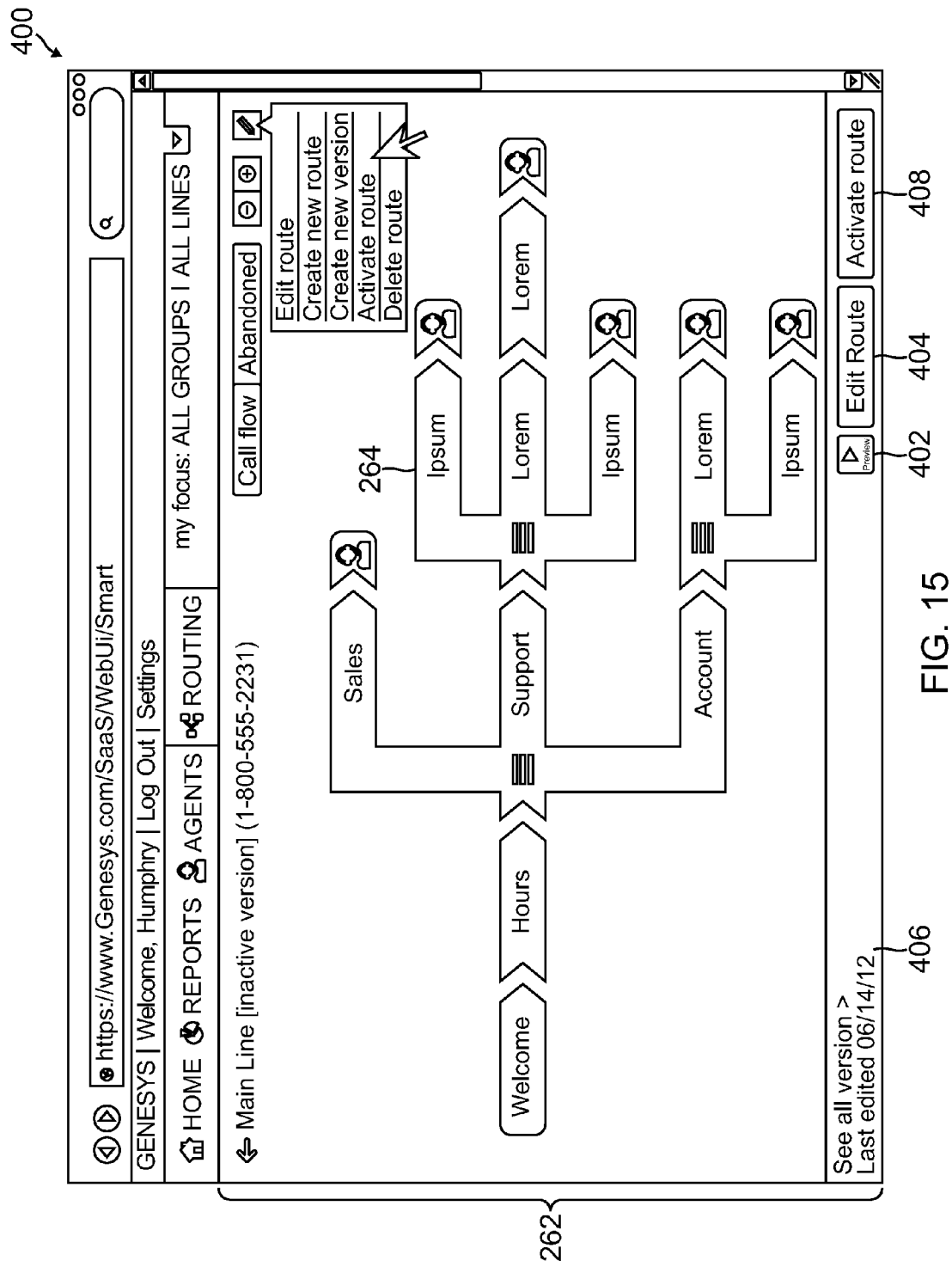

FIG. 15 is a screen shot of a UI page 400 rendered after the routing strategy is configured and saved according to one embodiment of the invention. The UI page 400 displays the configured routing strategy 262 including the blocks 264 as the birds-eye-view of the interaction flow. Additionally, the UI page 400 may include a "Preview" button 402 to preview the operation of the routing strategy and a link 406 to see all versions of the routing strategy.

Figure 16:
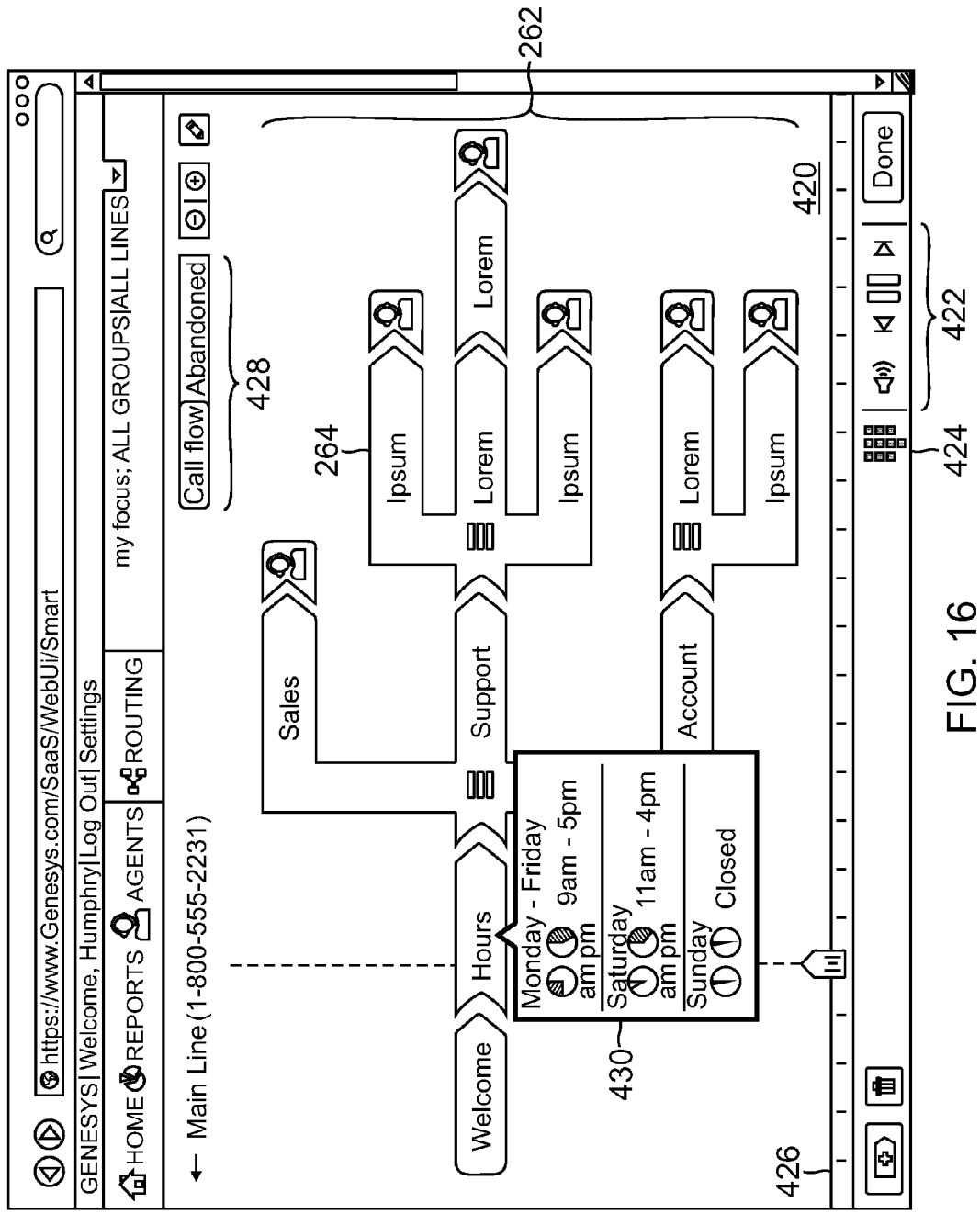
FIG. 16 is a screen shot of a UI page rendered when a preview button is selected according to an embodiment of the invention.

FIG. 16 is a screen shot of a UI page 420 rendered when the preview button 402 is selected according to an embodiment of the invention. According to one embodiment, the UI page 420 is rendered according to a simulation script of the specialized application 52.

The simulation script (or what-if testing) according to one embodiment, is a script which simulates the activity of a routing strategy of a contact center according to contact center data, which may include historical data, mathematical models, agent attributes, operation parameters, and the like. The contact center data may be captured from past interaction traffic, detailed reporting, application logs, industry practices, and the like. According to one embodiment, the contact center data is received from the database server 48 and/or the statistics server 50.

When running the simulation script, the contact center worker may enter contact center conditions (e.g., select a scenario, enter own conditions, or import actual or historical conditions) to simulate. The contact center conditions may include, for example, agent schedules, agent proficiencies, call volume, call frequency, call types, call/after work/down times (average/variants), and the like. According to one embodiment, the simulation is run according to the entered contact center conditions and the configured routing strategy.

The simulation may be controlled via a simulation control panel 422. The simulation control panel 422 may include options to play, pause, fast forward, rewind, speed up, slow down, and the like. Additionally, an input panel 424 may be provided for the contact center worker to provide simulation input. For example, the input panel 424 may be a key pad for the contact center user to input a key during a simulated call.

The UI page 420 may include a timeline 426 for indicating the playback of the simulation. The timeline 426 may include a slide tool for changing the playback time.

According to another embodiment, UI page 420 for the simulation script may include a simulation mode selector 428. The simulation mode selector may include an input for selecting a simulation mode, for example, an interaction flow (e.g., a call flow), an abandonment analysis, or a full simulation.

According to one embodiment, when the call flow mode is selected, the preview UI simulates the flow of a single call through the routing strategy. Here, the input panel 424 may simulate the key pad of the end-users phone, and the timeline 426 may indicate the location on the routing strategy diagram 262 currently being simulated. Additionally, in the call flow mode, the simulator may play back the messages, and record simulated voicemails as if there was an actual call.

When the full simulation mode is selected, the simulator script, according to one embodiment, simulates the function of the entire contact center (i.e., simulates multiple concurrent agents and end users). Here, the timeline 426 may represent the time of day, and conditions may vary according to the time of day.

According to one aspect of the present invention, the simulation indicates conditions (e.g., errors, issues, rates, volume, amounts, etc.) of the simulated contact center according to the current routing strategy. The simulator may indicate a condition by a visual cue (color, animation, change of icon, flashing) or audible cue (beep, alert, or announcement). Here, the cues may be customized to represent a variety of conditions.

As shown in the embodiment of FIG. 16, the simulation may indicate conditions of the simulated contact center via the colors of the blocks 264 in the routing strategy diagram 262. For example, the cues may represent an abandonment rate. In this case, a green color may indicate a low rate of abandonment associated with the block, yellow may indicate a moderate rate, and red may indicate a high rate. The thresholds for these levels may be set by the contact center worker. Other types of conditions that may be displayed by the simulation include, but are not limited to, a heat flow (e.g., of call volume), average/maximum call time, average/maximum wait time, average/minimum speed of answer, average/maximum occupancy rate, performance, quality of service, and the like.

As described above, the conditions of the call center are associated with individual blocks (e.g., via the visual cues). Accordingly, a contact center worker may identify areas of the particular routing logic that may need attention. For example, if the sales branch was simulated as having a high call abandonment rate, the contact center worker may be alerted (e.g., via the visual cues) that the routing strategy associated with that branch needs attention (e.g., reconfiguration). To this end, the simulation script may employ contact center models, statistical analyses, queue system theory, and the like (e.g., employing the Erlang A, B, or C formulas as is well known in the art). Additionally, the simulation may take into account actual configuration information related to a particular call center, such as number of agents, agent skills (including defined and assigned skills), agent proficiency, call center capacity, agent capacity, workforce schedule, and the like.

According to another aspect of the present invention, the simulation script may offer suggested solutions to anticipated issues. For example, if a call abandonment rate in the sales branch is high, the simulator may suggest associating an auxiliary agent group with that branch or that the calls be routed to voicemail sooner. These suggestions may be based on best practices, historical data, contact center models, queue system theory, and the like. According to an embodiment of the present invention, there may be provided a list of previous issue root causes (e.g., sorted by frequency); this list may be personalized to a particular user/administrator based on the issues which arise in their configurations. The simulation script may be initiated by a contact center user, or may be triggered by recent changes in the configuration or workforce schedule (e.g., changing from a previously correctly working configuration or workforce schedule).

In addition to the cues automatically generated, the contact center worker may selectively observe additional information regarding the routing strategy. For example, as shown in FIG. 16, the contact center worker may hover a cursor over a particular block 264 to display a tool-tip 430, which displays relevant information associated with the block (bubbled-up data). Additionally, the particular block 264 may be selected, which may generate a new UI page providing detailed information associated with the particular block (drill-down).

Referring again to FIG. 15, after simulating the contact center routing strategy, the contact center worker may return to editing the routing strategy by selecting the "Edit Route" button 404. Additionally, according to the embodiment of FIG. 15, other versions of the routing strategy may be viewed or selected by selecting the "See all versions" link 406.

Figure 17:
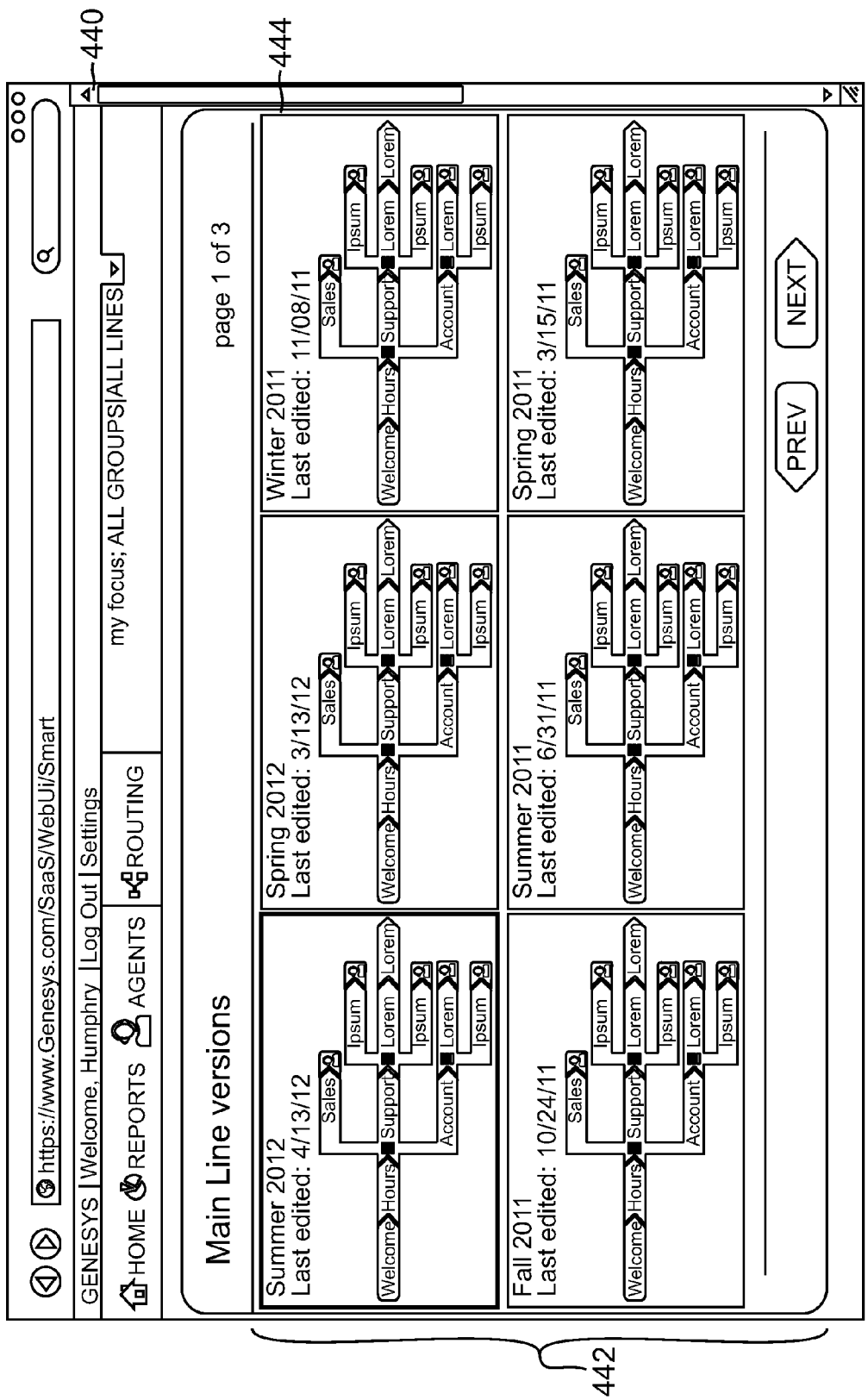
FIG. 17 is a screen shot of a UI page rendered upon selection of a "See all versions" link according to one embodiment of the invention.

FIG. 17 is a screen shot of a UI page 400 rendered upon selection of the "See all versions" link 406. The UI page 400 displays a version menu 442 listing different versions 444 of the routing strategy. By selecting a version 444 from the version menu 442, according to one embodiment, the selected version 444 of the routing strategy becomes the current routing strategy ready for activation or editing.

Referring again to FIG. 15, once a routing strategy is configured according to the requirements of the contact center worker, the contact center worker may activate the routing strategy currently selected by, for example, selecting an "Activate route" button 408.

According to one embodiment, when the selected routing strategy is activated, the configuration server 41 in the remote computing environment 24 runs a configuration script for configuring a virtual machine for a contact center in the remote computing environment 24 according to the selected parameters of the routing strategy.

According to one aspect of the invention, a contact center worker may monitor and reconfigure a currently operating contact center via a dashboard UI. According to one embodiment, the dashboard UI may be rendered by the specialized application 52.

Figure 18:
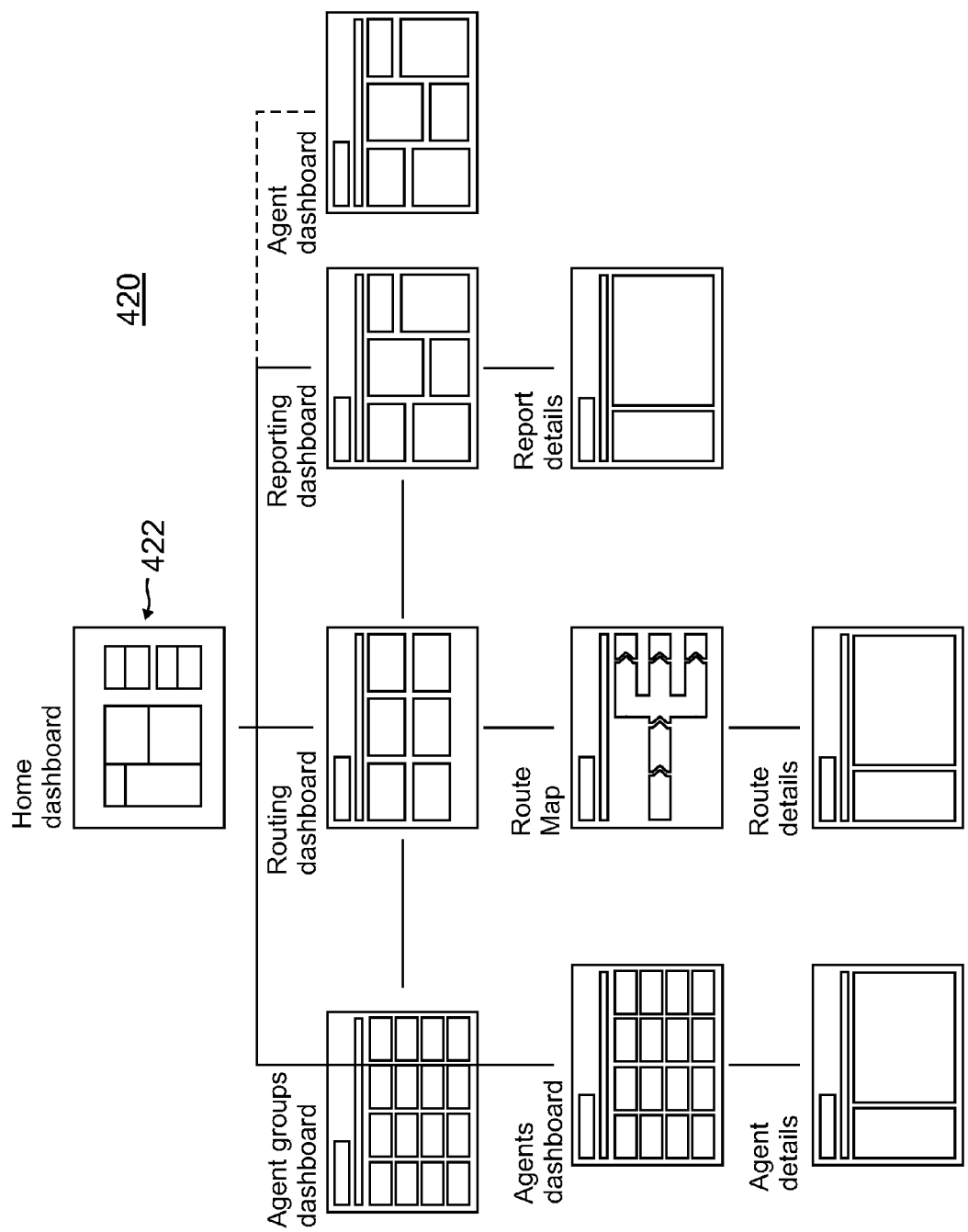
FIG. 18 is a screenshot of an exemplary dashboard UI according to one embodiment of the invention.

FIG. 18 is a screenshot of an exemplary dashboard UI 420 according to one embodiment of the invention. The dashboard UI 420 may include a plurality of UI pages 422 for monitoring and/or configuring a contact center. The UI pages 422 may include, but are not limited to, a home dashboard, an agent groups dashboard, a agents dashboard, agent details, a routing dashboard, a route map, route details, reporting dashboard, and report details.

Figure 19:
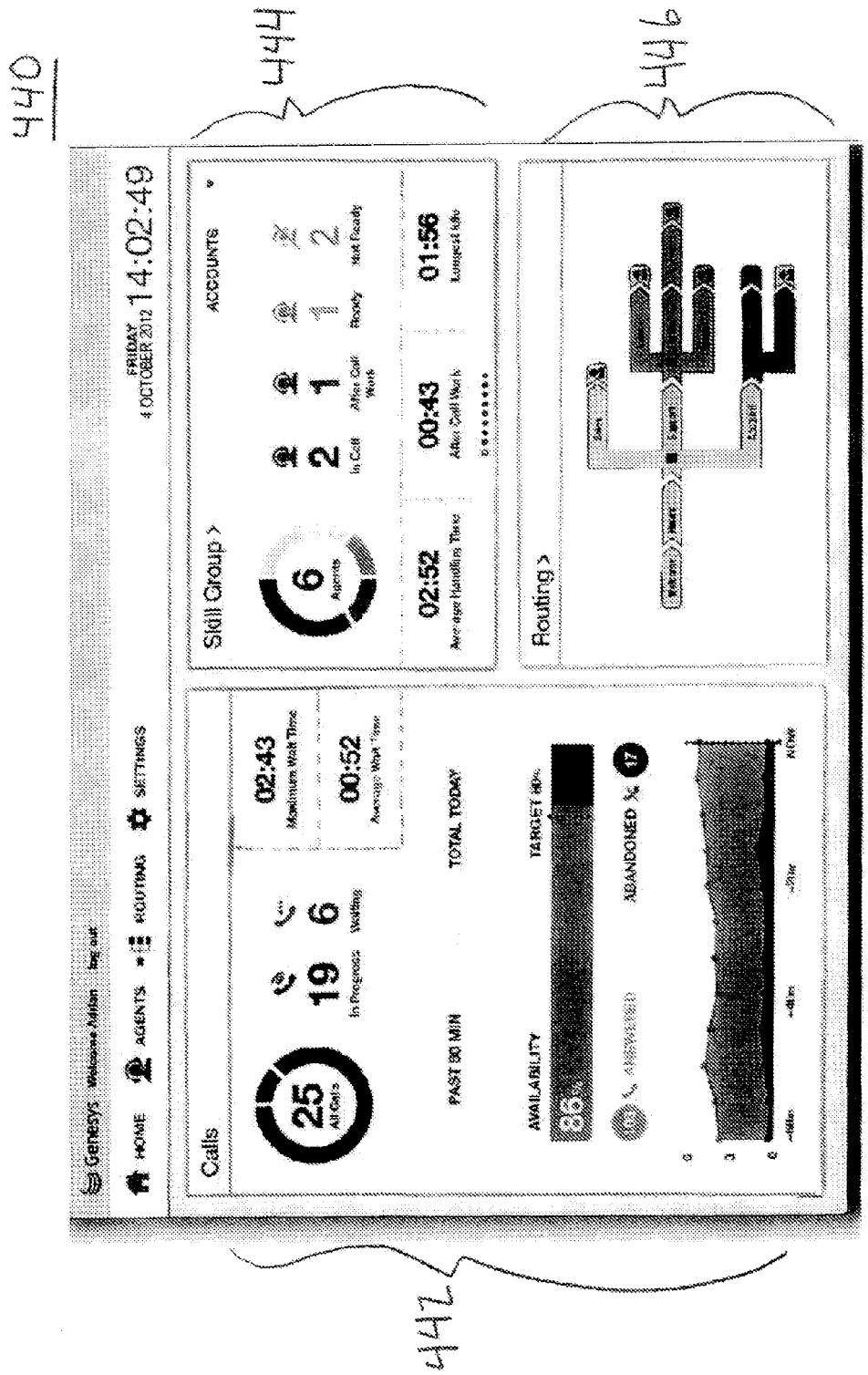
FIG. 19 is a screen shot of a UI page rendered as the home dashboard according to one embodiment of the invention.

FIG. 19 is a screen shot of a UI page 440 rendered as the home dashboard according to one embodiment. The home dashboard includes relevant information to the operation of a contact center that is displayed in a highly accessible and efficient manner to effectively communicate the current condition (e.g., health, capacity, etc.) of a contact center at a glance. For example, as shown in the embodiment of FIG. 19, the home dashboard may include an interaction report window 442, an agent report window 444, and a routing strategy window 446.

The interaction report window 442 may include charts, graphs, or other displays indicating relevant interaction information such as, number of call, calls in progress, calls waiting, maximum wait time, average wait time, abandonment rate, and the like. The interaction report window 442 may be configurable, for example, the interaction report window may be configured to display information spanning the day or another period of time.

The agent report window 444 may include, charts, graphs, or other displays indicating relevant information about the agents 11, including, number of agents, agents in call, agents performing after work, agents ready, agents not ready, average call handling time, average after call work time, longest idle time, and the like. The agent report window 444 may also be configurable, for example, the contact center worker may select a particular skill group to display in the agent report window 444.

The routing strategy window 446 may include a routing strategy diagram (e.g., a routing strategy diagram substantially similar to the routing strategy diagram 262). According to one embodiment, the routing strategy diagram is a birds-eye-view of interaction flows through the routing strategy with visual cues to communicate the current or historical state (e.g., health, heat flow) of the call center at-a-glance.

Each of the call report window 442, agent report window, 444, and the routing window 446 may be selected by the contact center worker to display more information. For example, the contact center worker may hover a cursor over a portion of a window to display a tool-tip window containing some of the more relevant information associated with the selected portion. Additionally, one of the windows 442-446 may be selected to provide another UI page with more detailed information.

Figure 20:
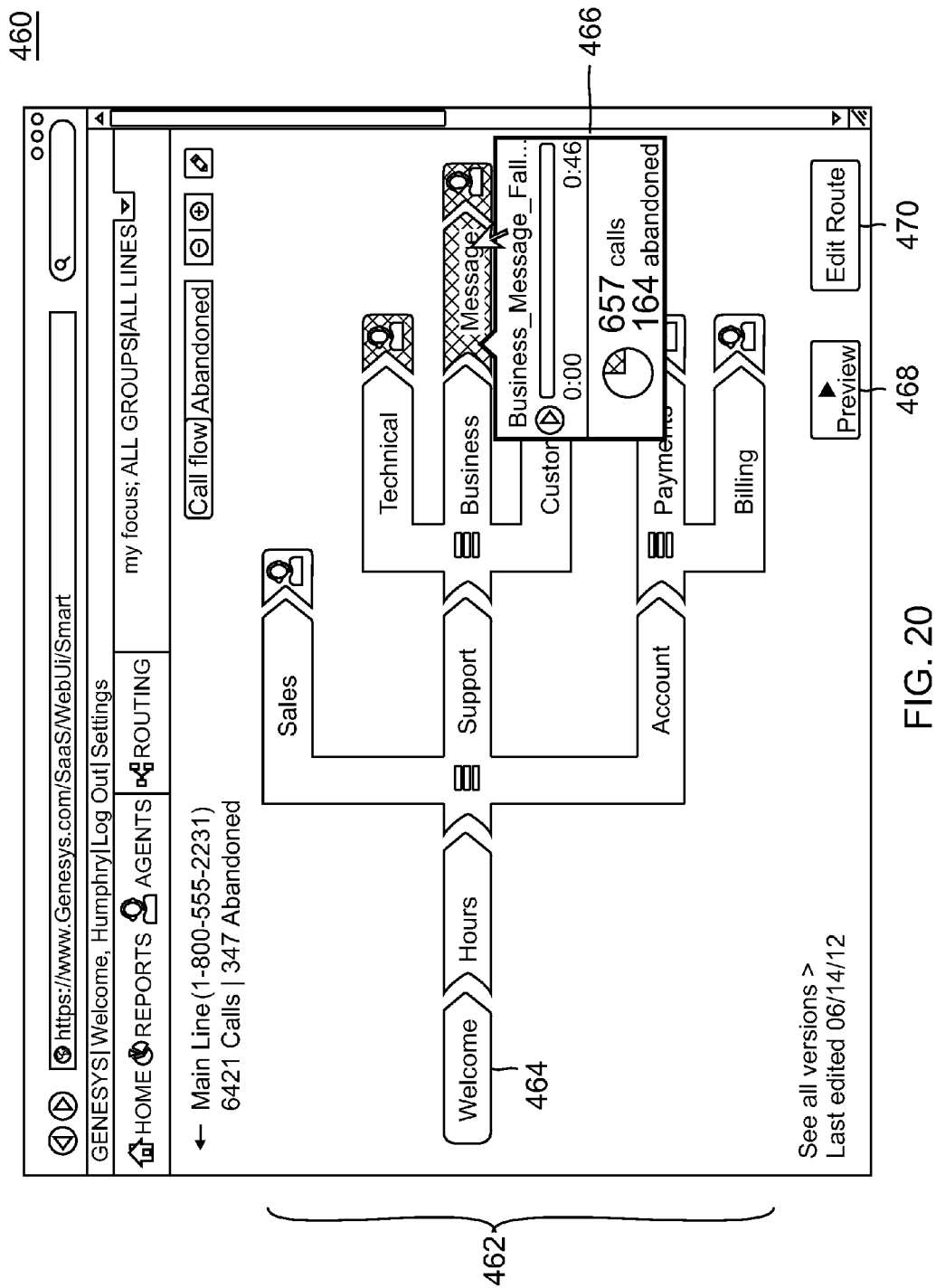
FIG. 20 is a screen shot of a UI page rendered by a specialized application when a user selects a routing window for more detailed information according to an embodiment of the invention.

FIG. 20 is a screen shot of a UI page 460 rendered by the specialized application 52 when the user selects the routing window 446 for more detailed information according to an embodiment of the invention. The UI page 460, according to one embodiment, displays a routing diagram 462 including blocks 464. The routing diagram 462 and the blocks 464 according to one embodiment are similar to the routing strategy diagram 262 and the blocks 264, previously described (e.g. with respect to FIG. 6). Accordingly, some aspects or features of the routing diagram 462 and the blocks 464 are described by way of reference to the previously described routing strategy diagram 262 and the blocks 264. For example, the "Preview" button 468 and the "Edit Route" button 470 serve similar functions as the "Preview" button 402 and the "Edit Route" button 404 previously described.

According to one embodiment, each of the blocks 464 represent a particular routing operation, and when coupled together in a particular order (i.e., as the routing diagram 462), visually represent and efficiently communicate (at-a-glance) the routing (or interaction flow) of the contact center. Additionally, because of visual or audible cues associated with the blocks 464, conditions (e.g., heat flows, errors, issues, etc.) may be easily communicated and understood.

According to an aspect of the invention, the routing diagram 464 indicates conditions (e.g., errors, issues, rates, volumes, amounts, etc.) of the contact center in real-time or historically. For example, the routing diagram 464 may indicate a condition by a visual cue (color, animation, change of icon, flashing) or audible cue (beep, alert, or announcement). Here, the cues may be customized to represent a variety of conditions.

As shown in the embodiment of FIG. 20, the routing diagram 464 may indicate conditions of the contact center via the colors of the blocks 464. For example, the colors may represent an abandonment rate. In this case, a green color may indicate a low rate of abandonment associated with the block, yellow a moderate rate, and red a high rate. Other types of conditions that may be displayed by the routing diagram 464 include, but are not limited to, a heat flow (e.g., total call volume, processing capacity of a particular branch, agent availability, or agent capacity), average/maximum call time, average/maximum wait time, average speed of answer, average/maximum occupancy rate, performance, quality of service, and the like.

As described above, the conditions of the call center are associated with individual blocks (e.g. via the visual cues). Accordingly, a contact center worker may identify areas of the contact center that may need attention. For example, if the sales branch was simulated (or detected in real-time) as having a high call abandonment rate, the contact center worker may be alerted via the visual cues that the routing strategy associated with that branch may need attention (e.g., need reconfiguration or additional agents assigned to the branch). According to one embodiment, the specialized application 52 identifies likely causes of the displayed conditions through contact center models, statistical analyses, queue system theory, and the like (e.g., employing the Erlang A, B, or C formulas).

According to one aspect of the present invention, the specialized application 52 may offer suggested solutions to the observed issues. For example, if a call abandonment rate in the sales branch is high, the simulator may suggest associating an auxiliary agent group with that branch or that the calls be routed to voicemail sooner. In another example, if the heat flow is red for a particular branch of the routing strategy diagram due to an unusually high call volume to a particular agent group (e.g. agents trained to process new credit card applications), a recommendation may be made to a contact center administrator to add more agents to that particular agent group or to focus agents to that particular agent group (e.g., remove agents who are in the particular agent group from other agent groups if the other agent groups would not be adversely affected). These suggestions may be based on best practices, historical data, contact center models, queue system theory, and the like, accessible to the specialized application for analysis.

Additionally, the contact center worker may selectively observe additional information regarding the call center. For example, as shown in FIG. 20, the contact center worker may hover a cursor over a particular block 464 to display a tool-tip 466 which displays relevant information associated with the block 464 (bubble-up). Additionally, the particular block 464 may be selected, to generate a new UI page providing detailed information associated with the particular block (drill-down).

Figure 21:
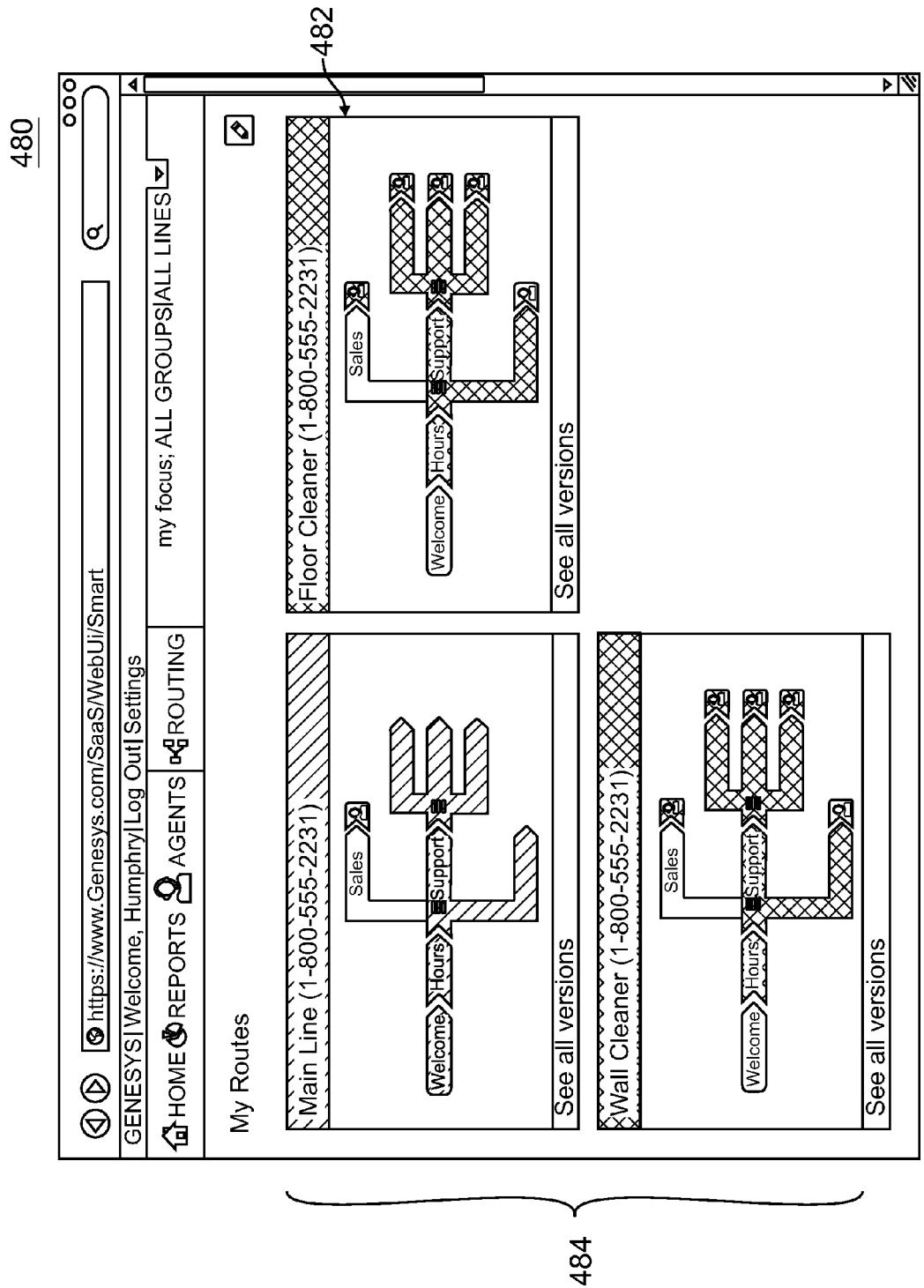
FIG. 21 is a screen shot of an exemplary UI page rendered when a contact center has multiple lines and multiple routing strategies according to one embodiment of the invention.

Embodiments of the present invention apply to contact centers having one phone line and one routing strategy as well as contact centers having multiple phone lines and multiple routing strategies. FIG. 21 is a screen shot of an exemplary UI page 480 rendered when a contact center has multiple lines and multiple routing strategies. According to one embodiment, the contact center user may navigate among the routing strategies of the various lines 484 by invoking a thumbnail view 482 of the various routing strategies.

Accordingly, one or more embodiments of the invention provide an intuitive experience for the contact center administrator, for example, by displaying the contact center routing logic as a birds-eye-view of interactions flowing through the contact center, to aid the contact center administrator with the (re)configuration and monitoring of the contact center without the need of highly skilled IT personnel or extensive pre-acquired knowledge of best practices for call center operations or set up.

FIGS. 22-30 are screen shots of various example graphical user interface screens rendered by the specialized application 52 running on the third party web platform 20 according to one embodiment of the invention. A person of skill in the art should recognize that the graphical user interface may also be provided by the web server 40 in the remote computing environment 24 in instances where a tenant user accesses the web server 40 directly without invoking the third party platform 20. According to one embodiment, the graphical user interface may be used to recommend routing strategies to contact centers according to, e.g., industry best practices. The graphical user interface may also be used for guiding a contact center user step-by-step in configuring a routing strategy according to the specific contact center's business needs. In this regard, when a contact center worker logs in and indicates that contact center setup is desired, the specialized application 52 renders a UI page with various options for configuring the contact center. Such options may include, for example, a user management option 102, skills management option 104, routing configuration option 106, and media management option 108.

Figure 22:
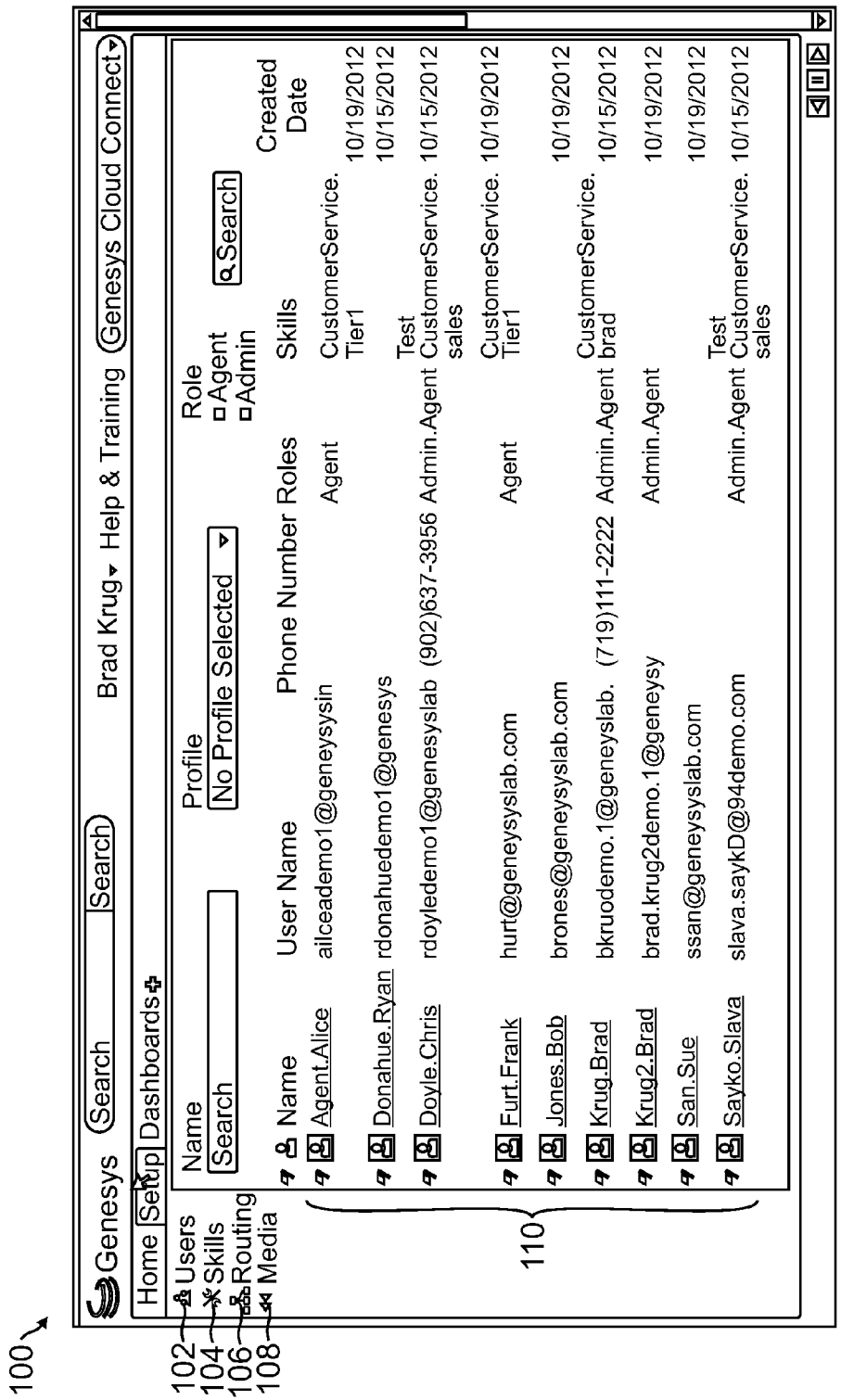

FIG. 22 is a screen shot of a UI page 100 rendered upon selection of the user management option 102. Selection of the user management option causes display of registered users 110 of the third party web portal. According to one embodiment, the users of the third party web portal may be enabled as users or administrators of the specialized application 52. In one embodiment, the users correspond to agents 11 of a contact center. Furthermore, profile information of the registered users 110 of the third party web portal may be migrated into the specialized application 52 for editing such profile information to add data that is relevant for a contact center setting. Editing the profile information of a particular user starts by selecting the user from the list of registered users 110.

According to one embodiment, the third party web portal is a customer relationship management portal for a particular business entity, and the users thereof are sales or customer service representatives for the particular business entity. The third party web portal may provide the representatives with customer profiles or account histories, or may allow for tracking and managing a marketing campaign, customer communications, or other information relevant to the particular business entity's sales process. According to an aspect of embodiments of the present invention, data corresponding to the users of the third party web portal is easily integrated with the specialized application 52 so that the user data may be used by the specialized application 52 without having to reenter the user data.

Figure 23:
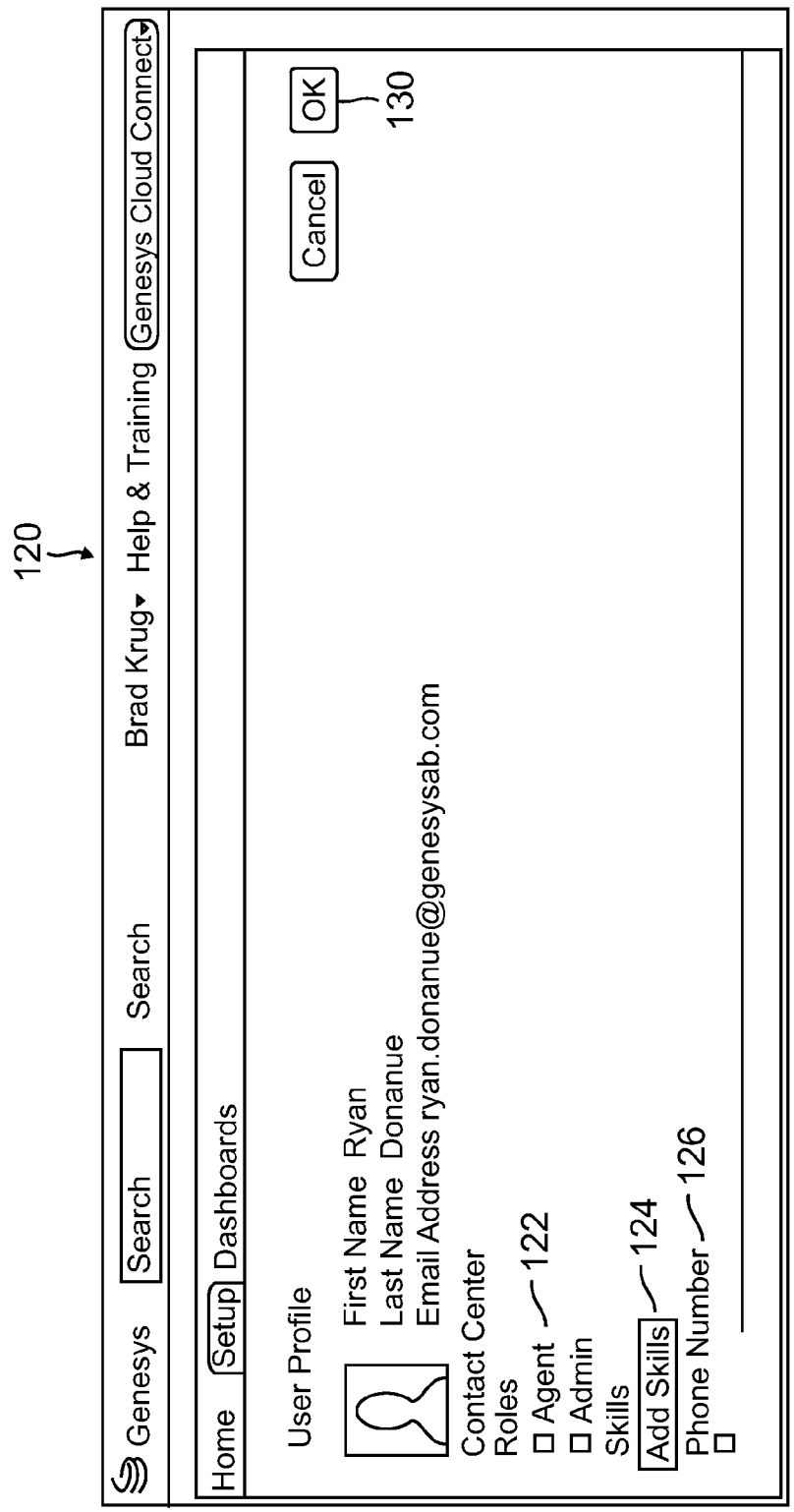

FIG. 23 is a screen shot of a UI page 120 rendered upon selection of a particular registered user according to one embodiment of the invention. Selection of the particular user causes the specialized application 52 to retrieve the user's profile information from the third party database. In addition to fields typically provided by the third party database, the specialized application further renders profile options relevant to contact centers that may be set for the user. Such profile options relate, without limitation, to the user's role 122, skills 124, and provisioned phone number for the user 116 (e.g. agent's phone number for routing calls). Setting the additional profile data for the user and selecting a save option 130 causes storing of the profile data in a contact center database managed by one of the database servers 48. If the user is to be disabled as a user of the specialized application 52, a deactivate user option causes removal of such user from the contact center database. In this manner, the specialized application 52 allows retrieval of profile information of users set up in the third party database for adding additional profile information for those users and enabling such users in the specialized application.

FIG. 24 is a screen shot of a UI page 140 rendered upon selection of more than one of the registered users 110 according to one embodiment of the invention. Selection of multiple users causes the specialized application 52 to flag such users and display them in a separate window 142. The separate window provides an edit option 144 with various operations (e.g. assign roles, phone numbers, skills, etc.) which, when selected, causes the operation to be performed on the selected users concurrently. That is, the specialized application 52 may allow for bulk editing of registered users 110.

Figure 25:
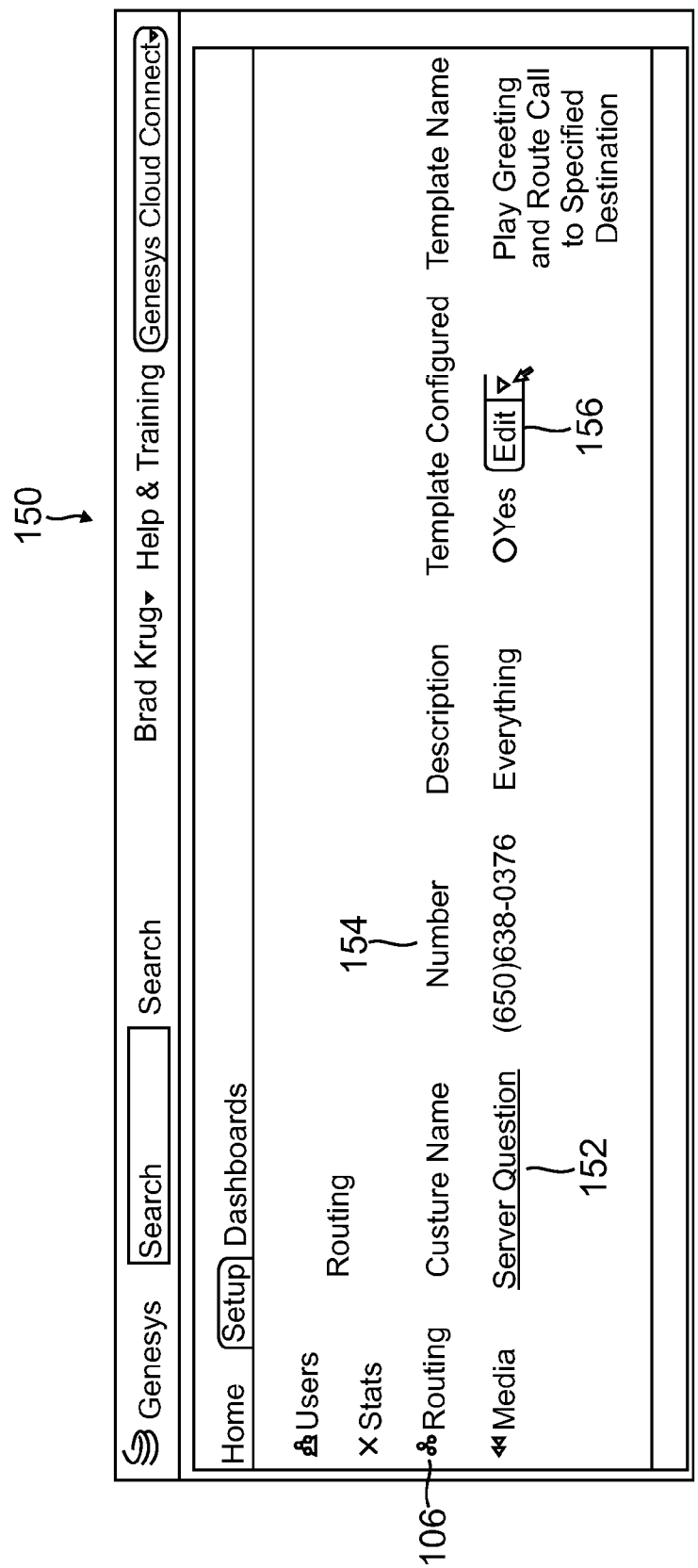

FIG. 25 is a screen shot of a UI page 150 rendered upon selection of the routing option 106 according to one embodiment of the invention. Selection of the routing option causes display of available queues that may be selected for defining or redefining a routing logic for the queue. In this regard, a queue is an entry point to a contact center. All incoming end user 14 calls arrive at a queue. According to one embodiment, a queue is identified by a queue name 152 and phone number 154.

In one embodiment, a contact center may have one or more queues associated with it, where each queue is associated with a single phone number. For example, there may be several phone numbers that an end customer 14 may call to reach the contact center. Each phone number may reach, for example, a different sub-unit of the contact center (e.g. credit card division, mortgage division, personal accounts division, and the like) or a particular registered user 110. However, embodiments of the present invention are not limited thereto, for example each queue may be associated with multiple phone numbers or multiple phone numbers may be associated with one queue.

According to one embodiment, each queue is associated with a routing template, which in turn is associated with a routing strategy/logic. A drop down template box 156 allows an administrator to configure and/or reconfigure the routing strategy assigned to the queue. Upon user indication to edit or assign a routing template to a particular queue, the web server retrieves and displays a plurality of templates that an administrator may pick and choose based on the business' needs.

Figure 26:
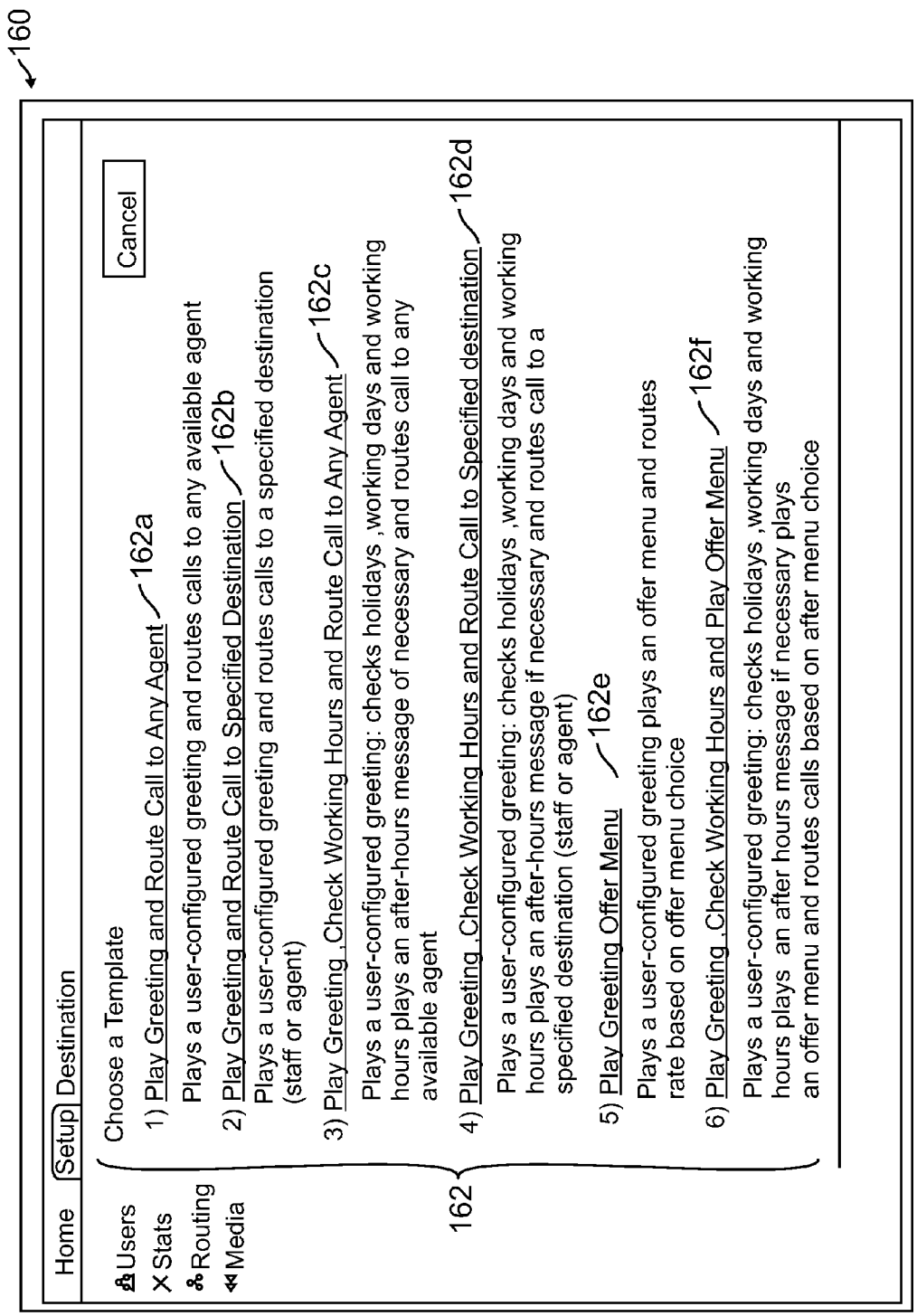

FIG. 26 is a screen shot of a UI page 160 displaying a library of different routing templates 162 available for selection by an administrator according to one embodiment of the invention. According to one embodiment, the routing templates that are initially displayed for user selection may depend on the profile information of the contact center that is to be configured with the desired business logic. For example, routing templates may be organized in the mass storage device managed by the database servers 48 according to various industry verticals (e.g. finance, retail, medical, etc.) and the types of templates displayed to the user may depend on the industry vertical identified in the contact center's profile information. Routing templates may also be categorized according to other criteria, such as, for example, contact center size. Other categories and sub-categories that may be used to organize and recommend routing templates will be evident to a person of skill in the art.

According to one embodiment, routing templates also vary by complexity. A user may select a particular level of complexity desired (e.g. via a complexity slider), and depending on the level selected, a different template may be selected. For example, a general template may trigger one or more sub-templates that provide added routing complexity. Alternatively, different parameters within a single template may be enabled or disabled based on the level of complexity that is selected.

In the example depicted in FIG. 26, different templates with different routing complexities are displayed selection by a user. For example, the template with least complexity is template 162a where a call is routed to any available agent after playing a user-configured greeting, followed by templates 162b thru 162e.

In more detail, template 162b routes a call to a user-specified agent or skill group after playing a user-configured greeting. Template 162c plays a user-configured greeting and then checks user-configured holidays, working days, working hours, and the like, prior to routing a call to any available agent. Template 162d plays a user-configured greeting and then checks user-configured holidays, working days, working hours, and the like, prior to routing a call to a user-specified agent or skill group. Template 162e plays a user-configured greeting, plays a user-configured offer menu, and routes calls based on the offer menu choice. Template 162f plays a user-configured greeting, checks user-configured holidays, working days, working hours, and the like, prior to playing an offer menu, and routes calls based on the offer menu choice. Additionally, in the templates where holidays, working days, working hours, and the like are checked, an afterhours message or a holiday message may be played prior to routing to voicemail. A person of skill in the art should recognize that the above-described templates are example templates, and other templates having different routing strategies may also be used without departing from the scope and spirit of the invention. For example, a template may include a cascaded menu option, i.e., where calls are routed to another offer menu based on a current offer menu choice.

According to one embodiment, a routing template is parameterized. In this regard, a routing template uses values of parameters to accomplish a specific action. For example, when an initial voice treatment is played to an end customer, the actual URI (Uniform Resource Identifier) of the media file is a value of one of the parameters of the template. As another example, when an interaction is routed to an agent having a particular skill, the actual skill name is a value of another parameter of the template.

Routing templates are generic. The same routing template may be used by any of various contact centers hosted by the remote computing environment. Because routing templates use parameters, different customers using the same routing template can specify different values for the parameters, customizing how their interactions are processed. Exemplary parameters relate to a greeting to be played when a call is first received, a destination to which to route the call, a type of music to be played while the call is routed to the destination, type of menu options to be provided to a caller; working hours and holidays to be checked prior to playing a particular message, any other routing action to be performed, and the like.

According to one embodiment of the invention, a routing template includes the following properties:
id;
name;
description;
routingStrategy—SCXML (State Chart Extensible Markup Language) strategy;
templateSchema—a schema (also referred to as metadata) describing what parameters this template uses and defines additional information about parameters (e.g. type). It is also used to generate the appropriate UI so users can conveniently specify values of routing parameters during the contact center's configuration process.

The metadata for a particular routing template defines parameters including names to be displayed in the graphical user interface for prompting input of a user value for the corresponding parameters, types of user input values expected for the corresponding parameters, range of values expected for the corresponding parameters, and the like. According to one embodiment, a parameter object has the following properties:
displayName—parameter name to be displayed in the UI;
description—brief description of the parameter;
type—parameter type, must be one of the types specified (e.g. a "timezone" type to describe a time zone of the contact center; a "holiday" type to describe holiday dates; a "weekdays" type to describe weekday sequences; a "working hours" type to specify working hours; a "media resource" type to describe audio, video, etc. to be used in the routing process; a "destination" type to describe a routing destination (e.g. skill, agent, etc.); and a "select action menu" type that describes an action to be performed by the routing strategy);
multiple—a Boolean value describing if this parameter is an array or not; "true" means that this parameter can hold several objects of the specified type.

According to one embodiment, metadata for a particular routing template may also define an element referred to as "block" which is a logical grouping element for a set of parameters which have something in common. Blocks may also form a tree-like structure by having a number of child blocks. Thus, metadata for a particular routing template may be described as an array of blocks. According to on embodiment, the blocks defined by the metadata may be the blocks 264 of the routing strategy diagram 262 described above in relation, for example, to FIG. 15.

According to one embodiment, each block has the following JSON (JavaScript Object Notation) representation:
block—name of this block;
type—block type, can be one of the following: "simple", "condition", "menu", "menuItem";
displayName—block name to be displayed in the UI;
description—brief description;
params—an object containing a set of user-configurable parameters to be displayed in this block; shall be in the following format: {<parameter1_name>: <parameter1_spec>, <parameter2_name>: <parameter2_spec>, ... };
blocks—an array of child blocks (optional).

Figure 27:
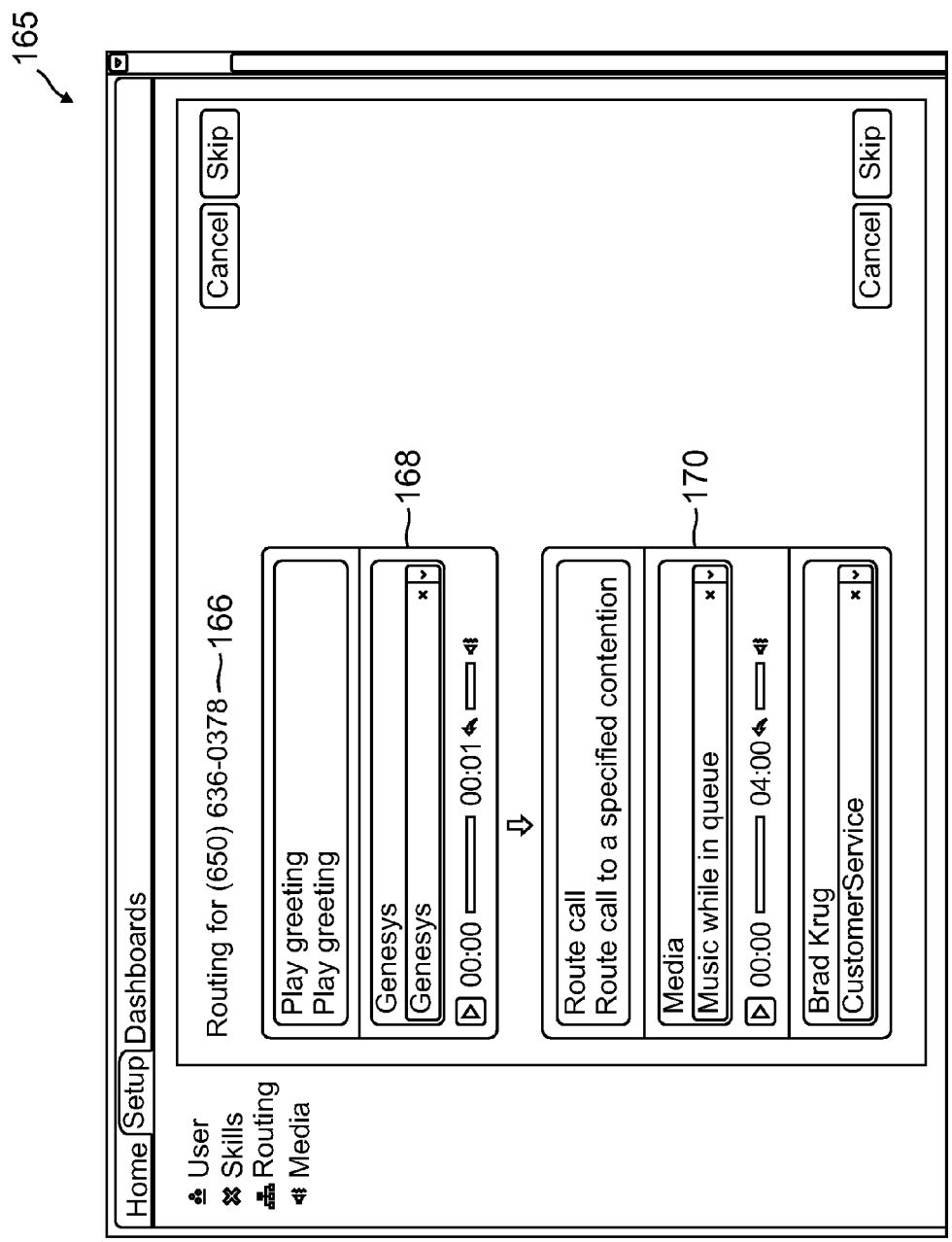

FIG. 27 is a screen shot of a UI page 165 displaying parameters for a selected routing template 162a based on the associated metadata according to one embodiment of the invention. A person of skill in the art will understand that the UI in FIG. 27 may be replaced with the UI described above with respect to, for example, FIG. 15. That is, the set of parameters that are to be configured could be represented as blocks 264 of a routing strategy diagram 262. In this regard, the parameters would be linked and displayed in the routing strategy diagram so that it tracks the actual flow of an interaction to be handled by the routing strategy.

The set of parameters that are displayed may depend from the functionality that the template provides. In the illustrated example, the parameters include a play greeting parameter 168 and a route call parameter 170. In response to the displayed parameters, the contact center administrator selects a pre-recorded greeting message to be played when an interaction is initially answered, and music to be played while the interaction is waiting to be routed to an available agent.

The parameters in the UI page 165 of FIG. 27 are rendered based on the following metadata:

```
[{
  "block": "greeting",
  "type": "simple",
  "displayName": "Play greeting",
  "description": "Play greeting",
  "params": {
    "greetingMessage": {
      "displayName": "Greeting message",
      "description": "Select greeting message",
      "type": "media",
      "multiple": false
    }
  }
},{
  "block": "routing",
  "type": "simple",
  "displayName": "Route call",
  "description": "Route call to any available agent",
  "params": {
    "musicWhileWaiting": {
      "displayName": "Music while waiting",
      "description": "Select music while waiting",
      "type": "media",
      "multiple": false
    }
  }
}]
```

The values of the parameters that are stored based on inputs provided in response to the parameters displayed in FIG. 27 may be as follows:

```
routingParams = {
  "greetingMessage": {
    "id": "f3ab8s-484556",
    "displayName": "Greeting Message",
    "uri": "system/media-resources/f3ab8s-484556",
    "mediaUri": "system/media-resources/f3ab8s-484556.wav"
  },
  "musicWhileWaiting": {
    "id": "f3ab8s-484556",
    "displayName": "Music While Waiting",
    "uri": "system/media-resources/f3ab8s-484556",
    "mediaUri": "system/media-resources/f3ab8s-484556.wav"
  }
```

As described above, the UT page 165 displays the parameters that relate to the specific template selected. Accordingly, and depending on the template selected, the user may be prompted to enter working holidays, working days, working hours, and the like, select an action to take when outside working times, enter a particular agent or skill group to route to, select a voice prompt to play at a specific step of processing a call, specify an action to take when a particular digit is entered from the user's telephone device, or enter any other parameter value associated with a routing operation of a template.

According to one embodiment, the user may specify another virtual queue to route to, for example, in response to a selection of a menu item. Here the other virtual queue may relate to another template (e.g., another template type), another department of the business entity, another phone number, and the like.

Figure 28:
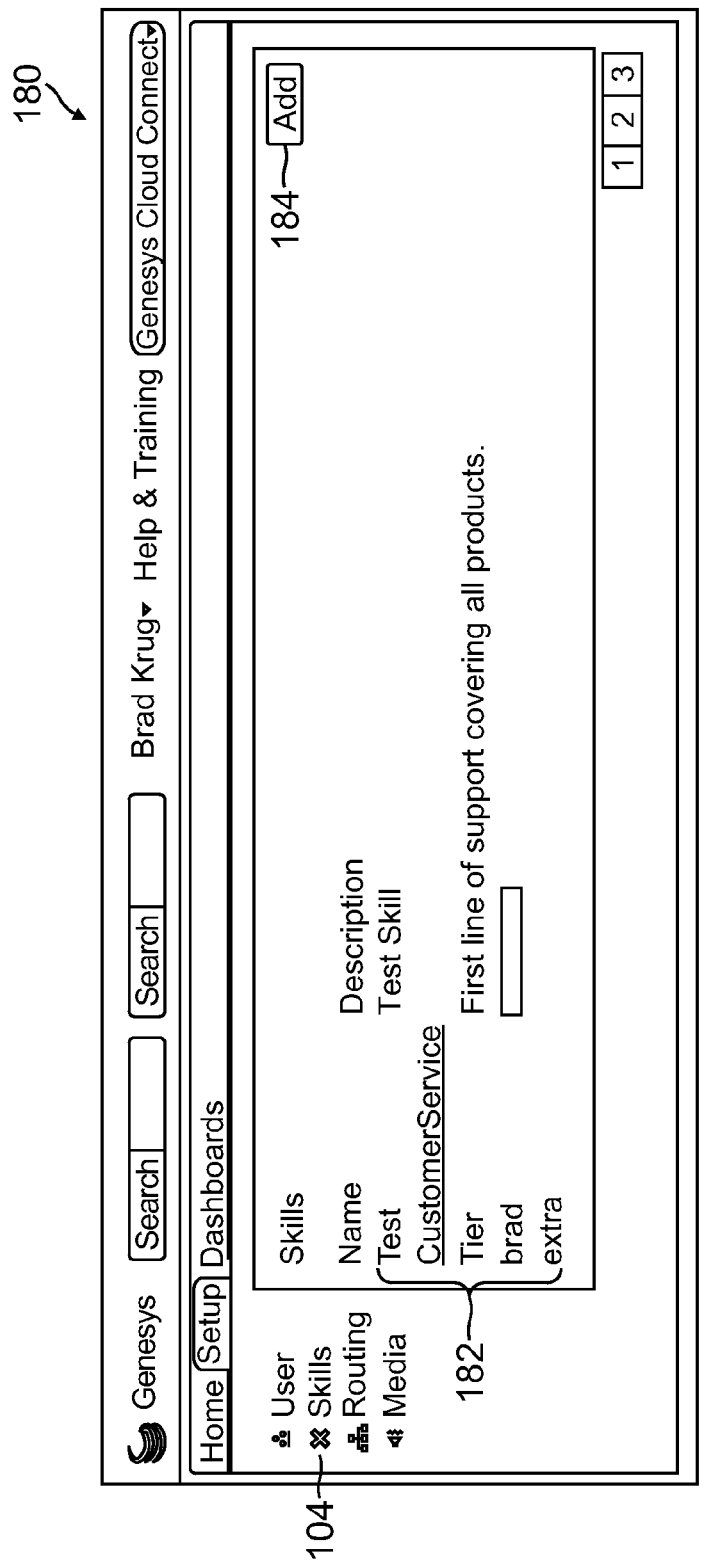

FIG. 28 is a screen shot of a UI page 180 displaying a library of different skill groups 182 available for association with registered users 110 and routing strategies according to one embodiment of the invention. The administrator may create skill groups 182 by selecting the add option 184. When creating skill groups 182, the specialized application 52 may prompt for a skill name and skill description. According to one embodiment, after a skill group 182 is saved in the skill group library, the administrator may assign particular registered users 110 (e.g., agents 11) to the skill group 182 by entering the skill name in the skill field 124 of the particular registered user's profile, and the administrator may enter the skill group 182 in the parameter field for routing to a particular skill group 182 when configuring the routing strategy.

Figure 29:
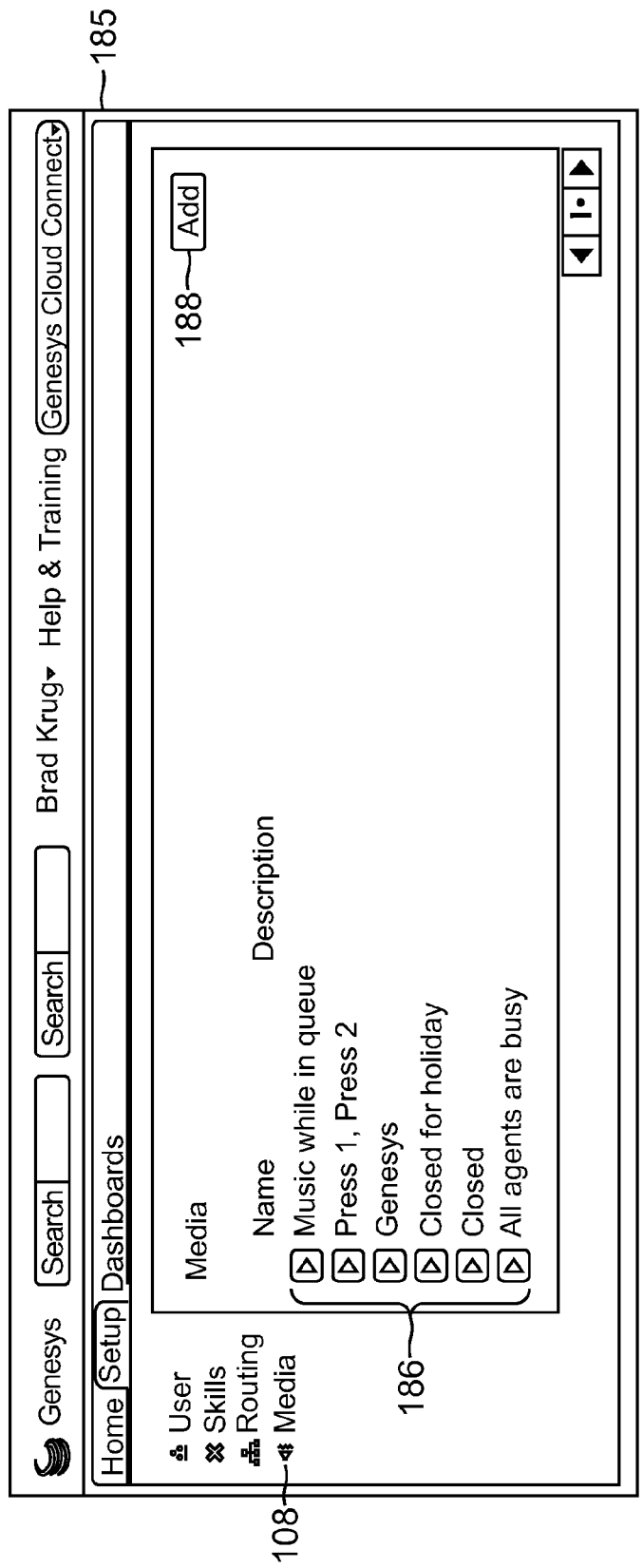

FIG. 29 is a screen shot of a UI page 185 displaying a library of different media files 186 available for selection when configuring the parameters of the selected routing strategy according to one embodiment of the invention. The media files 186 may be provided by or stored at the media server 46. According to one embodiment, the administrator may add new media files by selecting the add option 188. Newly added media files may be stored at the media server 46 for subsequent selection from the media file library. The administrator may preview the media files by clicking a play icon associated with the media file 186.

According to an aspect of one or more embodiments of the present invention, an administrator of a contact center can configure a contact center by enabling registered users of a third party web portal as agents of the contact center, assigning the enabled registered users to skill groups, associating phone number(s) with the enabled registered users and the contact center, and configuring a routing strategy from one of the available routing strategy templates. After configuring the contact center, the contact center may be instantiated in a remote computing environment to receive and handle contact interactions (e.g., calls).

Figure 30:
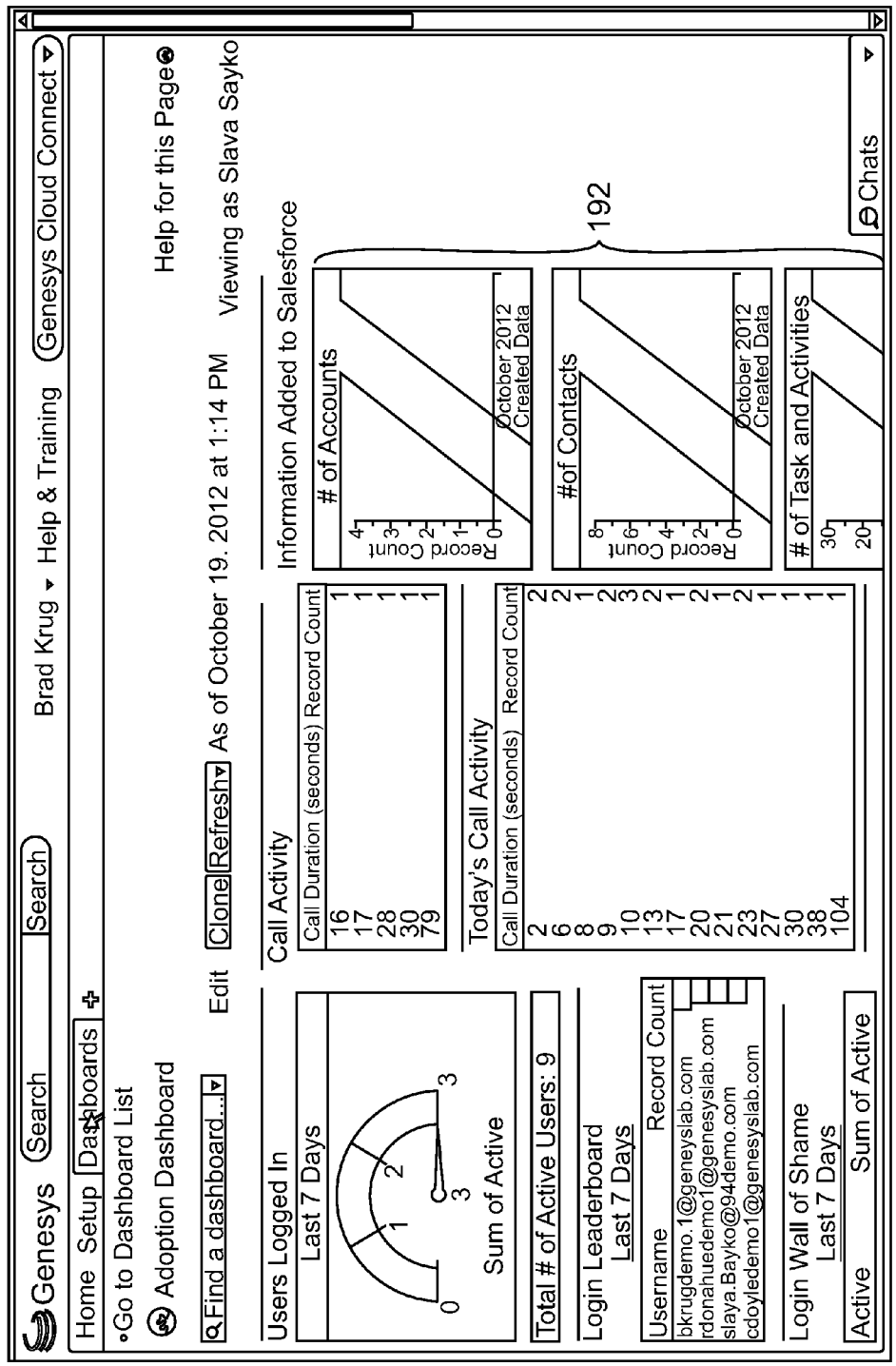

FIG. 30 is a screen shot of an exemplary UI page 190 displaying a dashboard 192 for an administrator to monitor activity of an operating contact center. According to one embodiment, the dashboard is generated by the specialized application 52. The dashboard may include real-time and historical data associated with a particular contact center. Additionally, the dashboard may include data from the third party web portal. The dashboard may present the contact center data using configurable charts and graphs, such that the administrator may readily and easily understand the status of the contact center. Information displayed on the dashboard may include, but is not limited to, number of users logged in, a historical login record, call activity, call duration, call time, hold time, and sales information.

Figure 31:
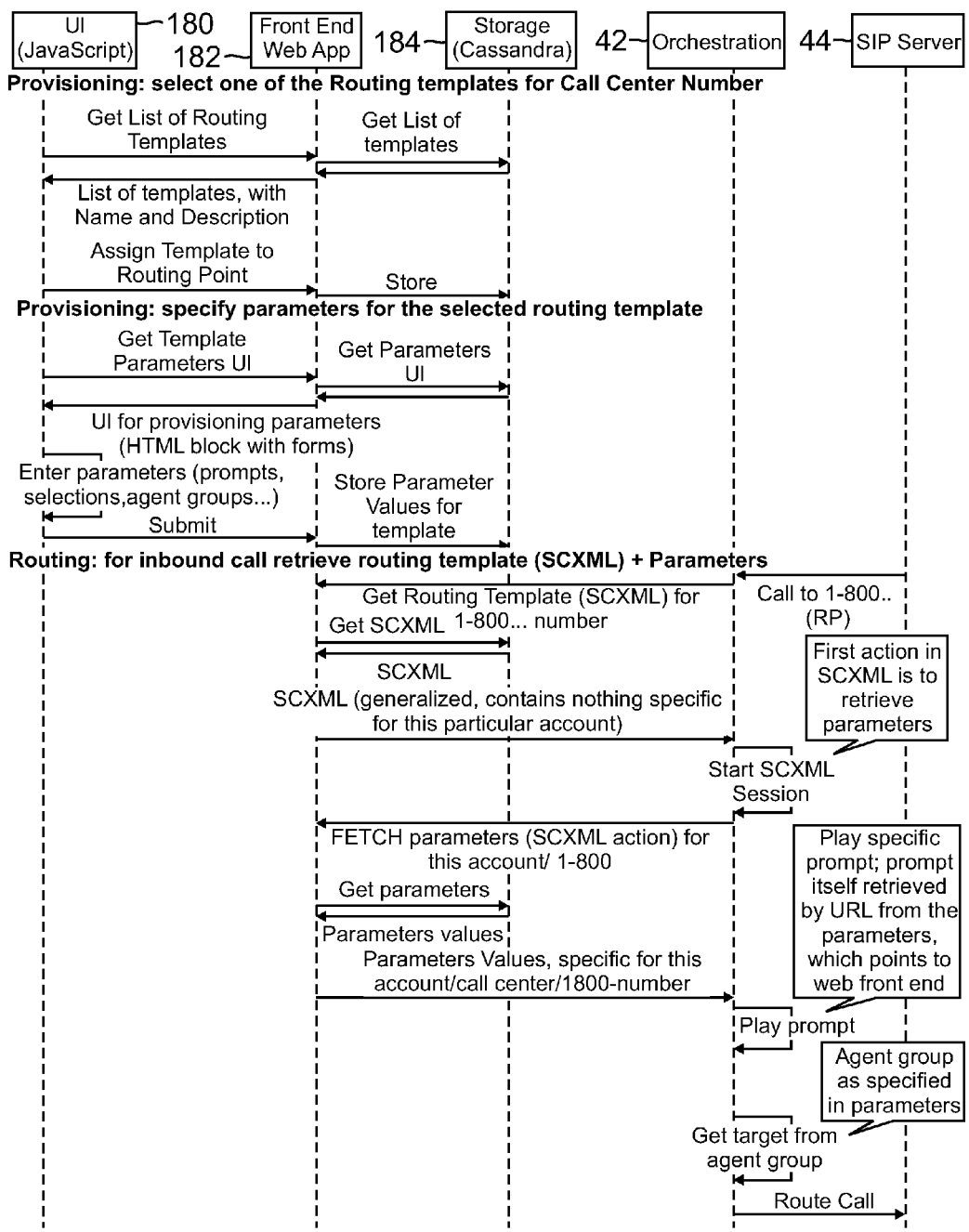
FIG. 31 is a signaling flow diagram illustrating a processing sequence for configuring a routing logic for a contact center, and for routing an inbound call based on the configured routing logic according to one embodiment of the invention.

FIG. 31 is a signaling flow diagram illustrating a processing sequence for configuring a routing logic for a contact center, and for routing an inbound call based on the configured routing logic according to one embodiment of the invention.

In order to configure a routing logic for a contact center, a contact center user utilizes a UI 180 displayed on the user's web browser 51 (FIG. 2) to request a list of routing templates to a web application 182 running on the web server 40. According to one embodiment, the UI is provided by the specialized software 52 (FIG. 2) running on the third party web platform 20. The web application 182 in turn submits the request to a mass storage device 184 managed by the corresponding database server 48 (FIG. 1). The retrieved list of routing templates are provided for display to the UI 180. The UI receives user selection of a particular routing template along with identification of a queue/routing point to which the routing template should be assigned. The assignment of the selected routing template to the routing point is stored in the mass storage device 184.

The UI 180 further transmits a request to retrieve parameters from the associated metadata file. In response, the web application 182 retrieves the associated metadata file and generates a display based on the parameters specified in the file. The contact center user assigns the desired values for the displayed parameters and submits them to the web application 182 which is turn stores the values in the mass storage device 184. According to one embodiment, the values of the parameters may be links for accessing media or other objects assigned to the parameters.

Once the parameters for the selected routing template are specified, all incoming calls to the associated queue are processed according to the corresponding routing strategy.

A call routing processing sequence begins with the call coming in to a routing point (e.g. a queue associated with a telephone number). The SIP server 44 receives the call and distributes a call event to the orchestration server 42 which queries the web application 182 to retrieve the routing template strategy specified for the queue. The SCXML code for implementing the routing strategy is retrieved from the mass storage device 184 and forwarded to the web application 182. The web application 182 transmits a request to the orchestration server 42 to execute the routing strategy via the SCXML code. According to one embodiment, the SCXML code that implements the routing strategy includes an initial action that is invoked by the orchestration server 42 to obtain actual values of the routing template parameters. The executing of the initial action causes a request to be transmitted to the web application 182 to fetch the values of the parameters that have been stored for the particular queue. The parameter values are returned to the orchestration server 42. The orchestration server then executes the routing strategy using the retrieved parameter values. This may include for example, playing a specific voice prompt. The voice prompt may be retrieved via a URL specified for a corresponding parameter. A specific agent from an agent group may also be selected based on corresponding parameter values. Once the agent is selected, a request is transmitted to the SIP server 44 to route the call to the selected agent.

According to one embodiment of the invention, the use of templates or other graphical user interfaces for recommending routing strategies according to industry best practices, and for guiding a user step-by-step in configuring a routing strategy according to the specific contact center's business needs are extended to other configuration activities performed during an initial deployment of a contact center, as well as after the contact center has been deployed. For example, when a new contact center is to be deployed initially, a contact center user may select from various predefined configuration templates for being guided through the configuration process. The configuration templates may be organized in the mass storage device managed by the database servers 48 according to various industry verticals (e.g. finance, retail, medical, etc.). The configuration templates may also be categorized according to other criteria, such as, for example, contact center size. Other categories and sub-categories that may be used to organize and/or recommend the configuration templates will be evident to a person of skill in the art.

According to one embodiment, the configuration templates include parameters that are included for configuring a contact center according to the relevant industry's best practices. For example, a best practice for a contact center in the finance industry may be to have two 800 numbers for reaching the contact center. The template classified under the finance category may thus prompt the contact center user to pick two 800 numbers for the contact center for storing as values for the corresponding parameters. In another example, a best industry practice for a contact center that is identified to reside in California may be to set up both English and Spanish skills for its agents. In yet another example, a best industry practice for a contact center in the finance industry may be to have a separate queue for banking, a separate queue for mortgage, and the like. The contact center user may thus be prompted to input information (e.g. telephone numbers) to be associated with each of the recommended queues.

According to one embodiment, certain customization may be allowed to the contact center user beyond what is recommended via the configuration (or routing) templates. For example, if the template prompts for particular pre-defined queues, but the contact center desires to set up a queue that is not defined by the template, the template is flexible enough to allow the user to enter such a customized queue. For example, the template may include an "enter other queue" parameter which the user may select to provide a queue name, number, and the like.

According to one embodiment, the selected configuration template and associated values are stored in the mass storage device managed by the database servers 48 and provided to the configuration server 41 for automatic deployment of the contact center. In deploying a contact center, the configuration server instantiates a virtual machine for the contact center 41 in the remote computing environment and allocates resources (e.g. computing infrastructure) to the virtual machine commensurate to contact center needs as identified via the configuration parameters. If the contact center's needs change, and more or less resources are required, the configuration server 41 dynamically instantiates a new virtual machine, at runtime, according to the modified needs, migrates contact center data from the first virtual machine to the new virtual machine, and makes all other necessary updates to ensure that calls are routed to the new virtual machine.

In addition to automatically allocating physical resources during the configuration process, the configuration server 41 further automatically configures the relevant servers (e.g. SIP, media, etc.) and takes other actions deduced as being necessary based on the parameters explicitly identified. For example, if a contact center in the finance industry has a credit card queue enabled, special security features may automatically be set up in handling calls directed to this queue.

Providing Dynamic Elasticity of Contact Center Resources

Embodiments of the present invention are also directed to a system and method for monitoring operation of a contact center for providing real time elasticity of contact center resources based on the monitoring. The resources may be, for example, hardware components, software applications, contact center services, and the like. The resources are described as being elastic because the resources may scale up and down based on detected conditions or needs of the contact center. The scaling may be linear for some resources and non-linear for others.

The system is also elastic in the sense that resources may be switched from one resource of one type to another resource of the same type, or from one resource of one type to another resource of a different type (e.g. replace an email server with a SIP server). Economy of scale may also be considered in adjusting resources in a multi-tenant environment. For example, resources may be re-allocated amongst the various tenants instead of being physically added or removed.

According to one embodiment, the resources of a contact center tenant are hosted in a remote computing environment, such as, for example, the remote computing environment 24 of FIG. 1. The resources are maintained by a contact center service provider who provides contact center services on behalf of the contact center tenant as software as a service (SaaS). Tenants may pay for the provision of the contact center service based on, for example, the amount of resources that the tenant wants allocated for servicing its customers. A tenant may pre-provision resources sufficient to handle peak capacity of interactions (e.g. voice call, emails, chat session, etc.). For example, the tenant may pre-provision 50% more hardware and software resources than what would be needed under normal traffic conditions. However, even such buffer may be insufficient to handle critical peaks (e.g. in the event of a natural disaster) or seasonal loads (e.g. Black Friday for retailers). Also, depending on the type of contract between the SaaS provider and the tenant, the pre-provisioning may mean that the tenant is paying for the pre-provisioned resources even if such resources are not actually used.

According to embodiments of the present invention, instead of tenants pre-provisioning resources in anticipation of, for example, increased interactive volume (e.g. increased voice calls, emails, social media messages, etc.), tenants may purchase core resources for handling core needs of its customers, and based on monitoring of traffic, resources, historical data, trends, and the like (collectively referred to as contact center operation data), adjustments may be made to dynamically increase resources and services offered by the tenant to adjust to increased service and traffic demand when such increased demand is detected or predicted. When the added resources or services are no longer needed, adjustments are made to dynamically decrease resources by, for example, shutting down unnecessary resources and services, switching to less powerful resources, or the like. In this manner, the tenant is charged for those resources that have been activated on behalf of the tenant, but not for resources that are inactive, resulting in savings to the tenant's operational cost. Furthermore, the real-time elasticity provided by embodiments of the present invention allows tenants to adjust to even unexpected situations by scaling up or down its resources as much or as little as needed.

With respect to the SaaS service provider, resources that have been deactivated for a particular contact center tenant may be reallocated to another contact center tenant so as to not have a resource running idle. If a particular resource is not used by any tenant, the resource may be removed in order to decrease or eliminate costs associated with having such a resource in idle state.

In regards to a computing device running in idle state, there is savings when compared to a computing device on which applications are running active. However, such savings may only be partial since there is still power consumption, cooling, network usage, maintenance personnel, and the like. The partial savings may be preferred over shutting down the computing device given the higher effort in restarting the device. Partial savings may be enhanced by leveraging dedicated hardware solutions such as intelligent power supplies or power saving modes (e.g. switching off graphics, etc. if applicable).

Figure 32:
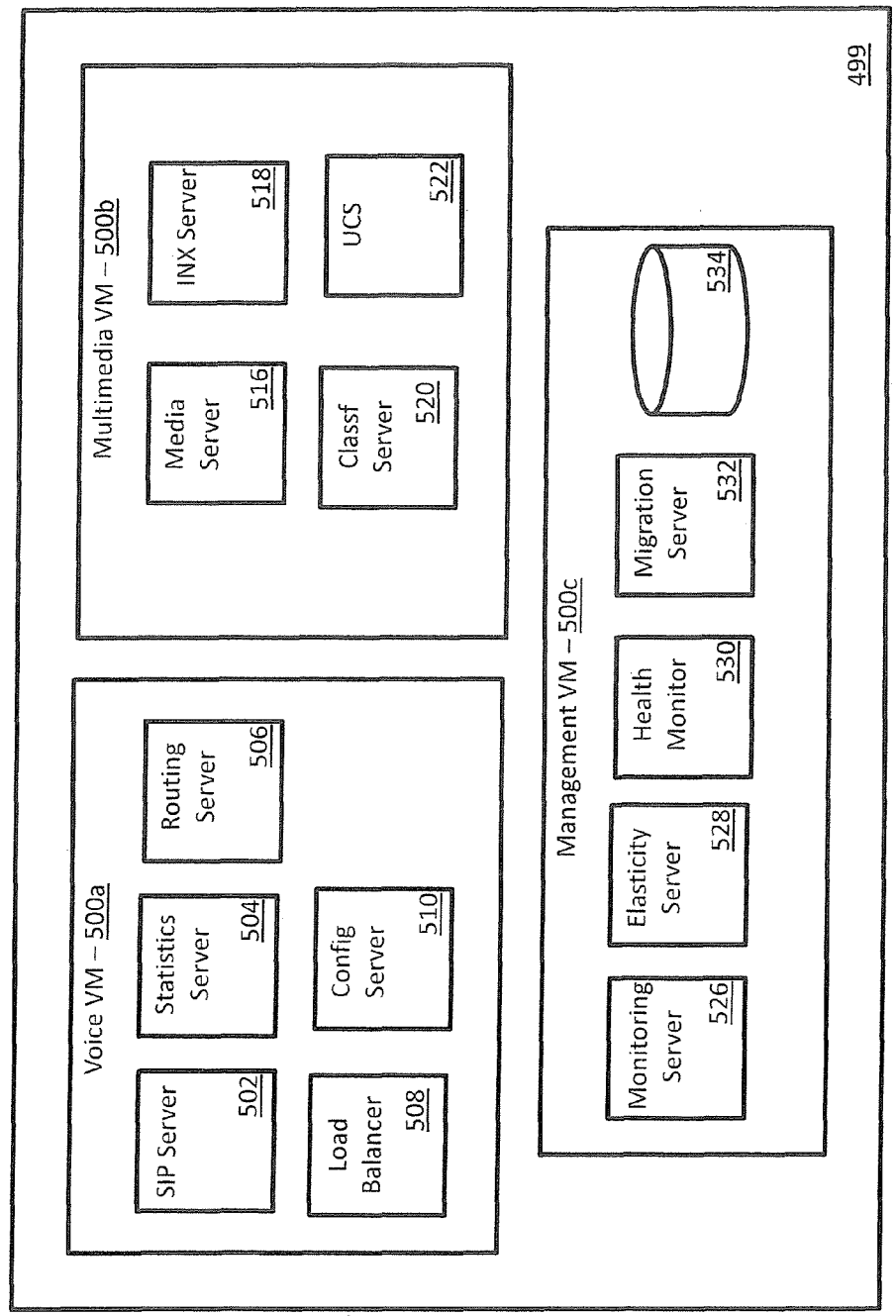
FIG. 32 is a block diagram of various virtual machine instances running on hardware infrastructure provided on a remote computing environment according to one embodiment of the invention.

FIG. 32 is a block diagram of various virtual machine (VM) instances 500*a*, 500*b*, and 500*c* (collectively referred to with reference number 500) running on hardware infrastructure 499 provided on a remote computing environment, such as, for example, the remote computing environment 24 of FIG. 1, according to one embodiment of the invention. Each virtual machine instance 500 may be similar to the virtual machine 54 of FIG. 2. Multiple virtual machines may run on one or more physical computers. Each virtual machine may have the same or different mix of applications. Also, although not depicted, a virtualization layer may run on top of the physical computer.

According to one embodiment, each virtual machine 500 is a software-based computer running on the host physical machine 499 and providing particular contact center services on behalf of one or more contact center tenants. The virtual machines 500 may share the same operating system. In other embodiments, different operating system may be run on each virtual machine instance. According to one embodiment, a "hypervisor" type of virtualization is implemented where multiple virtual machines run on the same host physical machine, each acting as if it has its own dedicated box. Of course, the virtual machines 500 of FIG. 32 may also run on different host physical machines.

Exemplary virtual machines include but are not limited to a voice VM 500a, multimedia VM 500b, management VM 500c, and the like. One or more contact center applications (referred to as servers) may run within each VM. For example, the voice VM 500a hosts applications/servers for handling voice calls including, for example, a SIP server 502, statistics server 504, routing server 506, load balancer 508, and configuration server 510.

The SIP server 502 may be similar to the SIP server 44 of FIG. 1, and may be configured to set-up and tear down calls between SIP devices and control call routing. The statistics server 504 may be similar to the statics server 50 of FIG. 1, and may be configured to include real time data on call statistics, agent statistics, and the like. The routing server 506 may be similar to the orchestration server 42 of FIG. 1, and may be configured to execute a routing strategy for a particular route point (e.g. a directory number) configured on the routing server. The load balancer 508 may be coupled to the SIP server 502 and to various instances of the routing server 506 and may be configured to handle load distribution of calls to be handled by the routing servers. In other embodiments, the load distribution functionality may be provided by, for example, the SIP server 502, in which case a separate load balancer 508 may not be necessary.

The configuration server 510 may be similar to the configuration server 41 of FIG. 1, and may include a configuration engine for configuring or reconfiguring the resources of a contact center. For example, the configuration server 41 may be invoked to pre-configure an instance of a SIP server by describing attributes of the SIP server. Once pre-configured, the instance may be activated upon detecting a need for another SIP server.

As another example of a specific virtual machine, the multimedia VM 500b includes one or more instances of a media server 516, an interaction server 518, a classification server 520, and a universal contact server 522. The media server 516 may be, for example, an email server, chat server, social media server, and/or the like, configured to process different types of multimedia interactions and/or interact with different media platforms such as, for example, social media platforms. The multimedia interactions may include, for example, email, vmail (voice mail through email), chat, video, text-messaging, web, social media messages, screen-sharing interactions, and the like.

The media server 516 is configured to generate an interaction for the interaction server 518. According to one embodiment, the interaction server 518 acts as a central hub for managing and processing the interactions. The classification server 520 is configured to prioritize the interactions for delivery to contact center workers. The universal contact server 522 is configured to maintain and provide customer contact profiles, including customer contact information (e.g. names, addresses, phone numbers, etc.), contact history (previous interactions with the contact center), and other data used in processing interactions, such as standard responses and screening rules.

As a person of skill in the art should appreciate, a particular server running on a particular VM may be moved to a different VM, or a new VM may be instantiated for running the particular server. Other exemplary VMs include, for example, a workforce management VM, voice platform/recording VM, and the like.

According to one embodiment, a management VM 500c is provided with various servers for providing elasticity management of contact center resources according to one embodiment of the invention. The management VM 500c may be dedicated to a single contact center tenant or shared amongst various contact center tenants. According to one embodiment a separate management VM may also be instantiated for providing different types of management with dedicated solutions. For example, a management VM may be separately provided for management of the VM infrastructure (via e.g. VMWare Studio), and another management VM may be separately provided for managing the various contact center processes.

The servers running on the management VM 500c may include, for example, a monitoring server 526, elasticity server 528, health monitor 530, migration server 532, and the like. The monitoring server 526 may be configured to monitor and collect contact center operation data. The type of data that is monitored and collected may depend on the resource layer that is subject to monitoring, such as, for example, a hardware layer, a platform/software layer, an operational/business layer, and the like. According to one embodiment, monitoring parameters may be configured by the contact center tenant for each resource layer. Such parameters may be configured via templates or GUIs described above with respect to other embodiments. The monitoring parameters may identify, for example, the resources that are to be monitored for that layer, the type of information that is to be collected, how often the information is to be gathered, how often collected information is to be output, and the like.

For example, the monitoring parameters for the hardware layer may configured so that the monitoring server 526 monitors usage of different hardware resources, such as, for example, CPU load, memory usage, number of VM machines using the hardware resources, and the like. The monitoring parameters for the platform/software layer may be configured to that the monitoring server 526 monitors the load of each server instance that is running on each virtual machine, such as, for example, the load of the SIP server 502, statistics server 504, routing server 506, interaction server 518, media server 516, classification server 520, and the like. The monitoring parameters for the operational/business layer may be configured so that the monitoring server 526 monitors the type of interaction channels that are enabled, traffic on each interaction channel, the type of features/services that are enabled (e.g. inbound calls, outbound campaigns, etc.), average handle time, routing strategies, and the like. Interactions are meant to refer to all voice and multimedia interactions between customers and a contact center resource, such as, for example, traditional PSTN calls, VoIP calls, emails, vmails (voice mail through email), chat sessions, video sessions, text-messaging (SMS) sessions, web interactions, social media interactions, screen-sharing interactions, and the like.

Granularity of the monitoring may be adjusted by the contact center administrator by adjusting configuration settings of the monitoring server 526. For example, instead of monitoring all interaction volume for a particular media channel, the interaction volume may be monitored at a more granular level. For example, the monitoring server 526 may be configured to monitor interaction volume relating to a specific product, service, or the like. The monitoring may also be configured to be on an hour by hour basis, or minute by minute basis.

There are other types of data that may be monitored by the monitoring server 526, and some may even relate to non-contact center events which may nonetheless affect demand of contact center resources such as, for example, weather conditions, stock market performance, special events (e.g. elections, Super Bowl, holidays, etc.), and the like.

The elasticity server 528 is configured with instructions for processing the data monitored by the monitoring server 526 and providing an output that results, in some instances, dynamic adjustment of contact center resources according to one embodiment of the invention. The actual adjustment of resources may be performed by the migration server 532 based on the adjustment parameters provided by the health monitor.

According to one embodiment, the elasticity server 528 is configured to run an elasticity function that takes input parameters from the monitoring server 526 and generates output parameters in response. The elasticity server 528 may be configured with multiple elasticity functions, such as, for example, a different elasticity function for each resource layer or resource type.

According to one embodiment, the elasticity function is triggered in response to satisfying certain conditions. For example, thresholds may be defined for the different monitoring layers. The elasticity processor 528 may be configured to determine whether a threshold value at one or more layers have been met before triggering the elasticity function and generating adjustment parameters. The thresholds may define boundaries of acceptable variations of contact center operation. The thresholds may also define an acceptable maximum duration for exceeding those boundaries, after which the elasticity function is invoked. In this manner, short term periods in which those boundaries are exceeded may be tolerated.

The elasticity function may be triggered based on analysis of other inputs including, for example, historic operations data as stored in a mass storage device 534. The mass storage device may be managed, for example, by a database in the set of database servers 48 of FIG. 2. In this regard, even if the current operation data provided by the monitoring server 526 does not by itself trigger an adjustment, adjustment may be recommended or proactively invoked in response to predictions based on the historic data. For example, historic data retrieved by the monitoring server 526 or elasticity processor 528 may indicate that inbound calls and web orders for a contact center tenant running a flower shop will be ten times heavier on Valentine's Day than on other days. In response to such data, the elasticity server 528 may be configured to proactively notify the tenant that additional resources (e.g. an additional instance of the SIP server 502 and/or routing server 506 to handle the voice calls, and an additional instance of the interaction server 518 and/or media server 516 to handle the web orders) are recommended. In response, the tenant administrator may invoke the configuration server 510 to configure a new instance of the recommended resource assuming that such resources have not already been pre-configured and put on standby mode. The configuration may be done via templates and/or GUIs as described above. The administrator may manually activate the new resources on Valentine's Day and manually shut them down after Valentine's Day. The activation/deactivation may also be automatic. For example, the administrator may pre-schedule into the migration server 532 the dates in which the new resources are to be activated and deactivated. Upon arrival of the pre-scheduled date, the migration server may automatically activate the new instance of the identified resources. When the date passes, the migration server may be configured to return to the original deployment prior to instantiating the new resources.

Additional considerations in triggering the elasticity function may relate to trend forecasting. According to one embodiment, the elasticity server 528 may be configured to forecast a trend based on a current situation. If the probability of accuracy of the trend forecasting is above a threshold level, the elasticity server 528 invokes the elasticity function to output adjustment parameters based on the prediction. In one embodiment, the adjustment is not recommended nor initiated if confidence of the forecast is below the threshold level. Such trend forecasting may employ calculations using an Erlang formula as will be understood by a person of skill in the art.

Trend forecasting may be reactive (short-term reaction) or proactive (mid/long-term reaction). For example, for reactive forecasting, the system may be dimensioned for engineered capacity A (measured via traffic, CPU load, memory consumption, I/O traffic, the like). A rules based criteria may exist that indicates when safety capacity B (as defined by A+a) is exceeded (e.g. CPU above threshold for 1 minute). In this case, a reaction may be triggered, such as, for example, creating an additional VM instance with respective services/applications, and incorporating it into the contact center operation. The new VM can be either the same or on a different computer. According to one embodiment, multiple capacity thresholds may be configured with different reactions. When load decreases, the reverse of the above process may be executed. Also, corresponding logic may be applied when underload situations are encountered for reducing resource use.

According to one example, for proactive forecasting, the system may operate with planned capacity schedule (e.g. based on history). A planned capacity profile may include information on expected load curve. If the actual (measured) load curve deviates from the predicted one, the capacity schedule may be adjusted, even if the system does not yet experience actual over-/under-load. For example, the system may be configured to refine prediction for the rest of the day based on first hour operation by comparing actual with forecasted load.

The elasticity function, once invoked, may output adjustment parameters for dynamically adjusting the resources of the contact center at run time. The adjustment parameters may relate to a single monitored layer that is affected (e.g. hardware layer), or relate to multiple layers (e.g. hardware and platform/software layer). For example, in response to input from the monitoring server 526 that the CPU load is 70%, the virtual machine 500 running on the current CPU may be moved to a more powerful CPU. In another example, in response to input from the monitoring server 526 that all agents with skills to respond to incoming emails are logged out, email capability/services may be removed for the particular tenant. This may include, for example, removing the email portion of the media server 518 from the multimedia VM 500*b*, unloading email routing rules, disabling email handling capability for agents, removing email from reports, and the like. In yet another example, if the contact center tenant hires new agents, a new SIP server 502 may have to be launched and new directory numbers for the new agents may have to be added in order to accommodate the new hires.

According to one embodiment, computation of the adjustment output parameters may be done in real-time or selected from a look up table storing pre-calculated adjustment parameters. If a lookup table is utilized, off-line simulations may be performed based on, for example, historical data, and adjustment parameters generated from such simulations may be stored in the lookup table along with metadata. The metadata may define input conditions that may trigger adjustment utilizing those parameters.

Whether the calculation of the adjustment output parameters is in real time or not, the elasticity function may be configured to select those parameters that relate to an optimal adjustment strategy for the contact center tenant. For example, one adjustment strategy in light of increased voice traffic may be to instantiate a new SIP server 502. The output parameters for such strategy may state which resource to instantiate (e.g. SIP server), how much of that resource to instantiate (e.g. one additional), on which place (physical server, OS, VM) to create the new SIP server, and the like. If other resources are also to be added to handle the increased voice traffic, the output parameters may relate to those other resources. In determining which place to create the new server, the elasticity function may take into account the free capacity on the given place and comparing the free capacity with predicted capacity consumption of the new SIP server.

Instead of adding a new SIP server to handle the increased voice traffic, however, another strategy that achieves same or similar results may be to move the voice VM 500*a* to a more powerful machine.

In determining which of various possible adjustment strategies to select, the elasticity function may be configured to take into account the conditions, constraints, and/or objectives defined for the contact center tenant. These factors may also be taken into account even after a particular adjustment strategy has been selected to determine, for example, whether the adjustment makes sense in light of risks/penalties of performing the adjustment, or health of the deployment state that is expected as a result of the adjustment.

The conditions, constraints, and/or objectives of an adjustment may be ranked by the contact center tenant in terms of importance. For example, if the tenant would rather pay more in resource usage rather than opt for a solution that may have negative impact on service, the function may be, configured to select a strategy that minimizes negative impact on service. The tenant may also prefer to maintain a current mix of services (e.g. 10% of resources are dedicated to email, 70% of resources are dedicated to voice, 20% of resources are dedicated to other media) instead of increasing or decreasing only a certain service utilizing only a certain media channel. In this case, the function may select an adjustment strategy that scales proportionally/linearly across all services even though an equally viable strategy may exist which provides non-linear scaling by only increases/decreases resources for the service in high/low demand.

In another example, the elasticity function may be configured to consider cost/expense of making the adjustment, time constraints in activating/deactivating resources, level of required service continuity, and the like, in selecting the adjustment strategy. The cost may be operational expenses for additional or more powerful infrastructure use. Other expenses to consider may be service related penalty due to the adjustment. For example, there may be a slight delay in activating a new resource, potentially resulting in abandonment, data loss, or the like. In the event that a new routing server 506 is added and an active call handled by a current routing server is handed off to the new routing server, there may be service delay due to the routing strategy having to be re-executed by the new routing server from the beginning. Predicted health of the new state of the contact center upon adjustment may also be considered in selecting the adjustment strategy.

According to one embodiment, the elasticity function is configured to utilize economy of scale for shared multi-tenant environments so that, instead of adding or deleting resources, resources are reallocated from one contact center tenant to another. Generally speaking, the increase and shrinkage of demand for contact center resources are not synchronized across contact center tenants. That is, one contact center tenant may experience a peak in incoming traffic at certain times, while another contact center tenant will experience low traffic at those times. Thus one contact center tenant may have low utilization of resources such as the SIP server 502 or interaction server 518, while another contact center tenant may be in need of increase of such resources. According to one embodiment, the elasticity function is configured to re-allocate resources from one tenant to another instead of creating additional instances of the resources for the contact center tenant that is in need of such increased resources. If such a strategy is chosen, the output of the elasticity function includes parameters for de-allocating resources for one tenant and allocating the same resources to a different tenant.

The reallocating of resources may be implemented as follows according to one embodiment of the invention. In case of full tenant separation where each tenant has its own full environment (e.g. its own voice VM, multimedia VM, etc.) including configuration and management capabilities, the migration server 532 may be configured to:

a) extract configuration for a given resource in the first tenant environment;

b) import the configuration into the second tenant's configuration (with adjusting connections between servers, but keeping most options the same, e.g. association with physical hosts);

c) shut down resources in the first tenant environment; and d) start resources in the second tenant environment.

If tenants have a shared configuration environment, certain resources for entities in the shared environment may be moved from one tenant to another, such as routing points on switches or SIP Servers. For example, the DNs managed by the SIP server may be adjusted so that DNs of the first tenant are replaced with DNs for the second tenant.

A multi-tenant contact center environment creates additional considerations that the elasticity function may consider in selecting the optimal adjustment strategy and generating associated output parameters. One consideration is a "noisy neighbor" effect. According to one embodiment, the elasticity function is configured to select an adjustment strategy that is configured to avoid/limit impact on other tenants sharing the same hardware or software infrastructure. For example, two tenants may share the same server instance when the first tenant experiences a peak in interaction volume that slows down processing of interactions for not only the first tenant, but also the second tenant. In this situation, the elasticity function may output adjustment parameters that affect the first tenant, the second tenant, or both. For example, the elasticity function may output that the second tenant be given its own server executable, maybe on a less powerful machine but enough to handle its own traffic. The first tenant may remain in the first, more powerful machine which is now able to handle the increased traffic.

According to one embodiment, the migration server 532 may be configured to migrate the contact center from a current deployment state to a target deployment state that satisfies the adjustment output parameters of the selected adjustment strategy. In this regard, the migration server 532 may be configured to consult an archive of states/deployments in order to select, based on metadata defining parameters of the various deployments, a deployment state close to what is needed based on the selected adjustment strategy and output parameters. The deployment archive may be hosted for example, in the mass storage device 534, and may relate to a single contact center tenant or to multiple contact-center tenants. The archived states may be those that have been tried already and have proven to be healthy for the particular vertical industry or contact center type to which the current contact center tenant belongs, as is discussed in further detail below with respect to the health monitor 530. If the conversion process from a current state to the new state is also archived due to the same migration having been carried out in the past, the migration server 532 may be configured to simply retrieve and apply the archived conversion process for automatically effectuating the migration to the new state. The migration server 532 may also be configured with different scripts for automating the adjustment of contact center resources. If the new migrated state proves to be unhealthy, the migration server 532 may be configured to revert to the state prior to the migration. In this regard, the migration server maintains a history of deployments in order to revert to a prior deployment state if needed.

If the migration procedure from an original state to a target state is not archived and no script exists for automating the process, then the migration may be manually executed by a contact center administrator in response to prompts. As the administrator takes steps to effectuate the adjustment, those steps may be recorded by the migration server and stored in the archive for later use in automating the migration for the same contact center tenant or other contact center tenants.

With reference again to FIG. 32, the health monitor 530 running on the management VM 500c is configured to monitor the health of current deployments and maintain information of the deployments in the deployment archive for later use. The health of a particular deployment may depend on the health of different aspects of contact center operation which may include, for example, those aspects monitored by the monitoring server 526. The health of a particular deployment may depend on the health of different aspects of contact center operation which may include, for example, those aspects monitored by the monitoring server 526. For example, the health monitor may be configured to monitor service levels, agents' occupancy, call abandonment, customer satisfaction, and the like. Different key performance indicators (KPIs) maintained for the contact center may be used to judge the health of the different aspects of the contact center to ultimately determine the health of the current deployment. If all KPIs for the current deployment are within acceptable boundaries, the deployment may be deemed to be healthy.

Based on the monitoring of the health of a particular deployment/state, the health monitor may be configured to generate or update metadata relating to the state. For example, if the particular deployment is deemed to be healthy, the health monitor may be configured to store metadata that indicates, for example, that the particular deployment is a good target state for handling X number of voice calls with Y number of agents and achieving a customer satisfaction rate of, for example, 98%. Other details that could be stored as part of the metadata include but are not limited to agents' occupancy, average speed of answer, average handling time, % answer within target, abandonment rate, average queue length, and the like, that is targeted by the particular deployment.

Otherwise, if a current deployment is deemed to be unhealthy due to low performance in one or more aspects of the contact center, the metadata may indicate this as well.

According to one embodiment, the data that is archived in the deployment archive for a particular deployment/state includes deployment settings (e.g. which servers are deployed, how many of each server, how do they interconnect, etc.), configuration parameters for the individual servers, option settings, agent information, routing strategies, and other information needed for running a contact center. The deployment data may be captured, for example, by creating an image of the virtual machine 500 that is configured and running the current deployment. The image may be captured using tools such as, for example, tools provided by VMware, Inc. The captured image may be stored, for example, in the mass storage device 534. Once captured, the image may then be loaded, for example, on another computing device to recreate the same deployment environment as in the captured image.

The procedure as well as the expense of migrating to the particular deployment/state from an original deployment may also be archived and stored in the deployment archive. The expenses may be monetary expenses incurred in migrating to the particular state, service quality impact during the actual migration, and/or the like.

The procedure that is archived to migrate to a particular target state may include changes in configuration, the migration steps that are involved, the sequence of such migration steps, and the objects that are affected and in what order. According to one embodiment, the procedure may initially be performed manually by a contact center administrator. While the administrator performs the steps to migrate from a current state to a target state, his or her actions may be recorded using, for example, tools provided by VMware, Inc. Thus, instead of capturing an image of the final deployment, the runtime codes and the recorded configuration session may be captured to recreate the deployment by the migration server 532. In this regard, an administrator accessing the migration server 532 may, for example, click a button, and the recorded procedure may be re-executed in an automated fashion to migrate a current deployment to the target deployment.

An example of a migration procedure when a new component replaces an old component may include, as a first step, installing a new license file for the new component. Next, the procedure may require that a new database be installed because the new component uses a new database. If the table structure for the new component is different, a script may be run to create the table structure for the new component. Data may then have to be migrated from the old component to the new component, requiring that another script be run in order to convert the data from the old table structure to the new table structure. According to one embodiment, as each step is performed, the step may be recorded and stored in the deployment archive for later use.

According to one embodiment, as the health monitor 530 collects healthy states and transitions and associated migration procedures, an expert system may be created which learns and recommends optimal deployments for contact centers based on monitored conditions. The gathered data may be for a single contact center tenant or gathered across various contact centers in a multi-tenant environment.

Figure 33:
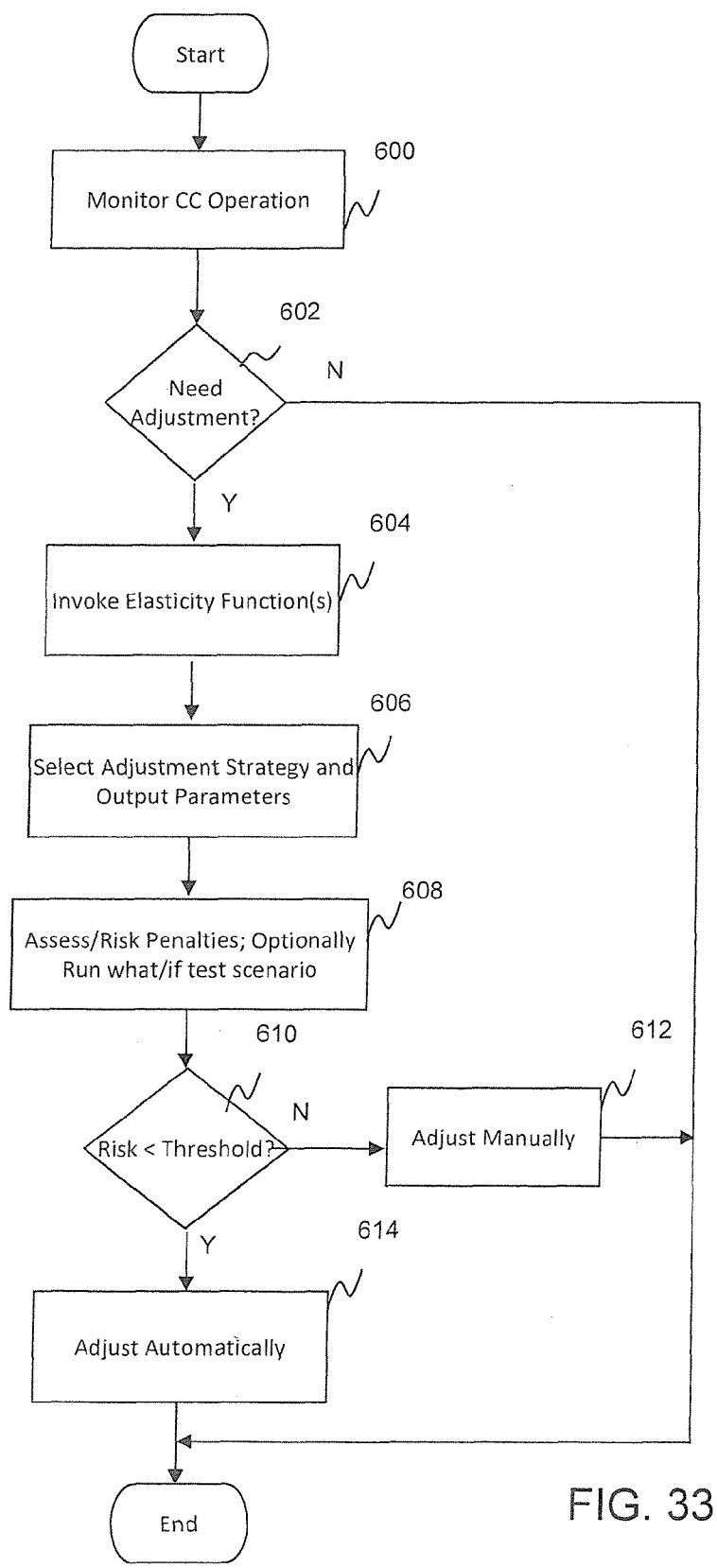
FIG. 33 is a flow diagram of a process for providing dynamic elasticity of contact center resources according to one embodiment of the invention.

FIG. 33 is a flow diagram of a process for providing dynamic elasticity of contact center resources according to one embodiment of the invention. In act 600, the monitoring server 526 monitors and collects contact center operation data defined by one or more monitoring parameters. According to one embodiment, currently deployed resources (e.g. SIP Server, etc.) may run with overload protection activated. In this instance, the SIP server may reject traffic when running into overload. The fact that traffic is rejected may be detected by the monitoring server for triggering adjustment actions, such as adding resources.

The monitoring parameters may be configured, for example, for each resource layer. The resource layer may include, for example, a hardware layer, platform/software layer, and operational/business layer.

The monitored data is provided to the elasticity server 528, and the elasticity server analyzes the collected data and compares the data against preset thresholds for identifying a condition that calls for adjustment of contact center resources/services. The condition may be variance from normally anticipated conditions for the contact center. For example, the variance may be interaction volume that is more or less than threshold interaction volume, load of servers that is more or less than a threshold load, and the like. Each resource in a particular resource layer may have a different threshold that is compared against collected data for determining variance. Data other than data collected from real-time monitoring of contact center operations may also be provided to the elasticity server 528 in order to determine current or projected variance. For example, historical data may be provided to the elasticity server 528 to determine projected variance.

In act 602, the elasticity server 528 determines whether the detected variance is sufficient to invoke an elasticity function. One or more thresholds from the same resource layer or from different resource layers may be considered in determining that one or more elasticity functions should be triggered. For example, both a CPU load higher than a first threshold and a load of the routing server 506 higher than a second threshold may be needed to trigger the elasticity function. Either situation by itself, however, may be insufficient to cause the triggering of the function. In addition, the elasticity server may be configured to tolerate operation of the contact center at conditions that meet or exceed thresholds, if such conditions are not prolonged. In this regard, the elasticity server 528 may be configured to monitor the amount of time in which the variance conditions are present, and trigger the elasticity function if the variance conditions exceed a maximum acceptable duration preset by a contact center administrator.

In act 604, one or more appropriate elasticity functions are invoked using, as input, the data collected by the monitoring server 526. Other data such as historical data may also serve as input to the elasticity function.

In act 606, the elasticity function considers the inputs along with any conditions, constraints, and/or objectives, and selects an optimal adjustment strategy in light of the conditions, constraints, and/or objectives. According to one embodiment, optimized parameters consistent with the selected strategy are then output.

In act 608, the elasticity server 528 may be configured to assess penalties and risks in performing the adjustment. For example, there may be penalties in migrating from a current state to a target state, such as, negative impact on certain service operations. For example, the target state may require re-execution of the routing strategy which requires customers to re-answer certain questions, or there may be a slight delay in activating the target state which could lead to abandonment of calls. If the target state has been deployed in the past, the health of the target state may be examined in assessing the risk/penalty of performing the adjustment. The same or different penalties and risks may also be considered in selecting the optimal adjustment strategy in act 606.

In certain embodiments, the elasticity server 528 may be configured to run a what/if test scenario to test all or certain aspects of the selected adjustment strategy in order to assess the risk of implementing the adjustment. For example, if the adjustment strategy calls for adjusting the existing routing strategy in order to push more calls to an IVR environment in the event of heavy call traffic into the contact center, the elasticity server 528 may be configured to test the adjusted routing strategy with simulation data to ensure that the strategy works properly prior to actually implementing the change in the routing strategy.

In act 610, the elasticity server determines whether the adjustment to the target state involves low risk or high risk. For example, low risk may be determined if the assessed penalties are below a particular threshold. In other examples, low risk may be determined if the same adjustment has been performed successfully in the past.

According to one embodiment, in the event that the risk of migrating to the new state is less than a preset threshold, the migration server 528 automatically carries out the adjustment to achieve the target state. In some instances, this may be simply retrieving an image of the virtual machine 500 implementing the target state and re-loading the image on a target device. In other instances, it may be automatically executing a recording of migration steps previously taken manually to implement the adjustment to the new state.

According to one embodiment, in the event that the risk of migrating to the new state is more than a preset threshold, the elasticity server 528 prompts the contact center administrator to perform the adjustment manually in step 612. For example, if the target state is new and untested, the adjustment may be done manually. For example, a contact center administrator may have to manually activate another instance of a SIP server or interaction server. The manual adjustment steps may be captured by the migration server along with any expenses in going from the original state to the target state, and stored in the mass storage device for later use. In other embodiments, some of the adjustment may be automatic while some is manual.

In one exemplary use case, the selected adjustment strategy calls for moving a virtual machine 500 from one computing device to a target, more/less powerful, computing device. In implementing this adjustment, the migration server 532 may be configured with a migration tool such as, for example, a tool offered by VMWare. The tool may be invoked automatically by the migration server 532 in response to adjustment outputs provided by the health monitor, or manually based on user command. As a person of skill in the art should understand, in migrating the virtual machine 500, the tool may first isolate the memory areas that are not changing from those memory areas that are changing, and migrate the memory areas that are not changing first before migrating the memory areas that are changing. In addition, the tool is configured to preserve the IP addressing of the various servers running on the virtual machine, even after they move to the target computing device.

In another exemplary use case, the virtual machine 500 is configured with a core/basic set of resources for providing basic contact center services and handling an interaction volume between X1 and X2. The monitoring server 526 continually monitors the interactions and provides the information to the elasticity server 528. The elasticity server may be configured with an elasticity function that causes a farm of servers (e.g. all servers running on the voice VM 500a for handling increased voice calls, or all servers running on the multimedia VM 500*b* for handling increased multimedia calls other than voice calls) to be added for the contact center as the interaction volume approaches X2. Prior to the interaction volume reaching X2, the elasticity server is configured to output parameters for starting a farm of Y servers configured to handle an increased interaction volume between X2 and X3. When the interaction volume falls below X2 by a preset amount, the elasticity server is configured to remove the additional servers that are no longer needed due to the decrease in the interaction volume.

According to one embodiment, increased load of individual processes/servers running on a particular virtual machine may trigger the elasticity server 528 to add another instance of, for example, just the overloaded process without having to add all the other servers running on the virtual machine on which the overloaded process runs. Of course, the process could indeed be overloaded, or could run in self-protection mode where the process rejects load above a certain threshold. In the latter case, the process may stay as is, and adding another process (on same or different computer) in load balancing mode may solve the problem.

For example, the monitoring server 526 may detect an increased load of an existing SIP server 502. The monitoring server 526 may be configured to monitor the load of the existing SIP server by, for example, a percentage of INVITE messages re-transmitted by the existing SIP server. That is, if the SIP server is overloaded, the percentage of INVITE messages that is re-transmitted increases due to the initial INVITE messages failing to go through. The monitoring server may also consider use of hardware resources (e.g. CPU load) in determining the load of the SIP server.

When the percentage of INVITE messages that are re-transmitted exceed a preset threshold number for a threshold duration of time, the elasticity server 528 may be configured to add a second instance of the SIP server to the voice VM 500*a*. The migration server 532 receives parameters from the elasticity server indicating, for example, that another instance of the SIP server is to be added. The migration server may then execute a script for automatically activating the new instance of the SIP server.

According to one embodiment, the activated SIP server may be a stand-by SIP server that has been pre-configured via the configuration server 510. An instance of the stand-by SIP server may be created by assigning a name and describing attributes of the server, such as, for example, connections to other servers, the software version of the server, and the like. Once created, the settings of the stand-by SIP server are programmed, such as, for example, telephony objects (directory numbers (DNs)), accounts of agents, and the like. With respect to the directory numbers, the DNs may be dynamically allocated at runtime according to a consistent hashing algorithm instead of being statistically allocated, as is described in further detail in U.S. application Ser. No. 13/844,159 entitled "System and Method for Additional and Removal of Servers in Server Cluster," filed Mar. 15, 2013, the content of which is incorporated herein by reference. Other configuration options on the SIP server may relate to default routing options in case the routing server 506 does not respond to a routing request within a preset time.

According to one embodiment, when the migration server 532 activates the stand-by instance of the SIP server, the stand-by instance first connects to the configuration server 510 for reading its configuration data. The instance finds its name and reads the configuration settings to determine for example, to which SIP proxy to connect to as well as other runtime settings. Once the configuration settings are read, the SIP server instance is activated and ready to handle telephony calls. According to one embodiment, the new instance of the SIP server is assigned a new IP address. The new IP address is communicated to the edge device 22 for being included in load balancing the telephony calls to the various instances of the SIP server. If the new instance of the SIP server is no longer needed, the IP address of the SIP server is deleted from the edge device and deactivated via the configuration server 510.

In a further exemplary use case, the adjustment strategy may call for adding an instance of the routing server 506 in response to detecting an increased load of the routing server. For example, the routing server may be handling X number of concurrent calls which are time consuming. For example, the routing strategy executed by the routing server may require lookup of a database which creates load on the component.

The monitoring server 526 may be configured to monitor the load to the existing routing server by, for example, monitoring the time it takes for the routing server to handle tasks other than routing voice calls. Such other tasks are referred to as secondary tasks. An exemplary secondary task may be changing the routing server's configuration data to reflect a change in an agent's skill profile. Such secondary tasks may be handled by the routing server when it is not busy handling its primary task of routing voice calls. That is, if the routing server is overloaded, the time it takes for the routing server to handle secondary tasks may increase.

According to one embodiment, when the time it takes for the routing server to handle secondary tasks exceeds a preset threshold time, the elasticity server 528 may be configured to add a second instance of the routing server 506 to the voice VM 500*a*. The migration server 532 receives parameters from the elasticity server indicating, for example, that another instance of the routing server is to be added. The migration server may then run a script for automatically activating the new instance of the routing server. The deployment of the contact center thus migrates to a state with the new instance of the routing server.

According to one embodiment, the activated routing server may be a stand-by routing server that has been pre-configured via the configuration server 510. For example, the stand-by instance may be pre-configured with necessary connections to the SIP server 502, statistics server 504, and the like. When the migration server 532 activates the stand-by instance of the routing server, the stand-by instance first connects to the configuration server 510 for reading its configuration data. The instance finds its name and reads the configuration settings to connect to the appropriate SIP server, register statistics to the appropriate statistics server 504, load the appropriate routing strategy for the route point controlled by the routing server, and the like.

According to one embodiment, an active call could be moved from a current, overloaded routing server to the new instance of the routing server activated by the migration server 532. For example, the current routing server may be configured to periodically monitor a global variable that may be set, for example, by the elasticity server 528 or migration server 532, to signal the current routing server that a current call assigned to the routing server is to be transferred to the new routing server. The global variable may identify a route point (e.g. a directory number) controlled by the new routing server to which the call is to be transferred. While executing a routing strategy for a current call, the current routing server may be configured to periodically check to see if the global variable has been set. If so, the current routing server may be configured to signal the SIP server 502 to transfer the call to the new route point controlled by the new routing server.

The new routing server may be configured to run the same routing strategy as the current routing server. According to one embodiment, when the call is transferred to the new routing server, the routing strategy on the new routing server executes from the beginning. If certain steps of the routing strategy, such as, for example, asking questions to the customer via the IVR had already been executed by the first routing server, such steps are re-executed by the new routing server if the routing strategy is invoked again from the beginning, leading to inefficiencies and, in some circumstances, customer frustration.

According to one embodiment, the routing strategy in the new routing server resumes at the point in the strategy that was left off from the prior routing server. In this regard, the transferring routing server may be configured to attach to a call object, which stores details of a current call and is maintained by the SIP server 502, identification of a step in the routing strategy that was most recently executed once it determines that the global variable has been set and the call is to be transferred to the new routing server. When the call is transferred to the route point controlled by the new routing server, the call object is also transferred with the call. The new routing server may be configured to read the data stored in the call object and identify the most recently executed step in the routing strategy. According to one embodiment, the new routing server refrains from executing that step again, and proceeds to the next step in the routing strategy.

According to another embodiment, instead of transferring the call to the route point controlled by the new routing server, the call may be transferred to a second SIP server to which the new routing server is connected.

According to one embodiment, the addition of a new instance of a routing server 506 triggers notification to the load balancer 508 to add the new instance to the configuration settings of the load balancer. For example, the new route point controlled by the new routing server may be added to the load balancer's configuration settings. Similarly, deletion of an existing instance of a routing server triggers notification to the load balancer for deleting the instance of the server from the configuration settings of the load balancer. When the SIP server 502 receives a new call that requires routing, the load balancer is configured to execute logic to assign the call to the active instances of the routing server 506 (e.g. in a round robin fashion). In other embodiments, the logic of the load balancer 508 may be incorporated into the SIP server 502.

According to one embodiment, resources may be dynamically added and deleted in response to detected, forecast, or scheduled events. For example, the contact center may run an outbound campaign on preset dates. If such campaigns are infrequent for the contact center, it may be costly to maintain and pay for resources (e.g. outbound servers) that are dedicated to such campaigns. The dynamic elasticity capabilities provided by embodiments of the present invention allow such outbound services to be activated when needed, and removed when no longer needed. For example, the elasticity server 528 may be configured to receive as input the various parameters of the outbound campaign that is to be run, select an optimal adjustment strategy in response, and output parameters for the adjustment strategy which may indicate, for example, the resources that need to be added (e.g. outbound servers) in order to provide the added service. The migration server 532 may then be invoked to migrate the current contact center without outbound campaign capability, to a contact center that includes outbound campaign capability.

According to one embodiment, the adjustment of contact center resources may be to switch from one services mix to a different services mix. For example, in response to detecting increased call volume relating to a particular type of product, the elasticity server may be configured to output an adjustment strategy that is configured to redirect future incoming calls relating to that product to other multimedia such as, for example, chat or social media interactions. This may entail, for example, changing a television ad for the product to provide a Twitter or Facebook page that users can use to contact the contact center instead of a telephone number. For a webpage, a "click to call" button on the page may be dynamically switched to a "click to chat" button in response to the increased call volume for the advertised product.

If a smart phone is used to initiate a voice call by a customer, the contact center may send a return pop-up message to suggest an alternate communication medium, such as, for example, chat. A link may be provided in the pop-up message for initiating a chat session with a contact center agent instead of waiting in a queue for a voice call with the agent.

In other embodiments, adjustments may be made to the routing strategy so that an IVR application is automatically launched to allow self-service for calls relating to the particular type of product instead of routing such calls to a contact center agent.

Figure 34:
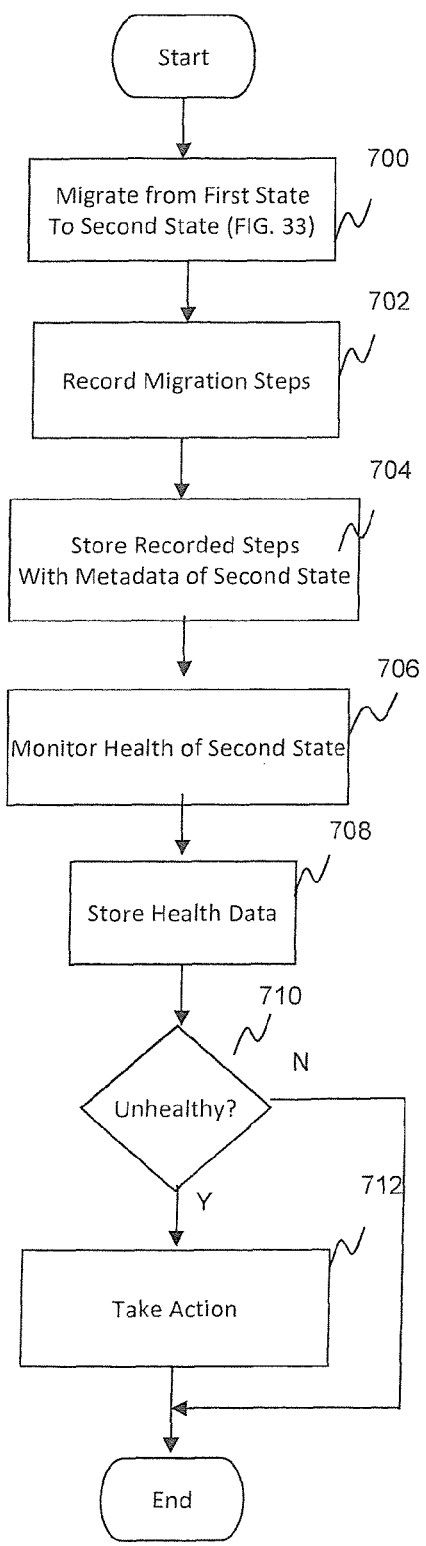
FIG. 34 is a flow diagram of a process for monitoring health of a deployment state after migrating from a first deployment state to a second deployment state according to one embodiment of the invention.

FIG. 34 is a flow diagram of a process for monitoring health of a deployment state after migrating from a first deployment state to a second deployment state according to one embodiment of the invention. In act 700, the contact center migrates from the first state to the second state according to the process described with respect to FIG. 33.

In act 702, the migration server 532 records migration steps if such steps are manually invoked.

In act 704, the migration server 532 stores the recorded steps with metadata associated with the second state in the deployment archive maintained in the mass storage device 534. The metadata may describe, for example, the optimal conditions for the second state, such as, for example, the optimal traffic, optimal number of agents, and the like, that the second state is configured to handle. One or more images of the virtual machines may also be stored in a deployment archive to capture the deployment settings and other configuration parameters of the second state. For example, the images may capture the servers that are running on each virtual machine, along with the configuration parameters of each of the servers. According to one embodiment, the mass storage device 534 may maintain a history of migrations from one deployment state to another.

In act 706, the health monitor 530 monitors the health of the second deployment state, and, in step 708, stores the health data in the mass storage device 534. For example, the health monitor 530 may monitor the same conditions monitored by the monitoring server 526, such as, for example, abandonment rate, average handle time, customer satisfaction, service levels, agents' occupancy, and the like. The health monitor 530 may be configured to compute a health value for the contact center indicative of how healthy or unhealthy the second deployment state is based on the monitored conditions. For example, the health value may be computed based on how much the monitored conditions deviate from an optimal healthy condition as defined via certain thresholds. The computation may include or exclude appropriate agent staffing from consideration, and/or add unused agent capacity as an additional parameter. The reference/optimal state may be determined by using Halfin-Whitt (or QED—quality and efficiency driven) concepts as will be understood by a person of skill in the art. Once computed, the health value may be stored as part of the metadata for the second deployment state.

In act 710, the health monitor determines whether the second deployment state is deemed to be unhealthy based on the computed health value. If the second deployment state is determined to be in unhealthy, for example, for more than a preset duration of time, the health monitor may be configured to take an action in step 712. The action may be, for example, to try to troubleshoot for determining the cause for the unhealthy state. A troubleshooting application may be launched for identifying, for example, bottlenecks such as overload of currently available pool of agents (e.g. might be less than expected/planned). A corrective measure may be identified by the application, such as automatically redirecting higher percentage of traffic to self-service (in IVR), e.g. routing only gold customers to agents instead of gold and silver. Of course, this exemplary corrective measure assumes that there are sufficient IVR ports for handling the calls. Another corrective action may be playing automatic announcements to calls indicating that there is overload and requesting that the callers call later. Health of the deployment after implementing the corrective actions may be measured again for determining whether those measures are successful.

In another example, the action may be to revert to the first state. In reverting to the first state, the migration server may be configured to execute migration steps recorded previously or deduced from the migration steps taken in migrating from the first state to the second state.

It is the Applicant's intention to cover by claims all such uses of the invention and those changes and modifications which could be made to the embodiments of the invention herein chosen for the purpose of disclosure without departing from the spirit and scope of the invention. For example, the above examples relating to dynamic adjustment of resources for handling voice interactions may be extended to apply to other types of interactions. Thus, the present embodiments of the invention should be considered in all respects as illustrative and not restrictive, the scope of the invention to be indicated by claims and their equivalents rather than the foregoing description.

The invention claimed is:

1. A method for monitoring deployment states of a contact center, the method comprising:
migrating, by the processor, a state of the contact center from a first deployment state to a second deployment state;
recording, by the processor, steps in migrating from the first deployment state to the second deployment state;
storing, by the processor, the recorded steps in association with metadata describing the second deployment state;
monitoring, by the processor, health of the second state; and
taking an action by the processor for moving the state of the contact center to a healthy state in response to determining that the second deployment state is unhealthy.

2. The method of claim 1 further comprising:
monitoring and collecting, by the processor, contact center operation data;
detecting, by the processor, in response to the monitoring, a condition relating to the operation of the contact center; and
dynamically adjusting, by the processor, at least one hardware or software resource for the contact center based on the detected condition for migrating the state of the contact center from the first to the second deployment state.

3. The method of claim 1, wherein the monitoring includes monitoring a condition including at least one of call abandonment rate, average handle time, customer satisfaction, service levels, or agents' occupancy.

4. The method of claim 3, wherein the determining that the second deployment state is unhealthy includes comparing the condition to one or more threshold values.

5. The method of claim 1 further comprising:
storing by the processor the health of the second state in association with the second deployment state.

6. The method of claim 1, wherein the action taken by the processor is reverting to the first deployment state.

7. The method of claim 1, wherein the action taken by the processor is troubleshooting for determining a cause for the unhealthy state.

8. A system for monitoring deployment states of a contact center, the system comprising:
a processor; and
a memory storing program instructions thereon that, when executed by the processor cause the processor to:
migrate a state of the contact center from a first deployment state to a second deployment state;
record steps in migrating from the first deployment state to the second deployment state;
store the recorded steps in association with metadata describing the second deployment state;
monitor health of the second state; and
take an action for moving the state of the contact center to a healthy state in response to determining that the second deployment state is unhealthy.

9. The system of claim 8, wherein the instructions further cause the processor to:
monitor and collect contact center operation data;
detect, in response to the monitoring, a condition relating to the operation of the contact center; and
dynamically adjust at least one hardware or software resource for the contact center based on the detected condition for migrating the state of the contact center from the first to the second deployment state.

10. The system of claim 8, wherein the instructions that cause the processor to monitor further include instructions that cause the processor to monitor a condition including at least one of call abandonment rate, average handle time, customer satisfaction, service levels, or agents' occupancy.

11. The system of claim 10, wherein the instructions that cause the processor to determine that the second deployment state is unhealthy includes instructions that cause the processor to compare the condition to one or more threshold values.

12. The system of claim 8, wherein the instructions further cause the processor to:
store the health of the second state in association with the second deployment state.

13. The system of claim 8, wherein the instructions that cause the processor to take action further include instructions that cause the processor to revert to the first deployment state.

14. The system of claim 8, wherein the instructions that cause the processor to take action further include instructions that cause the processor to troubleshoot for determining a cause for the unhealthy state.

* * * * *